(12) United States Patent
Iwata et al.

(10) Patent No.: US 7,167,260 B2
(45) Date of Patent: Jan. 23, 2007

(54) CONTROL OF DISTRIBUTED PRINTERS USING VIRTUAL PRINTER DRIVER EXECUTE MODULE

(75) Inventors: Fumihiko Iwata, Nagano-ken (JP); Masashi Asakawa, Nagano-ken (JP); Akihiro Sato, Nagano-ken (JP); Akira Mochida, Nagano-ken (JP); Koki Togashi, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 838 days.

(21) Appl. No.: 09/980,210

(22) PCT Filed: Apr. 5, 2001

(86) PCT No.: PCT/JP01/02968

§ 371 (c)(1),
(2), (4) Date: Nov. 30, 2001

(87) PCT Pub. No.: WO01/77809

PCT Pub. Date: Oct. 18, 2001

(65) Prior Publication Data

US 2002/0163666 A1  Nov. 7, 2002

(30) Foreign Application Priority Data

| Apr. 7, 2000 | (JP) | ............................. 2000-106486 |
| Apr. 7, 2000 | (JP) | ............................. 2000-106599 |
| Apr. 7, 2000 | (JP) | ............................. 2000-107055 |
| Apr. 7, 2000 | (JP) | ............................. 2000-107231 |

(51) Int. Cl.
*G06F 3/12* (2006.01)
*G00F 15/00* (2006.01)

(52) U.S. Cl. .................. 358/1.15; 710/15; 710/16

(58) Field of Classification Search ............... 358/1.15, 358/1.16, 1.13, 1.1; 710/15, 16, 17, 18, 19; 709/203
See application file for complete search history.

(56) References Cited

U.S. PATENT DOCUMENTS 5,933,576 A * 8/1999 Muramatsu .................. 358/1.1

(Continued)

FOREIGN PATENT DOCUMENTS

DE  198 49 962 A 1  9/1999

OTHER PUBLICATIONS

Abstract of Japanese Patent Publication No. 09-190312, Pub. Date: Jul. 22, 1997, Patent Abstracts of Japan.

(Continued)

*Primary Examiner*—Kimberly Williams
*Assistant Examiner*—Dillon Murphy
(74) *Attorney, Agent, or Firm*—Martine Penilla & Gencarella, LLP

(57) ABSTRACT

A technique for carrying out distributed printing from a general-purpose application program. An application program generates print data and issues a print command. A virtual printer driver receives the print command and returns performance information with regard to performances of a virtual printer to the application program. The application program converts print data into data suitable for the virtual printer based on the performance information and transmits the converted print data to the virtual printer driver. The virtual printer driver stores the input print data in the form of an intermediate print file into an HDD. A distributed printing utility reads the intermediate print file, allocates intermediate print data in the intermediate print file to respective printers according to a distributed form set in a dialog box, and outputs the print data in a distributive manner to real printer drivers provided for the respective printers based on the allocation.

48 Claims, 48 Drawing Sheets

U.S. PATENT DOCUMENTS

| | | | |
|---|---|---|---|
| 6,483,524 B1 * | 11/2002 | Petchenkine et al. | 715/763 |
| 6,498,658 B1 * | 12/2002 | Sekikawa | 358/1.16 |
| 6,549,654 B1 * | 4/2003 | Kumada | 382/162 |
| 6,552,813 B1 * | 4/2003 | Yacoub | 358/1.1 |
| 6,553,431 B1 * | 4/2003 | Yamamoto et al. | 710/8 |
| 6,563,944 B1 * | 5/2003 | Kumada | 382/162 |
| 6,606,165 B1 * | 8/2003 | Barry et al. | 358/1.9 |
| 6,654,136 B1 * | 11/2003 | Shimada | 358/1.15 |
| 6,744,531 B1 * | 6/2004 | Mestha et al. | 358/1.9 |
| 6,760,118 B1 * | 7/2004 | Kato | 358/1.15 |
| 6,856,413 B1 * | 2/2005 | Roosen et al. | 358/1.15 |

FOREIGN PATENT DOCUMENTS

| | | |
|---|---|---|
| EP | 0 982 650 A1 | 3/2000 |
| JP | 07-121322 | 5/1995 |
| JP | 07-121327 | 5/1995 |
| JP | 07-230372 | 8/1995 |
| JP | 07-281847 | 10/1995 |
| JP | 09-190312 | 7/1997 |
| JP | A-9-218764 | 8/1997 |
| JP | 09-258927 | 10/1997 |
| JP | 10-187400 | 7/1998 |
| JP | 11-078178 | 3/1999 |
| JP | 11-143661 | 5/1999 |
| JP | A-11-194911 | 7/1999 |
| JP | A-11-296333 | 10/1999 |
| JP | 11-327818 | 11/1999 |
| JP | 11-327848 | 11/1999 |
| JP | 2000-010753 | 1/2000 |
| WO | WO 97/36226 | 10/1997 |
| WO | WO 97/45908 | 12/1997 |

OTHER PUBLICATIONS

Abstract of Japanese Patent Publication No. 10-187400, Pub. Date: Jul. 14, 1998, Patent Abstracts of Japan.
Abstract of Japanese Patent Publication No. 11-143661, Pub. Date: May 28, 1999, Patent Abstracts of Japan.
Abstract of Japanese Patent Publication No. 11-327818, Pub. Date: Nov. 30, 1999, Patent Abstracts of Japan.
Abstract of Japanese Patent Publication No. 11-327848, Pub. Date: Nov. 30, 1999, Patent Abstracts of Japan.
Abstract of Japanese Patent Publication No. 2000-010753, Pub. Date: Jan. 14, 2000, Patent Abstracts of Japan.
Abstract of Japanese Patent Publication No. 07-121322, Pub. Date: May 12, 1995, Patent Abstracts of Japan.
Abstract of Japanese Patent Publication No. 07-121327, Pub. Date: May 12, 1995, Patent Abstracts of Japan.
Abstract of Japanese Patent Publication No. 09-258927, Pub. Date: Oct. 03, 1997, Patent Abstracts of Japan.
Abstract of Japanese Patent Publication No. 07-230372, Pub. Date: Aug. 29, 1995, Patent Abstracts of Japan.
Abstract of Japanese Patent Publication No. 07-281847, Pub. Date: Oct. 27, 1995, Patent Abstracts of Japan.

* cited by examiner

Fig.12

| Output Resources | Page Numbers |
|---|---|
| Printer 60 | 1st page, 2nd page, 3rd page |
| Printer 70 | 1st page, 2nd page, 3rd page |
| Printer 80 | 1st page, 2nd page, 3rd page |

| Output Resources | Page Numbers |
|---|---|
| Printer 60 | 1st page, 2nd page, 3rd page |
| Printer 70 | 1st page, 2nd page, 3rd page |
| Printer 80 | 1st page, 2nd page, 3rd page |

SPEED PREFERENCE MODE

PRINTER 60   PRINTER 70   PRINTER 80

HANDLING PREFERENCE MODE

PRINTER 60   PRINTER 70   PRINTER 80

Fig.50

| Priority (=C1) | Output Resources | Page Numbers |
|---|---|---|
| 1 | Printer 60 | 1, 2, 3, 4 |
| 2 | Printer 70 | 5, 1, 2, 3, 4, 5, 1, 2 |
| 3 | Printer 80 | 3, 4, 5, 1, 2, 3, 4, 5 |

CONTROL OF DISTRIBUTED PRINTERS USING VIRTUAL PRINTER DRIVER EXECUTE MODULE

TECHNICAL FIELD

The present invention relates to a technique of outputting print data of interest, which are to be printed, to multiple printers in a distributive manner.

BACKGROUND ART

Recent advancement of the computer network enables a plurality of printers to be readily connected to one information processing apparatus like a personal computer. In the structure where one information processing apparatus connects with multiple printers, print data generated by the information processing apparatus may be output to the respective printers in a distributive manner. This shortens the total processing time. For example, in the case of printing three copies of a document generated by the information processing apparatus according to an application program, distributed printing allocates one copy to each of three printers. This arrangement theoretically completes printing of three copies in a time required for printing one copy.

The prior art technique has a variety of operatability-related problems discussed below.

Problems Regarding Frequency of Printing Operations:

The prior art technique requires print data to be output individually from the application program to printer drivers of the respective printers for distributed printing. The operator should thus iteratively perform a series of operations for printing on the application program a number of times corresponding to the number of printers specified as destinations of distribution. This leads to poor operatability.

It is accordingly required to enable distributed printing with good operatability from the general-purpose application program.

Problems Regarding Window Display of Distributed Printing:

In the prior art technique, a window representing the progress of distributed printing is displayed in the course of distributed printing. This window shows the rate of completion to the whole print job and informs the operator of the progress of printing.

In this structure, only the same information as that for normal printing with a single output resource is shown in the window. The operator can thus not obtain information characteristic of the distributed printing, such as allocation to the respective printers. In the case of any failed printing, the insufficient information does not allow the operator to handle the trouble immediately. This leads to poor operatability.

Problems Regarding Recovery:

When any trouble, such as out-of-paper or paper jam, arises in any of the multiple printers specified as destinations of distribution, the prior art technique does not allow a portion of the print data distributed to the printer with the trouble to be printed normally unless the printer is recovered from the trouble. Even if the printer is recovered from the trouble, the total printing time is extended by a time required for recovery from the trouble. One possible countermeasure to solve this problem reallocates non-printed data, which is expected to be printed by the printer with the trouble to other normal printers among the multiple printers specified as the destinations of distribution.

This proposed countermeasure, however, does not sufficiently shorten the printing time. The procedure requires allocation of the non-printed data to the normal printers, each of which should print a distributed portion of the non-printed data in addition to its original distribution. This arrangement thus does not sufficiently shorten the printing time.

It is accordingly required to sufficiently shorten the printing time when any trouble arises in any of the multiple printers specified as the destinations of distribution.

DISCLOSURE OF THE INVENTION

The object of the present invention is thus to solve at least part of the above problems and to enable distributed printing with favorable operatability.

The present invention is thus directed to a first distributed printing control apparatus connecting with a plurality of printers. The first distributed printing control apparatus distributes print data of interest, which is generated by an application program and is to be printed, into the plurality of printers, converts the distributed print data into output data suitable for each of the printers via a printer driver provided for the each printer, and transmits the converted output data to the each printer. The first distributed printing control apparatus includes: a virtual printer driver storage module that stores therein a virtual printer driver for specifying information on a virtual printer; and an intermediate print data generation module that executes the virtual printer driver to obtain intermediate print data adequate for the virtual printer from the application program. The obtained intermediate print data is used as the print data of interest.

In the first distributed printing control apparatus of the above configuration, the intermediate print data is obtained by simple output of a print command from the application program to the virtual printer driver, and the distributed printing of the intermediate print data with the respective printers is automatically carried out. The operator is thus only required to execute a series of operations for printing only once on the application program. This arrangement effectively ensures the excellent operatability.

In accordance with one preferable application of the first distributed printing control apparatus, the virtual printer driver specifies information with regard to a highest-performance printer among all available printers as destinations of distribution.

In this application, the intermediate print data obtained by execution of the virtual printer driver is adequate for the printer of the highest performances. In general, the print data adequate for the high-performance printer is also usable for lower-performance printers. Namely the generated intermediate print data is suitable for any printer drivers. This allows all the printers specified as destinations of distribution to sufficiently exert the respective performances.

The first distributed printing control apparatus of the above application may have: a performance information collection module that collects information with regard to performances of all the available printers as the destinations of distribution from printer drivers individually provided for the available printers; and a highest performance selection module that selects a highest performance among the performances of all the available printers collected by the performance information collection module.

This arrangement enables the information regarding the performances of each printer to be obtained from the printer driver provided for each printer, and extracts the performance information of the highest-performance printer from all the input performance information.

The first distributed printing control apparatus may further include a virtual printer printing information setting module that displays an input window on a display device and sets various pieces of information required for printing with the virtual printer, based on input data from an input device like a mouse and a keyboard.

In this structure, the virtual printer printing information setting module is used to set various pieces of printing-related information, such as the printing quality, the paper size, and the orientation of printing.

In accordance with one preferable embodiment, the first distributed printing control apparatus with the virtual printer printing information setting module further includes an information transmission module that causes at least part of the various pieces of information set by the virtual printer printing information setting module to undergo a series of processing carried out by each printer driver.

This arrangement allows each printer driver to utilize the information set by the virtual printer printing information setting module. The setting of the printing-related information in each printer driver is thus simplified or even omitted.

In accordance with another preferable embodiment, the first distributed printing control apparatus with the virtual printer printing information setting module further includes: a real printer printing information setting module that is individually provided for each of the plurality of printers connected to the distributed printing control apparatus to set various pieces of information required for printing with the each printer; and a display control module that displays a display window on the display device, the display window including a plurality of icons for individually activating the real printer printing information setting modules and an icon for activating the virtual printer printing information setting module.

This arrangement activates the virtual printer driver by operating the corresponding icon in the same manner as the operation of the icon for activating the real printer driver.

In another preferable application of the present invention, the first distributed printing control apparatus further includes: a distribution information setting module that displays an input window for distribution of the print data and sets various pieces of information required for distributing the print data into the plurality of printers, based on the input data from the input device; and a print data distribution module that distributes the print data into the plurality of printers, based on the various pieces of information set by the distribution information setting module.

In this application, the distribution information setting module is used to set various pieces of information required for specifying the printers as the destinations of distribution.

In the first distributed printing control apparatus with the distribution information setting module and the print data distribution module, one of the various pieces of information required for distributing the print data into the plurality of printers restricts a destination of distribution of the print data to a printer included in a specific group selected among the plurality of printers connected to the distributed printing control apparatus.

This arrangement restricts the destinations of distribution of printing to printers belonging to a preset group, among all the printers connecting with the distributed printing control apparatus.

In accordance with another preferable application of the first distributed printing control apparatus, the intermediate print data obtained by the intermediate print data generation module is temporarily registered as an intermediate print file in an external storage device. When there is some failure in a resulting print and reprinting is required, this arrangement does not require reactivation of the application program but utilizes the intermediate print file for reprinting.

In the first distributed printing control apparatus, the plurality of printers may be connected to the distributed printing control apparatus via a computer network. The computer network facilitates connection with a large number of printers.

The present invention is also directed to a second distributed printing control apparatus that distributes print data of interest, which is generated by an application program and is to be printed, into a plurality of printers and outputs the distributed print data to each of the plurality of printers via a printer driver corresponding to a type of the each printer. The second distributed printing control apparatus includes: a virtual printer driver storage module that, when the plurality of printers are of an identical type, stores therein a virtual printer driver for specifying information on the identical type of the printers as information with regard to a virtual printer; an intermediate print data generation module that executes the virtual printer driver to obtain intermediate print data adequate for the virtual printer from the application program; a print data allocation module that allocates the intermediate print data to the plurality of printers; and an output data control module that transmits the intermediate print data respectively to the plurality of printers according to the allocation by the print data allocation module without any data conversion by the corresponding printer driver.

In the second distributed printing control apparatus of the above configuration, the intermediate print data is obtained by simple output of a print command from the application program to the virtual printer driver, and the distributed printing of the intermediate print data with the printers of an identical type is automatically carried out. The operator is thus only required to execute a series of operations for printing only once on the application program. This arrangement effectively ensures the excellent operatability. In the second distributed printing control apparatus, the intermediate print data generation module is not required to carry out data conversion individually for the respective printers but performs the data conversion only once to make the print data generated by the application program fit for each printer. This arrangement effectively ensures the high-speed distributed printing to the printers of the identical type.

In accordance with one preferable application of the second distributed printing control apparatus, a predetermined unit of the allocation of the intermediate print data by the print data allocation module is each page of a document expressed by print data. This arrangement ensures distributed printing to the respective printers by the unit of each page in a document to be printed.

In accordance with another preferable application of the second distributed printing control apparatus, the intermediate print data obtained by the intermediate print data generation module is temporarily registered as an intermediate print file in an external storage device. This arrangement enables reuse of the intermediate print data.

The second distributed printing control apparatus with the intermediate print file stored in an external storage device may be designed to read the intermediate print file registered in the external storage device in response to an external command and re-execute distributed printing of the intermediate print data in the intermediate print file with the plurality of printers. When reprinting is required because of some failure in a resulting print or insufficiency of printed copies, this arrangement allows reprinting without reactivating the application program.

In one preferable embodiment of the second distributed printing control apparatus thus designed, the print data allocation module and the output data control module are activated again to attain the re-execution of the distributed printing. In this embodiment, the print data allocation module changes the allocation of the print data prior to reprinting.

In accordance with one preferable application, the second distributed printing control apparatus further includes: a performance information collecting module that collects information regarding performances of each of the plurality of printers from a printer driver provided for the each printer; and an identity decision module that determines that the plurality of printers are of the identical type, based on the performances of the plurality of printers collected by the performance information collecting module. This arrangement enables information regarding the performances of each printer to be obtained from the printer driver provided for each printer, and identifies the printer based on the performance information.

In accordance with another preferable application, the second distributed printing control apparatus further has a distribution information setting module that displays an input window for distribution of the print data and sets various pieces of information required for distributing the print data into the plurality of printers, based on input data from an input device. The print data allocation module allocates the intermediate print data, based on the various pieces of information set by the distribution information setting module. In this application, the distribution information setting module sets various pieces of information required for specifying the printers as the destinations of distribution.

In the second distributed printing control apparatus with the distribution information setting module, it is preferable that one of the various pieces of information required for distributing the print data into the plurality of printers restricts a destination of distribution of the print data to a printer included in a specific group selected among the plurality of printers connected to the distributed printing control apparatus. This arrangement restricts the destinations of distribution of printing to printers belonging to a preset group, among all the printers connecting with the distributed printing control apparatus. The operator can thus collect resulting prints from the restricted range of output resources. This ensures excellent operatability.

In the second distributed printing control apparatus with the distribution information setting module, it is also preferable that the intermediate print data obtained by the intermediate print data generation module is specified as an intermediate print file and is temporarily registered, together with the various pieces of information set by the distribution information setting module, in an external storage device. Since the data representing the various pieces of information are stored in the external storage device, the distribution information setting module may set the defaults based on the stored data, in the case of reprinting with the intermediate print file. When it is not required to change the settings, for example, in the case of simple reprint, this arrangement does not require re-input of the same data and thus ensures excellent operatability of reprinting.

In the second distributed printing control apparatus, at least one of the plurality of printers may be connected to the distributed printing control apparatus via a computer network. The computer network facilitates connection with a large number of printers.

The present invention is further directed to a third distributed printing control apparatus that distributes print data of interest, which is generated by an application program and is to be printed, into a plurality of printers and outputs the distributed print data to each of the plurality of printers via a printer driver corresponding to a type of the each printer. The third distributed printing control apparatus includes: a virtual printer driver storage module that specifies information on a virtual printer, and when the plurality of printers are of an identical type, stores therein a virtual printer driver for specifying information on the identical type of the printers; an intermediate print data generation module that executes the virtual printer driver to obtain intermediate print data adequate for the virtual printer from the application program; a print data allocation module that allocates the intermediate print data to the plurality of printers; an identity decision module that determines whether or not the plurality of printers are of the identical type; and an output data control module that, when it is determined that the plurality of printers are of the identical type, transmits the intermediate print data respectively to the plurality of printers according to the allocation by the print data allocation module without any data conversion by the corresponding printer driver, and when it is determined that the plurality of printers are not of the identical type, transmits the intermediate print data respectively to the plurality of printers according to the allocation by the print data allocation module with data conversion by the corresponding printer driver.

In the third distributed printing control apparatus of the above configuration, the intermediate print data is obtained by simple output of a print command from the application program to the virtual printer driver, and the distributed printing of the intermediate print data with the respective printers is automatically carried out. The operator is thus only required to execute a series of operations for printing only once on the application program. This arrangement effectively ensures the excellent operatability.

The third distributed printing control apparatus ensures distributed printing, whether the plurality of printers specified as the destinations of distribution are of an identical type or of different types. Especially in the case of distributed printing to printers of an identical type, the intermediate print data generation module is not required to carry out data conversion individually for the respective printers but performs the data conversion only once to make the print data generated by the application program fit for each printer. This arrangement effectively ensures the high-speed distributed printing to the printers of the identical type, while allowing distributed printing irrespective of the type of the printer.

The present invention is also directed to a fourth distributed printing control apparatus that groups print data of interest, which is to be printed, by a predetermined unit, specifies allocation of respective grouped parts of the print data to a plurality of printers as allocation information, and outputs the print data to the plurality of printers in a distributive manner based on the allocation information. The fourth distributed printing control apparatus includes: a working status detection module that detects a current working status of a printer specified as a destination of distribution according to the allocation information; and a display control module that displays one window on a display device, the window including at least a field showing the allocation information and another field showing the current working status detected by the working status detection module.

In the fourth distributed printing control apparatus of the above configuration, the allocation information and the information on the current working status of each printer specified as the destination of distribution are simultaneously displayed in one window in the case of distributed printing. The simultaneous display in one window quickly informs the operator of the allocation to the respective printers as well as any trouble, for example, out-of-paper, arising in any of the printers. The operator can gain required pieces of information in the case of any failed printing and take a required countermeasure without delay based on the input information. This arrangement thus effectively ensures excellent operatability.

In the fourth distributed printing control apparatus of the above configuration, a predetermined unit of the allocation of the print data may be each page of a document expressed by print data. This arrangement ensures distributed printing to the respective printers by the unit of each page in a document to be printed.

In accordance with one preferable application, the fourth distributed printing control apparatus further includes a first control module that causes the display control module to carry out a display with regard to a print job, while one unit of print data specified by the print job is either in distributed printing or in a waiting queue. In this application, the allocation information and the current working status of each printer specified as the destination of distribution are displayed with regard to each print job in distributed printing or in a waiting queue.

The fourth distributed printing control apparatus with the first control module further includes a second control module that causes the display control module to carry out a display with regard to the print job, while the distributed printing of the unit of print data specified by the print job is concluded. In this application, the allocation information and the current working status of each printer specified as the destination of distribution are displayed with regard to each concluded print job.

The fourth distributed printing control apparatus with both the first control module and the second control module may have a switch that is operated to alternatively change over between the display by the first control module and the display by the second control module. This switch is used to readily change over the display between the display by the first control module and the display by the second control module.

In the fourth distributed printing control apparatus with both the first control module and the second control module, it is preferable that the second control module allocates an order of collection to the respective printers by considering a sequence of collected resulting prints and displays the allocation in the window. In this preferable application, the order of collection with regard to the concluded print jobs is displayed in the window. The operator fetches the resulting prints in the specified order of collection. This arranges the resulting prints in a desired sequence.

In the fourth distributed printing control apparatus with both the first control module and the second control module, it is also preferable that the second control module displays in the window a switch for activating another cycle of distributed printing after conclusion of one cycle of distributed printing. Reprinting is carried out by a simple operation of the switch. This arrangement thus ensures excellent operatability of reprinting.

In accordance with one preferable application of the fourth distributed printing control apparatus, the allocation information with regard to multiple print jobs, each representing the print data, is simultaneously displayed in the window. In this application, the allocation information with regard to a plurality of print jobs can be displayed in the window simultaneously with the working status of a printer specified as the destination of distribution of one arbitrary print job selected among the plurality of print jobs.

In accordance with another preferable application, the fourth distributed printing control apparatus further includes a distribution information setting module that displays an input window on the display device and sets diverse pieces of information with regard to distribution of the print data, based on input data from an input device. The allocation information is specified, based on the diverse pieces of information set by the distribution information setting module. In this application, the distribution information setting module sets the various pieces of information required for specifying the printers as the destinations of distribution.

The present invention is further directed to a fifth distributed printing control apparatus, which includes: a printer specification module that specifies multiple printers as destinations of distribution among all printers connecting with the distributed printing control apparatus to allow data transmission; and a distribution control module that outputs print data of interest, which is to be printed, in a distributive manner to the multiple printers specified by the printer specification module. The distribution control module has: a printer selection module that, when any trouble arises in any of the multiple printers specified by the printer specification module, selects one printer immediately available for printing among all the printers except the printer with the trouble; and a troubled-time output module that outputs a distributed portion of the print data to the printer selected by the printer selection module as an alternative printer for the printer with the trouble.

In the fifth distributed printing control apparatus of the above configuration, when any trouble arises in any of the multiple printers specified as the destinations of distribution, one available printer is selected as an alternative printer among all the printers except the printer with the trouble. This alternative printer is used for distributed printing of the print data. It is thus not required to reallocate the print data to the respective printers, even when some trouble arises in one of the printers. The alternative printer is not under work but is immediately available for printing. Printing is thus resumed immediately by changing the destination of distributing a portion of the print data to the alternative printer. This arrangement thus sufficiently shortens the total printing time.

In accordance with one preferable application of the fifth distributed printing control apparatus, the printer selection module has an identification module that identifies type of each printer to select a printer of an identical or similar type with or to a type of the printer with the trouble.

In this application, one printer satisfying the condition of either an identical or a similar type with or to the printer with the trouble in addition to the condition of immediate availability is selected as the alternative printer. The resulting print obtained from the alternative printer is accordingly equivalent or close to the resulting print expected from the printer with the trouble and practically satisfies the user's requirement.

In accordance with one preferable embodiment, the fifth distributed printing control apparatus with the identification module further has a performance information input module that receives information on performances of the respective printers from printer drivers provided for respective types of all the printers. Here the identification module has a type specification module that specifies a printer of the identical or similar type, based on the information input into the performance information input module.

The type of the printer is identified according to the information received from the printer driver. This arrangement simplifies the structure for the identification.

In accordance with another preferable embodiment, the fifth distributed printing control apparatus further has a monitor module that monitors occurrence of any trouble in each of the multiple printers specified by the printer specification module. Here the distribution control module has an after-start-of-printing alternative control module, when the monitor module detects occurrence of any trouble in any of the multiple printers during a time period between a start of distributed output of the print data and completion of printing with each printer, outputs non-printed page data, which is included in a distributed portion of the print data output to the printer with the trouble, to the alternative printer.

In the structure of this embodiment, distributed printing is completed with another printer, if occurrence of any trouble is detected in any of the multiple printers specified as the destinations of distribution during a time period between a start of distributed output of the print data and completion of printing with each printer.

In the fifth distributed printing control apparatus of the above embodiment, it is preferable that the after-start-of-printing alternative control module outputs page data, which represents a message showing replacement of the printer, to the alternative printer.

In this application, a specific page with a message showing replacement of the printer is printed with the alternative printer. This informs the operator of the replacement of the printer, thus ensuring excellent utility.

In accordance with still another preferable embodiment, the fifth distributed printing control apparatus further has a monitor module that monitors occurrence of any trouble in each of the multiple printers specified by the printer specification module. Here the distribution control module has a before-printing alternative control module, when the monitor module detects occurrence of any trouble in any of the multiple printers prior to a start of distributed output of the print data, outputs a portion of the print data, which is expected to be output to the printer with the trouble, to the alternative printer.

In the structure of this embodiment, distributed printing is completed with another printer, if occurrence of any trouble is detected in any of the multiple printers specified as the destinations of distribution, prior to start of the distributed output of the print data.

In accordance with one preferable application of the fifth distributed printing control apparatus, the distribution control module includes: a printer reselection module that, when any trouble arises in the alternative printer, selects one printer immediately available for printing among all the printers except the printer with the trouble; and a module that outputs a portion of the print data in a distributive manner to the printer selected by the printer reselection module as a new alternative printer.

In this application, after the output resource of the print data has been changed from a certain printer, which was originally specified as one of the destinations of distribution and had some trouble, to the alternative printer, in the event of a further trouble arising in the alternative printer, the output resource of the print data is changed again from the alternative printer to a second alternative printer. This application ensures distributed printing with another printer even when some trouble arises in the alternative printer.

In accordance with another preferable application of the fifth distributed printing control apparatus, the printer selection module includes: a candidate printer selection module that selects at least one printer that is of an identical or similar type with or to a type of the printer with the trouble and is immediately available for printing, among all the printers except the printer with the trouble; and an alternative printer selection module that selects one printer satisfying a predetermined condition out of the at least one printer selected by the candidate printer selection module.

In this application, the candidate printer selection module selects one or multiple printers as candidates for the alternative printer, and the alternative printer selection modules selects one printer among the one or multiple candidate printers. This arrangement enables the alternative printer to be selected automatically.

In one preferable embodiment of the fifth distributed printing control apparatus with the candidate printer selection module and the alternative printer selection module, the printer selection module further includes: a selection method specification module that specifies whether the selection of the alternative printer is carried out manually or automatically; a manual printer selection module that, in response to specification of the manual selection by the selection method specification module, displays a data input window on a display device and selects one printer among all the printers except the printer with the trouble, based on input data from an input device according to the display of the window; and a module that, in response to specification of the automatic selection by the selection method specification module, activates the candidate printer selection module and the alternative printer selection module.

The structure of this embodiment selectively sets either the manual selection or the automatic selection of the alternative printer The manual selection allows an operator's desired printer to be used for distributed printing. This enhances the convenience when the user collects resulting prints, thus improving the operatability.

In another preferable embodiment of the fifth distributed printing control apparatus with the candidate printer selection module and the alternative printer selection module, the candidate printer selection module has: a first selection module that selects a printer of an identical type with a type of the printer with the trouble, among all the printers except the printer with the trouble; and a second selection module that, when no printer is selected by the first selection module, selects a printer having a printing performance close to that of the printer with the trouble, among all the printers except the printer with the trouble.

The structure of this embodiment tries to select the alternative printer among printers of the identical type and, if there is no printer of the identical type, selects the alternative printer among printers having similar printing performances. This arrangement makes the resulting print obtained from the alternative printer equivalent to or close to the expected resulting print, thus satisfying the operator's requirements.

In the fifth distributed printing control apparatus with the first selection module and the second selection module, it is preferable that the distribution control module has a module that, when the printer selected by the second selection module is specified as the alternative printer, corrects the print data to make a resulting print obtained from the alternative printer substantially equivalent to a resulting print expected from the printer with the trouble.

When the alternative printer used for distributed printing is not of an identical type but has similar printing performances, the correction module corrects the print data to make the resulting print obtained from the alternative printer practically equivalent to the expected resulting print. This arrangement desirably satisfies the operator's requirements.

In still another preferable embodiment of the fifth distributed printing control apparatus with the candidate printer selection module and the alternative printer selection module, the candidate printer selection module has: a speed preference decision module that determines whether or not a speed preference mode is set for distributed printing; and an under-speed-preference-mode selection module that selects one available printer regardless of type of the printer, when the speed preference decision module gives an affirmative answer.

In this embodiment, when the speed preference mode is set for distributed printing, one available printer is selected irrespective of the type of the printer. In the speed preference mode, the preference is given to the printing speed over the quality of the resulting print, so that an available printer is used for printing, regardless of the type of the printer.

In another preferable embodiment of the fifth distributed printing control apparatus with the candidate printer selection module and the alternative printer selection module, the alternative printer selection module includes a module that selects a printer of a highest printing speed among the at least one printer selected by the candidate printer selection module.

In this embodiment, the printer of the highest printing speed is selected as the alternative printer among the candidate printers. This further shortens the total printing time.

It is preferable that the fifth distributed printing control apparatus further includes a display control module that displays a name of the printer selected by the alternative printer selection module on a display device.

The display on the display device informs the operator of the alternative printer, which replaces the printer with the trouble. This arrangement thus ensures excellent utility.

The fifth distributed printing control apparatus with the display control module may further include a module that causes the display control module to give a display when the print data is either in distributed printing or in a waiting queue. The display on the display device informs the operator of the alternative printer used for the print data in distributed printing or in a waiting queue.

The fifth distributed printing control apparatus with the display control module may also include a module that causes the display control module to give a display when the distributed printing of the print data is concluded. The display on the display device informs the operator of the alternative printer used for the concluded distributed printing of the print data.

In accordance with another preferable application of the fifth distributed printing control apparatus, the distribution control module has a module that corrects the print data to make a resulting print obtained from the alternative printer substantially similar to a resulting print expected from the printer with the trouble, when the alternative printer is of a different type from a type of the printer with the trouble.

This arrangement enables the resulting print obtained from the alternative printer of a different type close to the resulting print expected from the printer with the trouble.

The present invention is not restricted to the applications of the first through fifth distributed printing control apparatuses discussed above, but may be directed to corresponding distributed printing control methods. Other applications of the present invention include computer programs for attaining the functions of these apparatuses and methods and computer readable recording media in which such computer programs are recorded. Typical examples of the recording media include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

Still other applications of the present invention include data signals that include the computer programs and are embodied in carrier waves, as well as a program supply unit that supplies the computer programs via a communication path. In the application of the program supply unit, the computer programs are stored, for example, in a server on the computer network, and a required program is downloaded to a computer via the communication path and executed to attain the apparatuses discussed above and the corresponding methods.

BRIEF DESCRIPTION OF THE DRAWINGS

FIG. 12 shows an example of output resource list data;

FIG. 50 shows an example of output resource list data;

BEST MODES OF CARRYING OUT THE INVENTION

Figure 1:
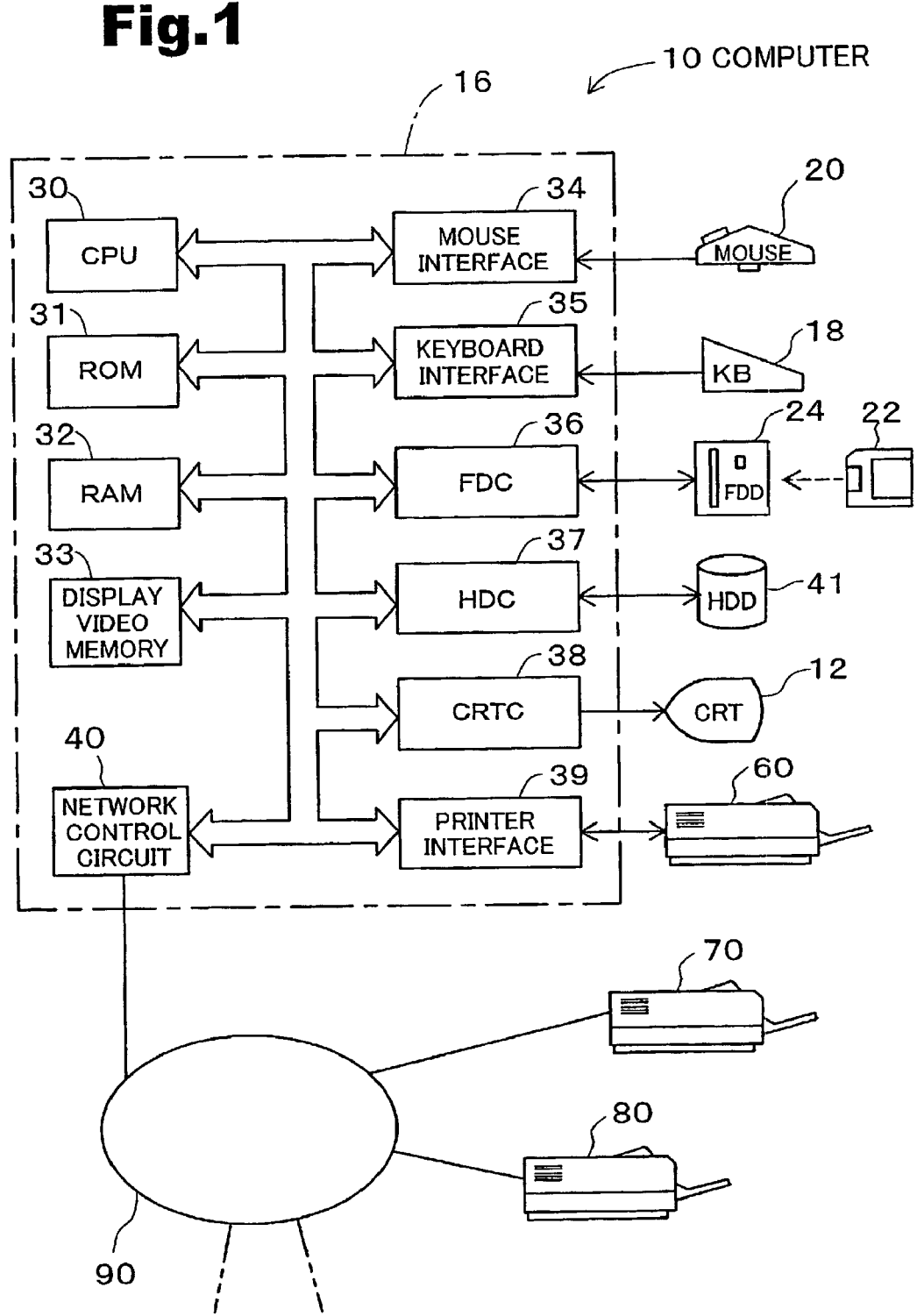
FIG. 1 is a block diagram schematically illustrating the hardware structure of a computer system in a first embodiment of the present invention.

Some modes of carrying out the present invention are discussed below as preferred embodiments in the following sequence:

A. First Embodiment
  A1. General Hardware Structure
  A2. Distributed Printing Process
  A3. Virtual Printer Driver
  A4. User Interface
  A5. Computer Programs
  A6. Effects of Embodiment
  A7. Reuse of Intermediate Print File B. Second Embodiment
  B1. Computer Programs
    B1-1. Distributed Printing Process Routine
    B1-2. Re-printing Process Routine
  B2. Effects of Embodiment C. Third Embodiment
  C1. General Hardware Structure
  C2. Distributed Printing Process
  C3. Virtual Printer Driver
  C4. User Interface
  C5. Computer Programs
  C6. Effects of Embodiment A1. General Hardware Structure FIG. 1 is a block diagram schematically illustrating the hardware structure of a computer system in a first embodiment of the present invention. As illustrated, the computer system of the first embodiment includes a computer 10, which is connected with a plurality of printers 70, 80, . . . having substantial computer functions via a computer network 90 constructed as a Local Area Network (LAN). The computer network 90 is, however, not restricted to the LAN but may be any of diverse networks like the Internet, an Intranet, and a Wide Area Network (WAN).

The computer 10 is further connected with a CRT display 12 as a peripheral device and is locally connected with another printer 60. The computer 10 has a computer main body 16, a keyboard 18, and a mouse 20. The computer main body 16 has a floppy disk drive 24 to read the contents of a floppy disk 22.

The computer main body 16 includes a central processing unit or CPU 30, a ROM 31, a RAM 32, a display video memory 33, a mouse interface 34, a keyboard interface 35, an FDC 36, an HDC 37, a CRTC 38, a printer interface 39, and a network control circuit 40, which are mutually connected via a bus.

The ROM 31 is a built-in read only memory that stores therein diverse programs. The RAM 32 is a readable and writable memory that stores various data therein. The display video memory 33 stores video data representing images to be displayed on the CRT display 12. The mouse interface 34 takes charge of transmission of data to and from the mouse 20. The keyboard interface 35 takes charge of key inputs from the keyboard 18. The FDC 36 is a floppy disk controller for controlling the floppy disk drive (FDD) 24. The HDC 37 is a hard disk controller for controlling a hard disk drive (HDD) 41. The CRTC 38 is a CRT controller for controlling display of images on the CRT display 12 based on the display video data stored in the display video memory 33. The printer interface 39 controls data output to the locally connected printer 60. The network control circuit 40 includes a network card and is connected to the computer network 90.

In this computer system, an operating system is stored in the HDD 41. In response to power supply to the computer main body 16, the operating system is loaded into a predetermined area in the RAM 32 according to a loader written in a boot block of the HDD 41. A printer driver provided for each of the types of the printers 60, 70, and 80 (hereinafter referred to as the real printer driver) is stored in advance in the floppy disk 22 and is installed from the floppy disk drive 24 into the computer 10 according to an activated preset installation program. The installed real printer driver is stored in the HDD 41, and is incorporated in the operating system and loaded into a predetermined area of the RAM 32 in response to power supply to the computer 10.

The computer system further includes a virtual printer driver 110 for specifying information on a virtual printer. Like the real printer driver, the virtual printer driver 110 is stored in advance in the floppy disk and is installed from the floppy disk drive 24 into the computer 10 according to an activated preset installation program. The installed virtual printer driver 110 is stored in the HDD 41, and is incorporated in the operating system and loaded into a predetermined area of the RAM 32 in response to power supply to the computer 10. The computer program of the virtual printer driver 110 may be stored in another portable recording medium (carriable recording medium), such as a CD-ROM, a magneto-optic disc, or an IC card, in place of the floppy disk 22. This computer program may be program data, which are downloaded from a specific server connecting with an external computer network (for example, the Internet) via the computer network and transferred to either the RAM 32 or the HDD 41.

The printers 60, 70, and 80 are laser printers that paints a drum with a laser beam to form an image, which is developed by a toner and transferred onto a sheet. Diverse printers like ink jet printers and thermal transfer printers may alternatively be applied for the printers 60, 70, and 80.

A2. Distributed Printing Process

In the computer system of the above configuration, the computer main body 16 generates print data to be printed and carries out a distributed printing process to distribute the generated print data into the printers 60, 70, and 80 connecting with the computer main body 16 for printing. The details of the distributed printing process are discussed below.

Figure 2:
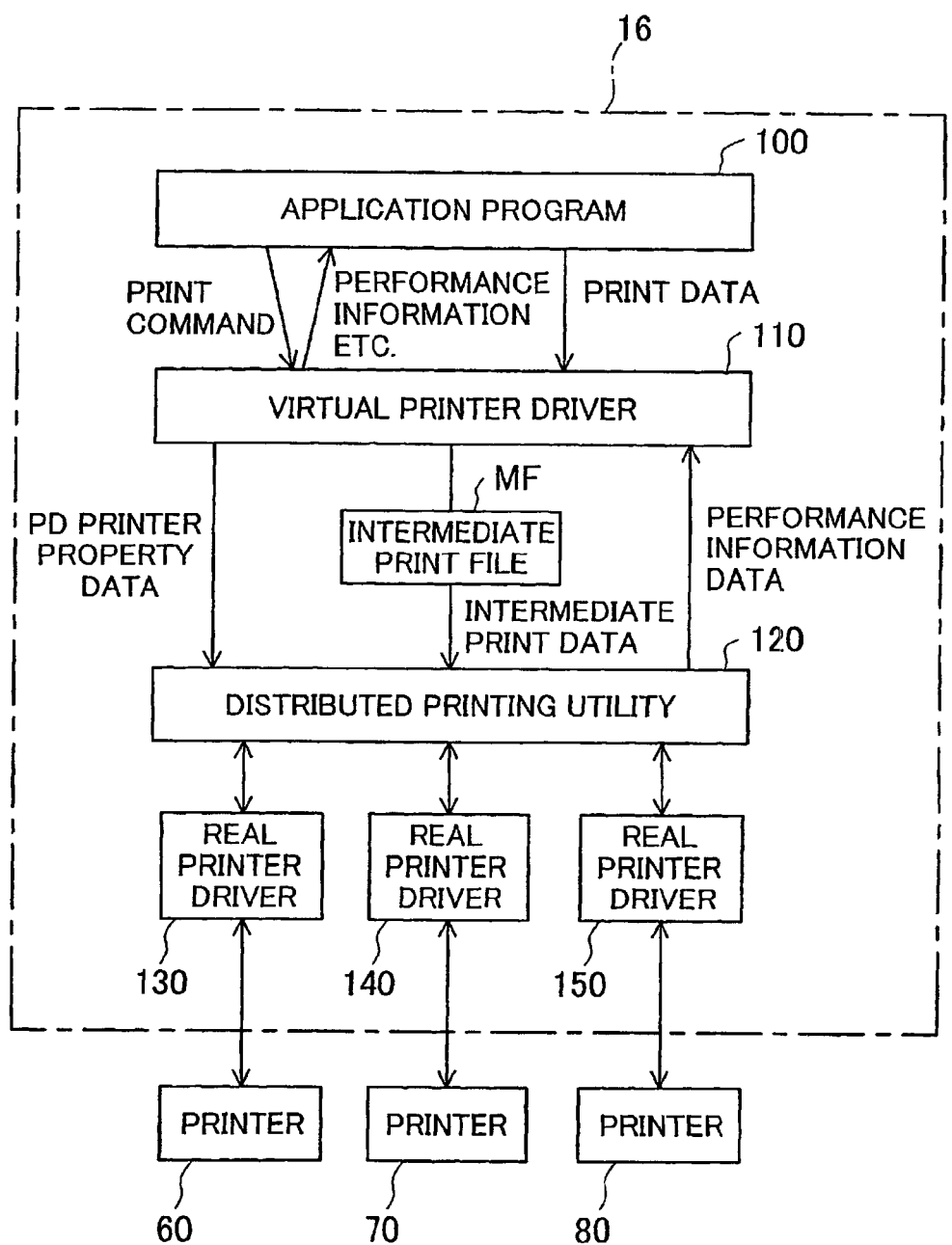
FIG. 2 is a block diagram schematically illustrating the general flow of a distributed printing process.
Figure 3:
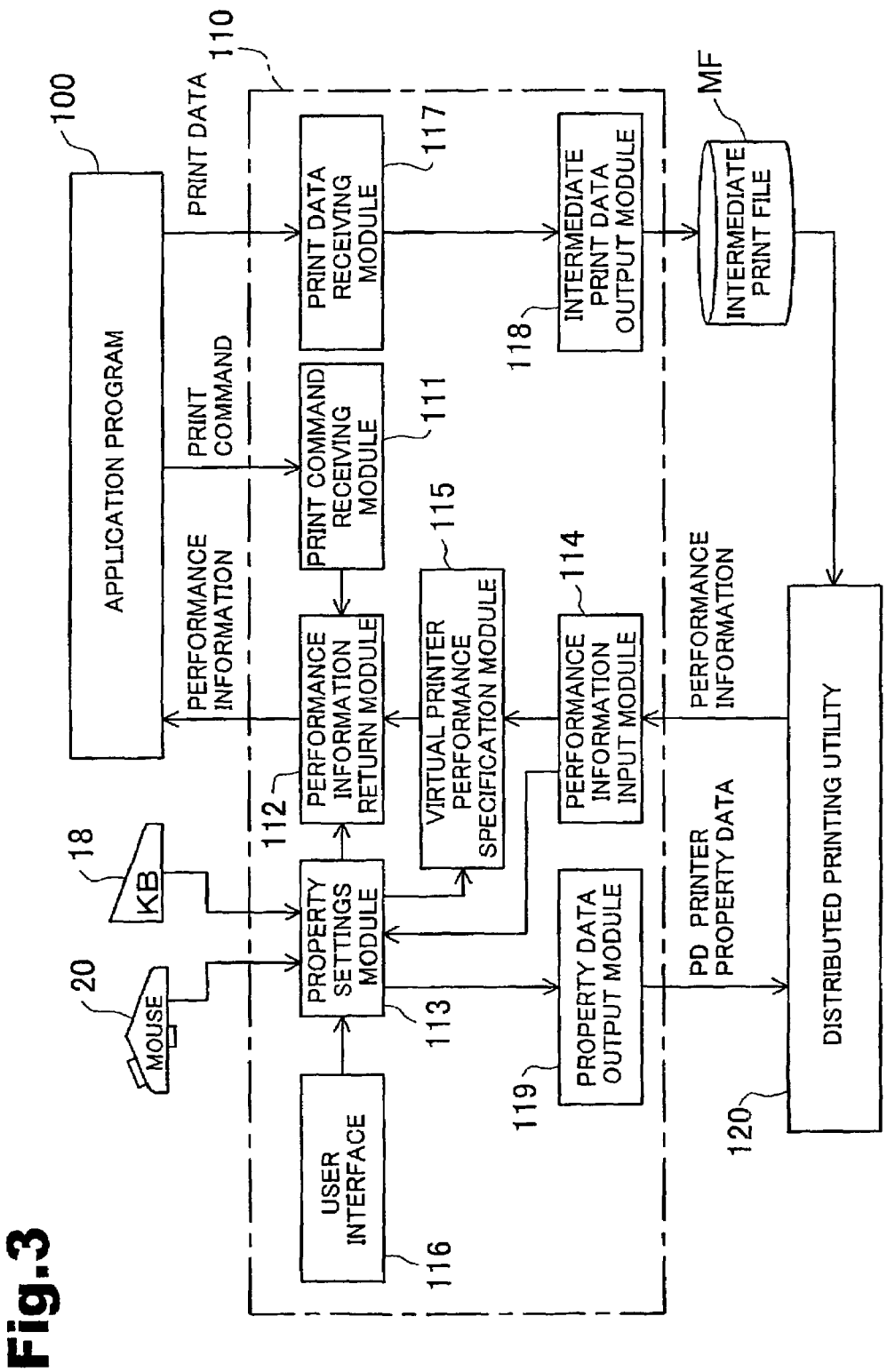
FIG. 3 is a block diagram showing the functions of a virtual printer driver 110 in the distributed printing process.
Figure 4:
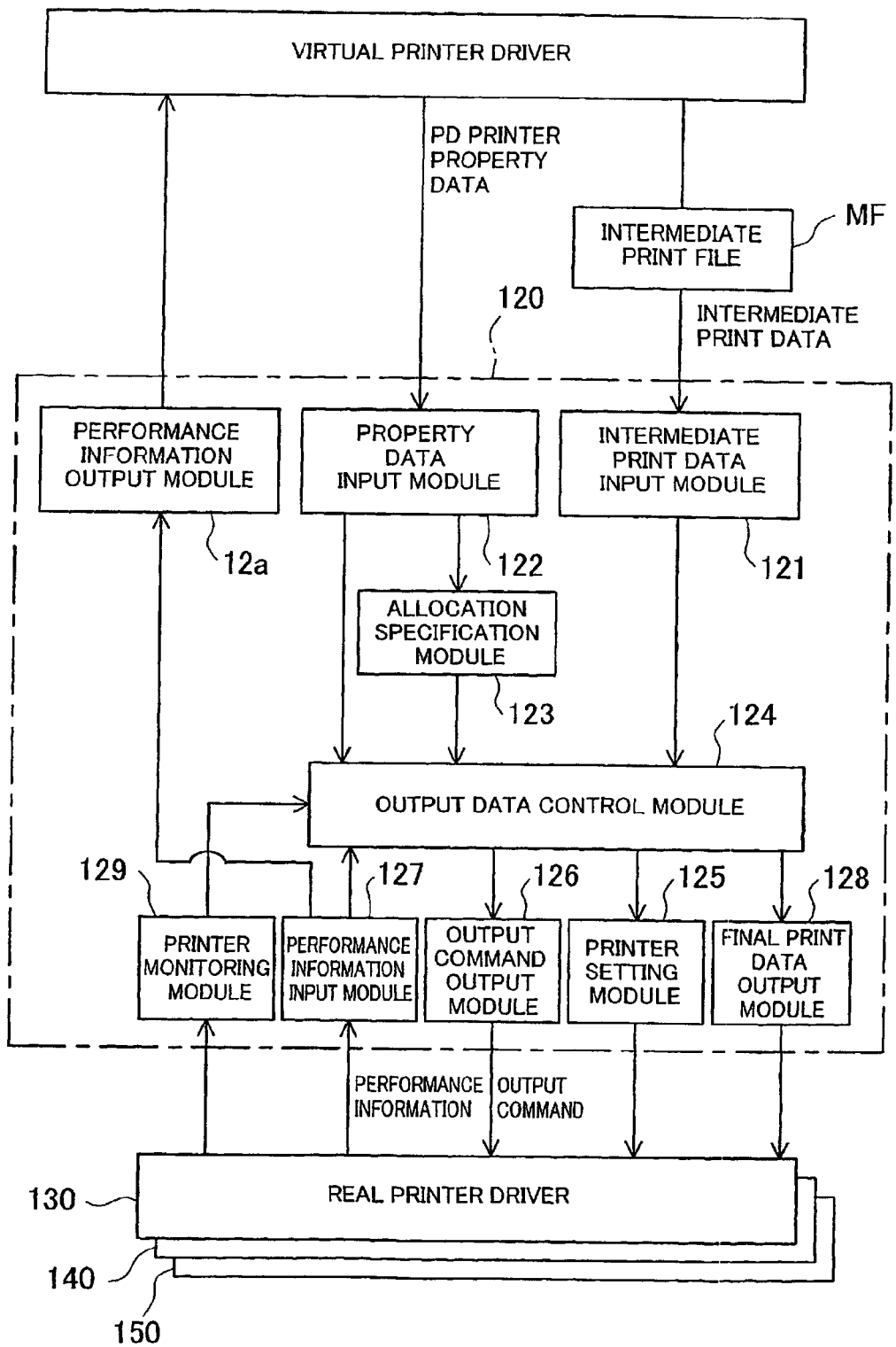
FIG. 4 is a block diagram showing the functions of a distributed printing utility 120, which actualizes part of the distributed printing process.

FIG. 2 is a block diagram schematically illustrating the general flow of the distributed printing process. FIG. 3 is a block diagram showing the functions of the virtual printer driver 110 in the distributed printing process. FIG. 4 is a block diagram showing the functions of a distributed printing utility program (hereinafter simply referred to as the 'distributed printing utility) 120, which actualizes part of the distributed printing process.

Referring to FIG. 2, an application program 100 working inside the computer main body 16 carries out image processing to generate video data (or document data by documentation process) and issues a print command to make the video data printed. In response to output of the print command from the application program 100, the virtual printer driver 110 receives the print command and returns performance information, which regards the performances of the virtual printer assumed by the virtual printer driver 110, to the application program 100. More specifically, as shown in FIG. 3, a print command receiving module 111 of the virtual printer driver 110 receives the print command output from the application program 100, and a performance information return module 112 returns the performance information regarding the performances of the virtual printer in response to receipt of the print command by the print command receiving module 111.

The performances of the virtual printer represent the performances of the highest-performance printer among all the available printers as destinations of distribution. In general, the high-performance printer applies a high-quality program language for drawing. For example, the high-quality program language uses complicated drawing commands based on mathematical expressions to express figures, whereas a lower-quality program language uses simple drawing commands based on bitmaps to express figures. In this embodiment, the performances of the highest-performance printer among all the available printers as the destinations of distribution are set to the performances of the virtual printer. This arrangement enables the virtual printer driver 110 to carry out a data conversion process (rendering process) in the high-quality program language. Since the high-quality program language uses the complicated drawing command as mentioned above, the virtual printer driver 110 is capable of actualizing the efficient rendering process for the highest-performance printer.

The available printers as the destinations of distribution are printers belonging to a specific printer group set by a properties setting module 113 among all the printers connected to the computer main body 16 locally or via the network. Here the printers 60, 70, and 80 are the available printers. In this embodiment, in the case where these three printers 60, 70, and 80 are an identical type, the performances of one printer out of these three are set to the performances of the virtual printer.

More specifically, a performance information input module 114 receives the performance information of the respective printers 60, 70, and 80, which has been transmitted from the real printer drivers 130, 140, and 150 provided for the respective types of the printers 60, 70, and 80 (only one real printer driver 130 is provided when the printers 60, 70, and 80 are of an identical type) to the distributed printing utility 120. A virtual printer performance specification module 115 extracts the highest performance from the performance information of the respective printers 60, 70, and 80 and specifies the extracted performance as performance information of the virtual printer. The performance information return module 112 returns the performance information of the virtual printer to the application program 100.

The performance information specified by the virtual printer driver 110 may be arbitrarily selected among the performance information of the respective printers 60, 70, and 80, instead of the performance of the highest-performance printer adopted in this embodiment. The performance information of the virtual printer may otherwise be preset performance information that does not depend upon the performance information of the respective printers 60, 70, and 80. In the case where the respective printers 60, 70, and 80 have identical performance information, the performance information of the printer 60 input first is set to the performance information of the virtual printer.

In the virtual printer driver 110, the properties setting module 113 activates a user interface 116 to set and store various pieces of information required for printing. Some of the various pieces of information required for printing are returned, together with the performance information, to the application program 100 via the performance information return module 112. The various pieces of information required for printing include, for example, information with regard to the basic settings of printing like the printing quality, the color correction, and the type of halftoning, information with regard to the settings of paper like the paper size and the printing orientation, information with regard to the printer group specifying available printers as destinations of distribution, and information with regard to the distributed form in the distributed printing process. Among these pieces of information, the information excluding those with regard to the printer group and the distributed form is sent to the application program 100.

The application program 100 receives the performance information and other pieces of information mentioned above, converts the generated video data into print data adequate for the printer (the virtual printer) based on the input performance information and the other pieces of information, and transmits the converted print data to the virtual printer driver 110. The conversion of the print data carried out here follows the efficient rendering process as described previously, while neither color conversion nor halftoning process carried out by the real printer driver is performed here.

Referring to FIG. 2, the virtual printer driver 110 sets the print data transmitted from the application program 100 as intermediate print data and temporarily stores a data set or a collection of the intermediate print data in the HDD 41 as an intermediate print file MF. More specifically, as shown in FIG. 3, a print data receiving module 117 receives the print data transmitted from the application program 100, and an intermediate print data output module 118 specifies the input print data as intermediate print data and outputs the intermediate print data in the form of an intermediate print file MF to the HDD 41.

In the case where the available printers 60, 70, and 80 as the destinations of distribution are of an identical type, the virtual printer driver 110 calls the real printer driver corresponding to the identical type of the printers, and carries out the same series of data conversion as that of the real printer driver 130. Namely when the available printers 60, 70, and 80 as the destinations of distribution are of the identical type, the intermediate print data is substantially equal to final print data obtained by one real printer driver 130. The final print data obtained by the real printer driver 130 represents the print data output from the real printer driver 130 in response to a direct printing instruction given from the application program 100 to the real printer driver 130 of the respective printers 60, 70, and 80. The final print data has undergone color conversion, halftoning, and other required processing suitable for each printer, which are not carried out by the virtual printer driver 110. The intermediate print data is substantially equal to the final print data, because of the following reason. When the available printers 60, 70, and 80 are of the identical type, the virtual printer driver 110 returns the performance information compatible with any of the printers 60, 70, and 80 to the application program 100 and accordingly exerts the identical functions with those of the real printer driver 130.

The intermediate print file MF may be stored in the RAM 32, in the floppy disk 22, or even in another external storage device, instead of the HDD 41. The distributed printing utility 120 reads the intermediate print data in the intermediate print file MF. The virtual printer driver 110 also transmits the various pieces of information set by the properties setting module 113 as printer property data PD to the distributed printing utility 120 via a property data output module 119. The printer property data PD is mapped to the intermediate print file MF and stored in the HDD 41.

Referring back to FIG. 2, the distributed printing utility 120 receives the intermediate print data constituting the intermediate print file MF and the printer property data PD and allocates the intermediate print data to the respective printers 60, 70, and 80 according to the information with regard to the printer group and the distributed form included in the printer property data PD, and transmits the allocation to the real printer drivers 130, 140, and 150 provided corresponding to the respective printers 60, 70, and 80. This series of processing carried out by the distributed printing utility 120 is discussed in detail.

In the distributed printing utility 120, as shown in FIG. 4, an intermediate print data input module 121 first inputs the intermediate print data constituting the intermediate print file MF, whereas a property data input module 122 receives the printer property data PD transmitted from the virtual printer driver 110. An allocation specification module 123 specifies allocation of the intermediate print data, based on the information with regard to the printer group and the distributed form included in the printer property data PD. Here the allocation means to group the intermediate print data by the unit of each page and specify pages to be printed with the printers 60, 70, and 80 belonging to the specific printer group.

The allocation information thus specified is transmitted to an output data control module 124. The output data control module 124 actually allocates and outputs the respective pages of the intermediate print data, which has been input into the intermediate print data input module 121, to the real printer drivers 130, 140, and 150 of the respective printers 60, 70, and 80, based on the transmitted allocation information. The data output to the real printer drivers 130, 140, and 150 follows the series of processing discussed below.

The procedure first determines whether or not all the available printers as destinations of distribution are of an identical type. When it is determined that the available printers are not of the identical type but different types, the following series of processing is carried out. A printer setting module 125 first gives an instruction to change the settings via the real printer drivers 130, 140, and 150 to the printers specified as the destinations of allocation based on the allocation information. An output command output module 126 issues an output command to the real printer drivers 130, 140, and 150 corresponding to the printers specified as the destinations of allocation. A performance information input module 127 receives the performance information regarding the performances of the respective printers 60, 70, and 80 returned from the real printer drivers 130, 140, and 150 in response to the output command.

The output data conversion module 124 converts the allocating pages of the intermediate print data into data suitable for the printers 60, 70, and 80 specified as the destinations of allocation, based on the performance information transmitted from the performance information input module 127 as well as the information with regard to the basic settings of printing and the information with regard to the paper settings included in the printer property data PD (excluding the information with regard to the printer group and the distributed form) transmitted from the property data input module 122 (hereinafter this process of data conversion is referred to as the rendering process). The output data control module 124 sends the converted print data as final print data to the real printer drivers 130, 140, and 150 via a final print data output module 128. The real printer drivers 130, 140, and 150 cause the final print data to undergo a required series of processing, such as color conversion or halftoning, suitable for each printer, which is not carried out by the virtual printer driver, and transmit the processed final print data to the corresponding printers 60, 70, and 80.

When it is determined that the available printers as the destinations of distribution are of the identical type, on the other hand, the following series of processing is carried out. The printer setting module 125 first gives an instruction to change the settings via the real printer drivers 130, 140, and 150 to the printers 60, 70, and 80 specified as the destinations of allocation based on the allocation information. The procedure then transmits the allocated pages of the intermediate print data via the final print data output module 128 to the real printer driver 130 of the available printers 60, 70, and 80 specified as the destinations of allocation based on the allocation information. In the case where all the available printers 60, 70, and 80 are of the identical type, the intermediate print data has undergone the required processing like color conversion or halftoning as mentioned above. The real printer driver 130 thus transmits the intermediate print data as the final print data to the respective printers 60, 70, and 80.

The distributed printing utility 120 has a printer monitoring module 129, which monitors the conditions of the respective printers 60, 70, and 80, based on signals output from the real printer drivers 130, 140, and 150. The real printer drivers 130, 140, and 150 detect the current working status of the respective printers 60, 70, and 80. The printer monitoring module 129 receives signals representing the working status from the real printer drivers 130, 140, and 150 and monitors the length of a waiting queue and occurrence of any error (for example, failure, paper jam, or out-of-paper) in each of the printers 60, 70, and 80 based on the input working status. The output data control module 124 receives signals output from the printer monitoring module 129 and changes the output resource of the allocated print data or stops the output with regard to the printer having a long waiting queue or being in any error state.

The performance information of the respective printers 60, 70, and 80 transmitted from the real printer drivers 130, 140, and 150 is utilized by the distributed printing utility 120 as described above, while being transmitted to the virtual printer driver 110 via a performance information output module 12a.

A3. Virtual Printer Driver

The following describes a change in state of the operating system when the virtual printer driver 110 is installed in the computer 10. The description regards an example wherein Windows95 (trade mark by Microsoft Inc.) is adopted as the operating system, on which the virtual printer driver 110 works.

Figure 5:
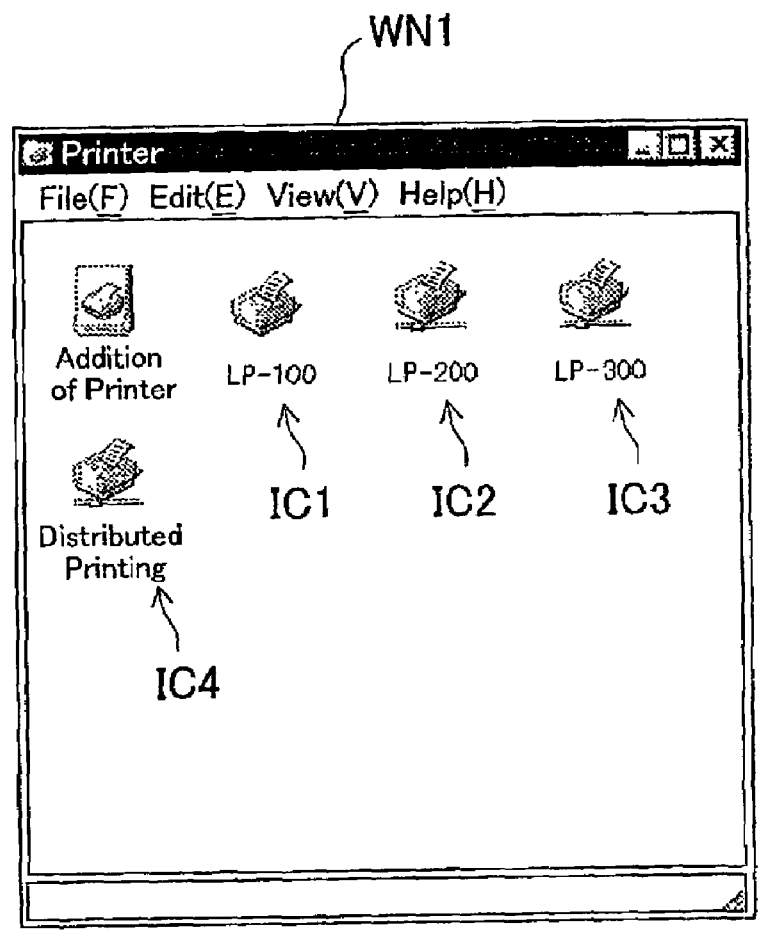
FIG. 5 illustrates a 'Printer' window WN1.

The user (operator) operates the computer 10 in the following sequence to open a dialog box for setting various pieces of information required for printing on the screen of the CRT display 12. The sequence of operations 'Start'→'Settings'→'Printer' opens a 'Printer' window. FIG. 5 shows this 'Printer' window. In the case where the virtual printer driver 110 is installed in the computer 10, an icon IC4 that corresponds to the virtual printer driver 110 and is expressed as, for example, 'Distributed Printing' is displayed in the illustrated 'Printer' window WN1, in addition to icons IC1, IC2, and IC3 representing the real printer drivers 130, 140, and 150 individually provided for the respective types of the printers 60, 70, and 80. Like the real printer driver, installation of the virtual printer driver 110 causes the icon IC4 corresponding to the virtual printer driver 110 to be displayed in the 'Printer' window WN1.

The operator double clicks the icon IC4 'Distributed Printing' corresponding to the virtual printer driver 110 on the 'Printer' window WN1 to open a window of the virtual printer driver 110 and clicks 'Printer' and 'Properties' in the window. This series of operations opens a dialog box 'Distributed Printing Properties' for setting various pieces of information with regard to the virtual printer. The operator can input the settings of the various pieces of information in the dialog box 'Distributed Printing Properties' through the operations of the mouse 20 and the keyboard 18. This dialog box 'Distributed Printing Properties' corresponds to the user interface 116 mentioned previously.

A4. User Interface

Figure 6:
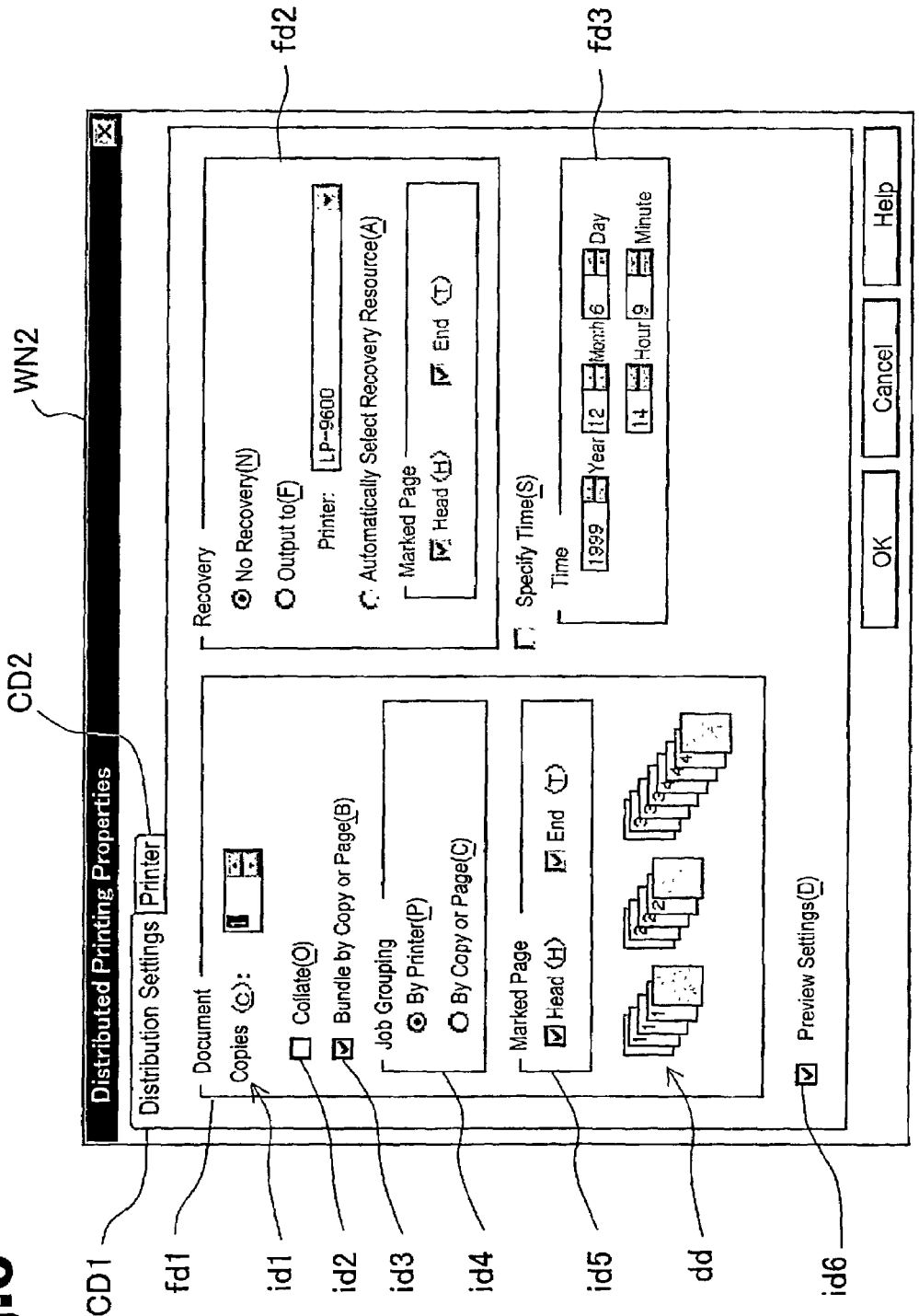
FIG. 6 illustrates a 'Distribution Settings' card CD1 displayed on a 'Distributed Printing Properties' dialog box WN2.

FIG. 6 illustrates the dialog box WN2 'Distributed Printing Properties'. Two cards CD1 'Distribution Settings' and CD2 'Printer' are provided in the dialog box WN2 'Distributed Printing Properties'. The 'Distribution Settings' card CD1 is used to set the information with regard to the distributed form in the distributed printing process. The 'Printer' card CD2 is used to set the information with regard to the printer group as the potential destinations of distribution, the basic settings of printing, and the paper settings. The operator selects either of the two cards CD1 and CD2 to be displayed in the dialog box WN2 through operations of the mouse 20. In the state of FIG. 6, the 'Distribution Settings' card CD1 is selected. The division of the information into the cards CD1 and CD2 is not restricted to the above example, but the information may all be included in one card or may be divided into three or more cards.

As illustrated, the 'Distribution Settings' card CD1 includes three fields 'Document', 'Recovery', and 'Time' fd1, f2, and fd3. The 'Document' field fd1 is used to set the specification of printing a document, and has a data input box id1 'Copies', a check box id2 'Collate', a check box id3 'Bundle by Page or Copy', a data input box id4 'Job Grouping', and a data input box id5 'Marked Page'. The respective data input boxes (including check boxes in the following description) id1 to id5 are designed in the following specification:

1) 'Copies' Data Input Box id1:

The number of copies to be printed is input in this data input box. The default is the setting by the application program 100.

2) 'Collate' Check Box id2:

Gathering print is selected by checking this check box id2, and otherwise stack print is selected. The gathering print carries out printing by the unit of copy and in the order of pages in each copy. The stack print, on the other hand, carries out printing by the unit of page and by the number of copies in each page. Namely printing is carried out by the unit of copy when the check box id2 is checked, while being carried out by the unit of page when the check box id2 is not checked.

3) 'Bundle by Copy or Page' Check Box id3:

A check in this check box id3 prohibits one copy or one set of identical pages from being printed with multiple printers. No check in the check box id3, on the other hand, allows the copy or the set of identical pages to be printed with multiple printers.

4) 'Job Grouping' Data Input Box id4:

When one radio button 'By Printer' is selected in this data input box id4, all the pages output from one printer are handled as one group. The selection of this radio button prevents the results of a user's specified print job from being mixed with the results of printing required by another user in the share computer 70 or 80 connecting with the network. When the other radio button 'By Copy or Page' is selected, one copy or one set of identical pages is handled as one group. The latter is utilized in the case where a user's specified print job is distributed to the local printer 60 or in the case where no problem arises even if the results of the print job are mixed with the results of printing required by another user.

5) 'Marked Page' Data Input Box id5:

The marked page represents a head page or an end page of each group to allow discrimination in the case where resulting prints of a specified group are mixed with resulting prints required by another user. In response to a check in a 'Head' check box, the marked page is printed at the head position of each group. In response to a check in an 'End' check box, on the other hand, the marked page is printed at the end position of each group. The name of the document to be printed, the number of copies, the total number of pages, and the name of the user are printed on the marked page.

The 'Document' field fd1 includes a distributed form display box dd representing the distributed form specified by the settings in the data input boxes id1 to id 5, in addition to the data input boxes id1 to id5 discussed above. An illustrated image in the distributed form display box dd shows the distributed form specified by the settings in the data input boxes id1 to id5.

Figure 7:
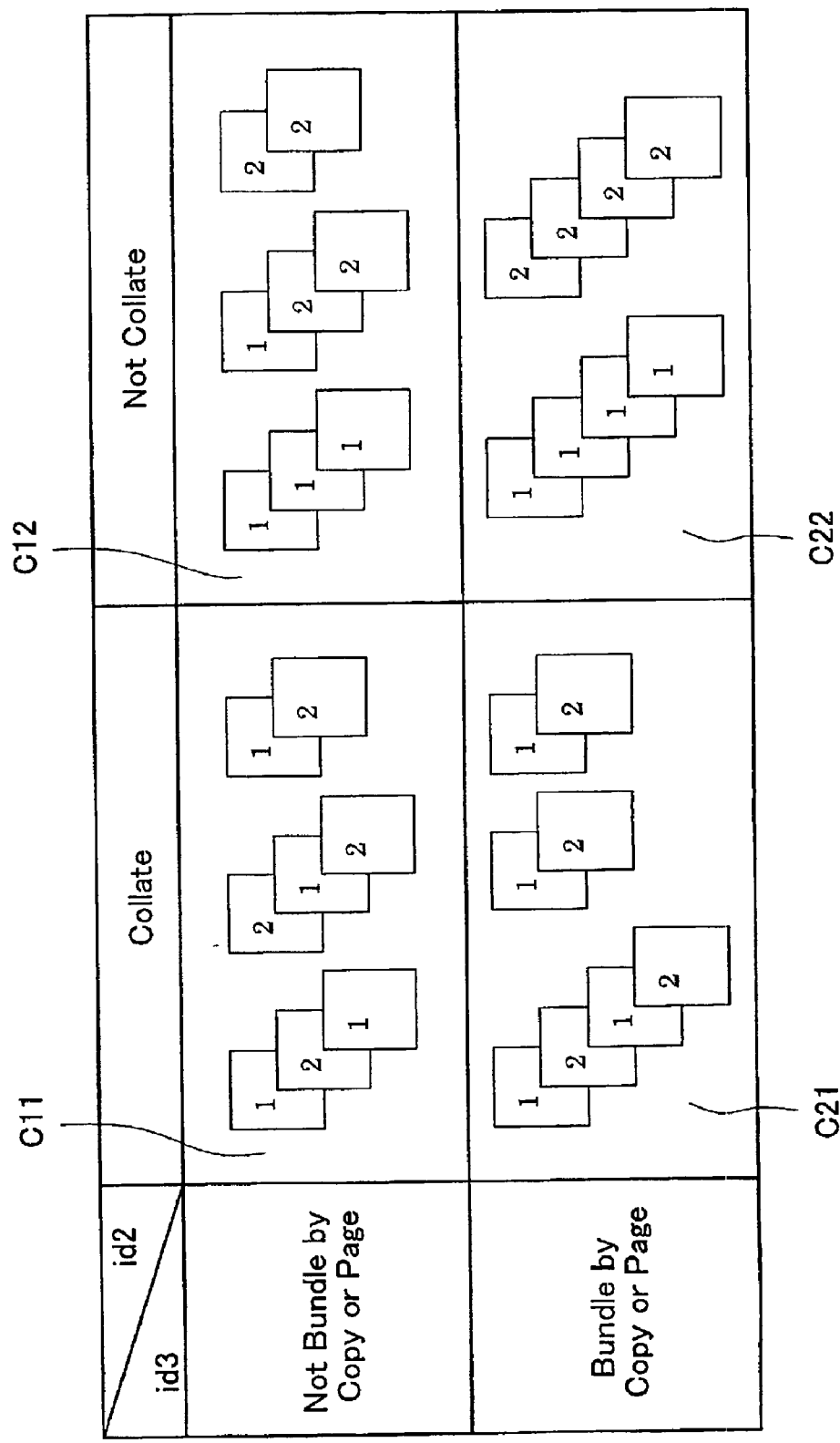
FIG. 7 shows a change of an illustrated image in a distributed form display box by the combination of the settings in data input boxes id1 to id3.
Figure 8:
FIG. 8 shows a change of the illustrated image in the distributed form display box by the combination of the settings in data input boxes id4 and id5.

The following describes a change of the illustrated image in the distributed form display box dd by the combination of the settings in the data input boxes id1 to id5 with reference to FIGS. 7 and 8. The description first regards a change of the illustrated image by the combination of the settings in the 'Copies' data input box id1, the 'Collate' check box id2, and the 'Bundle by Copy or Page' check box id3.

FIG. 7 shows a change of the illustrated image in the distributed form display box dd by the combination of the settings in the data input box id1 and the two check boxes id2 and id3. In the illustration of the table, the columns show whether or not the print job is to be collated, that is, the on-off settings in the 'Collate' check box id2. The rows show whether or not the print job is to be bundled by copy or page, that is, the on-off settings in the 'Bundle by Copy or Page' check box id3. In the example of the table, it is assumed that the number of copies set in the 'Copies' data input box id1 is four copies.

In the combination of 'Collate' and not 'Bundle by Copy or Page', the gathering print is selected. As shown in a cell C11 of the first row and the first column in the table, the illustrated image shows that the $1^{st}$ and the $2^{nd}$ pages of the $1^{st}$ copy and the $1^{st}$ page of the $2^{nd}$ copy are printed with the first printer 60, that the $2^{nd}$ page of the $2^{nd}$ copy and the $1^{st}$ and the $2^{nd}$ pages of the $3^{rd}$ copy are printed with the second printer 70, and that the $1^{st}$ and the $2^{nd}$ pages of the $4^{th}$ copy are printed with the third printer 80.

In the combination of not 'Collate' and not 'Bundle by Copy or Page', the stack print is selected. As shown in a cell C12 of the first row and the second column in the table, the illustrated image shows that three copies of the $1^{st}$ page are printed with the first printer 60, that the remaining copy of the $1^{st}$ page and two copies of the $2^{nd}$ page are printed with the second printer 70, and that the remaining copies of the $2^{nd}$ page are printed with the third printer 80.

In the combination of 'Collate' and 'Bundle by Copy or Page', printing each specified group with multiple printers is prohibited. As shown in a cell C21 of the second row and the first column in the table, the illustrated image shows that the $1^{st}$ page of the $1^{st}$ copy to the $2^{nd}$ page of the $2^{nd}$ copy are printed with the first printer 60, that the $1^{st}$ and the $2^{nd}$ pages of the $3^{rd}$ Copy are printed with the second printer 70, and that the $1^{st}$ and the $2^{nd}$ pages of the $4^{th}$ copy are printed with the third printer 80.

In the combination of not 'Collate' and 'Bundle by Copy or Page', as shown in a cell C22 of the second row and the second column in the table, the illustrated image shows that the required number of copies of the $1^{st}$ page are printed with the first computer 60 and that the required number of copies of the $2^{nd}$ page are printed with the second computer 70.

The description then regards a further change of the illustrated image specified by the settings in the data input boxes id1 to id3 by the combination of the settings in the 'Job Grouping' data input box id4 and the 'Marked Page' data input box id5. FIG. 8 shows a change of the illustrated image in the distributed form display box dd by the combination of the data input boxes id4 and id5. The example of FIG. 8 shows a further change of the illustrated image, which is specified by the settings in the data input boxes id1 to id3 in the cell C11 of FIG. 7, by the combination of the settings in the data input boxes id4 and id5.

In the table of FIG. 8, the columns show the settings in the 'Job Grouping' data input box id4, that is, selection of either 'By Printer' or 'By Copy or Page'. The rows show the settings in the 'Marked Page' data input box id5, that is, checks in the two check boxes 'Head' and 'End'.

In the case of a click of the radio button 'By Printer' in the 'Job Grouping' data input box id4, as shown by a cell CE11 of the first row and the first column in the table, the illustrated image in the cell C11 of FIG. 7 is not changed and all the pages printed with one printer are handled as one group. In the case of a click of the other radio button 'By Copy or Page', on the other hand, as shown by a cell CE12 of the first row and the second column, each copy or each page is handled as one group and distinguished from a subsequent group. In the actual services, since no marked page is selected, the same printing results are obtained both in the case of the click of the radio button 'By Printer' and in the case of the click of the other radio button 'By Copy or Page'.

When the marked page is specified in the 'Marked Page' data input box id5, on the other hand, as shown by the second, the third, and the fourth rows in the table, the illustrated image is changed to make the marked pages (closed figures in the table) are inserted at the head, at the end or at both the head and the end of the respective groups specified in the first row. The illustrated image specified by this table is displayed in the distributed form display box dd.

Referring back to FIG. 6, the 'Recovery' field fd2 specifies another printer as a recovery resource in the case of occurrence of any error in the printer specified for distributed printing. The 'Recovery' field fd2 has three radio buttons 'No Recovery', 'Output to', and 'Automatically Select Recovery Resource'. In the case of selection of the 'No Recovery' radio button, no recovery is performed even when an error occurs in the printer specified for distributed printing. In the case of selection of the 'Output to' radio button, the output resource input in a 'Printer' data input box is set to the recovery resource. In the case of selection of the 'Automatically Select Recovery Resource' radio button, the same type of a printer as the printer with the error is set to the recovery resource. When there is no same type of printer, an available printer is set to the recovery resource.

The 'Time' field fd3 specifies the time of printing. When a check box 'Specify Time' is checked, the printing operation starts at the time specified in the 'Time' field fd3.

There is a check box 'Preview Settings' id6 in the lower-most part of the 'Distribution Settings' card CD1. When this check box id6 is checked, the dialog box WN2 'Distributed Printing Properties' is displayed again. The display enables the operator to confirm and change the current settings prior to the actual printing operation. When the check box id6 is not checked, on the other hand, the dialog box WN2 'Distributed Printing Properties' is not displayed prior to the actual printing operation.

Figure 9:
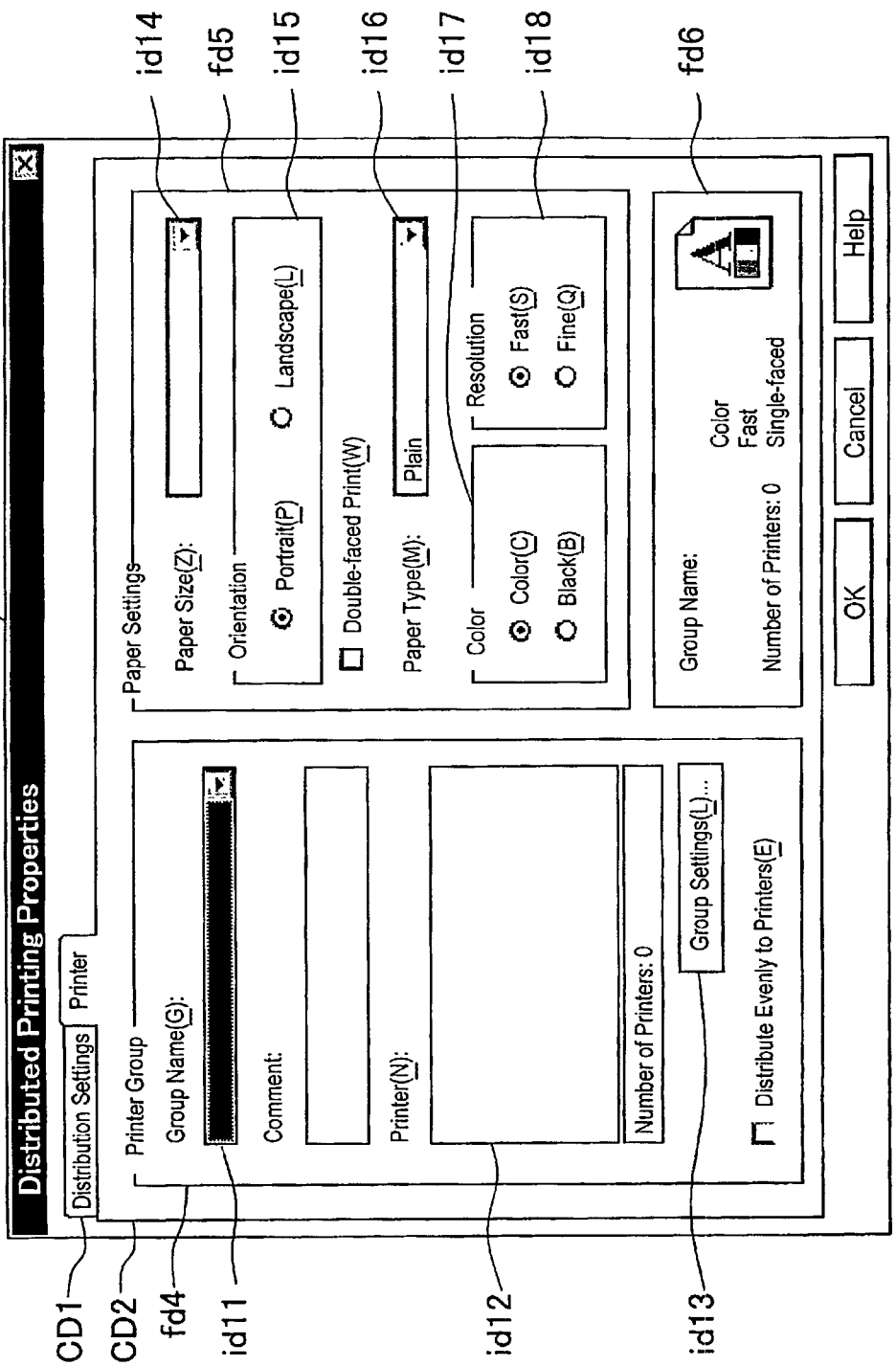
FIG. 9 illustrates a 'Printer' card CD2 displayed on the 'Distributed Printing Properties' dialog box WN2.

The following describes the 'Printer' card CD2 on the 'Distributed Printing Properties' dialog box WN2 with reference to FIG. 9. As illustrated in FIG. 9, the 'Printer' card CD2 includes a 'Printer Group' field fd4, and 'Paper Settings' field fd5, and a settings display box fd6.

The 'Printer Group' field fd4 specifies a group of printers, which are used for distributed printing of a document and has a 'Group Name' data input box id11, a 'Printer' display box id12, and a 'Group Setting' button id13. The 'Group Name' data input box id11 sets the name of the printer group and preset group names are provided as possible options. The 'Printer' display box id12 displays the names of the printers belonging to the printer group set in the 'Group Name' data input box id11. A click of the 'Group Setting' button id13 opens a non-illustrated new window and accepts user's data input, so as to allow addition and deletion of an option to and from the options provided in the 'Group Name' data input box id11. The computer 10 gives an instruction of distributed printing to all the printers belonging to the printer group specified in the 'Printer Group' field fd4, that is, the respective printers displayed in the 'Printer' display box id12. Among all the printers connected to the computer main body 16 locally or via the computer network 90, the printers included in the printer group specified in the 'Printer Group' field fd4 are thus set as the destinations of distributed printing. In the following description, it is assumed that the printer group including the three printers 60, 70, and 80 is specified.

The 'Paper Settings' field fd5 sets the paper and the printing quality and has data input boxes 'Paper Size' 'Orientation', 'Paper Type', 'Color', and 'Resolution' id14, id15, id16, and id17.

The 'Paper Size' data input box id14 sets the paper size, and examples of possible options include 'A4 210×297 mm', 'A4 Lateral 210×297 mm', 'Envelop 120×235 mm', and 'Postcard 100×147 mm'. The 'Orientation' data input box id15 represents the orientation of paper set in the printer and has two options 'Portrait' and 'Landscape'. The 'Paper Type' data input box id16 specifies the type of paper, and 'Plain', 'Superfine', and 'Glossy' are provided as possible options. The 'Color' data input box id17 specifies the type of ink used in the printer 14, and 'Color' and 'Black' are provided as possible options. The 'Resolution' data input box id18 sets the printing resolution, and 'Fast' and 'Fine' are provided as possible options. Here 'Fast' and 'Fine' respectively represent the resolutions of 360×360 (dots) and 720×720 (dots).

The settings display box fd6 displays desired data among the settings in the 'Printer Group' field fd1 and the 'Paper Settings' field fd5.

Various pieces of information regarding the settings in the 'Distributed Printing Properties' dialog box WN2 are input as printer property data into the computer main body 16 through the user's operations of the mouse 20 and the keyboard 18. The acceptance of the input data is restricted according to the performance information of the respective printers 60, 70, and 80. For example, when the performance information of the respective printers 60, 70, and 80 specifies the printable size up to A4 in all the printers 60, 70, and 80, paper sizes of greater than A4 are excluded from the options in the 'Paper Size' data input box id14 in the 'Distributed Printing Properties' dialog box WN2. Namely the input data regarding paper sizes of greater than A4 is not acceptable.

A5. Computer Programs

The respective modules 111 through 119 in the virtual printer driver 110 shown in FIG. 3 are actualized by the virtual printer driver 110 as the computer program and series of processing executed by the CPU 30 according to the virtual printer driver 110. The respective modules 121 through 129 in the distributed printing utility 120 shown in FIG. 4 are actualized by the distributed printing utility 120 as the computer program and series of processing executed by the CPU 30 according to the distributed printing utility 120.

Like the virtual printer driver 110, the distributed printing utility 120 is stored in advance in the floppy disk 22 and is installed from the floppy disk drive 24 into the computer 10 according to an activated preset installation program. The installed distributed printing utility 120 is stored in the HDD 41, and is incorporated in the operating system and loaded into a predetermined area of the RAM 32 in response to power supply to the computer 10. Like the virtual printer driver 110, the distributed printing utility 120 may be stored in another portable recording medium (carriable recording medium), such as a CD-ROM, a magneto-optic disc, or an IC card, in place of the floppy disk 22. The distributed printing utility 120 may be program data, which are downloaded from a specific server connecting with an external computer network (for example, the Internet) via the computer network and transferred to either the RAM 32 or the HDD 41.

Figure 10:
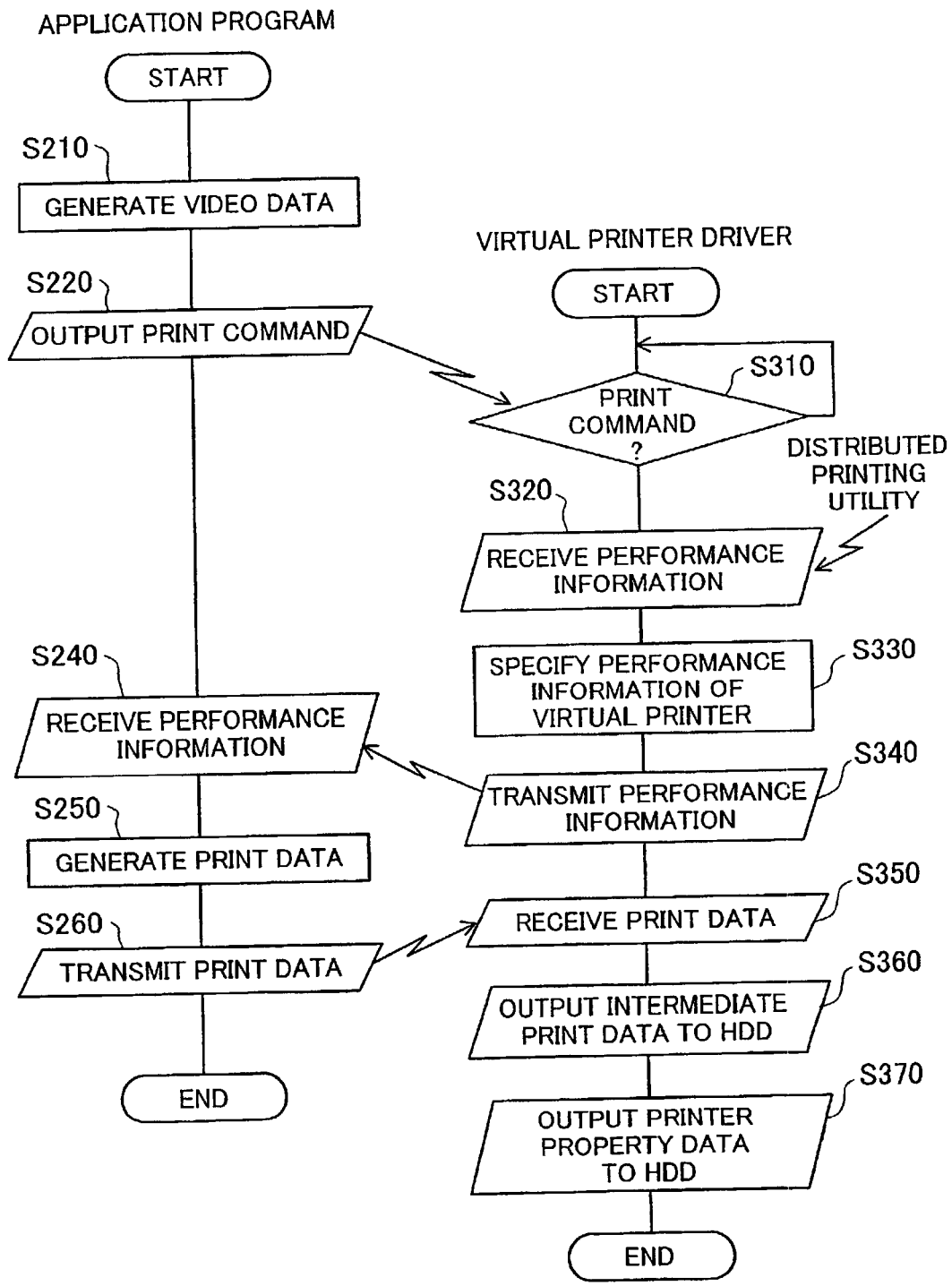
FIG. 10 is a flowchart showing a series of processing described in an application program 100 and a series of processing described in a virtual printer driver 110.

FIG. 10 is a flowchart showing a processing routine described in the virtual printer driver 110 as well as a processing routine described in the application program 100. The CPU 30 in the computer main body 16 starts the processing in the application program 100 and carries out a series of image processing to generate video data (step S210). The application program 100 may be a general purpose application program used to create documents and pictures, and video data is generated by the functions characteristic of each application program.

The CPU 30 executes a 'Print' command provided in the application program and thereby outputs a print command for distributed printing (step S220). More specifically, when the 'Print' command is activated, a 'Print' dialog box (not shown) is open on the CRT display 12. In response to a click of an 'OK' button, the application program outputs the print command to the virtual printer driver 110. When a 'Properties' button is clicked in this 'Print' dialog box, the processing routine according to the virtual printer driver 110 makes the 'Distributed Printing Properties' dialog box displayed and reads the input data from the keyboard 18 and the mouse 20 to set various pieces of information regarding the distributed printing. The print command is input after such setting. The print command may be output from the application program via the operating system.

In response to the output of the print command by the processing routine according to the application program 100, the CPU 30 shifts the processing to the virtual printer driver 110 and determines whether or not the print command is input from the application program 100 (step S310). In the case of no input of the print command, the CPU 30 iteratively carries out the decision at step S310 and waits for input of the print command from the application program 100. In the case of input of the print command at step S310, on the other hand, the CPU 30 carries out the series of processing discussed below.

The CPU 30 first reads from the distributed printing utility 120 the performance information of the respective printers 60, 70, and 80, which has been transmitted from the real printer drivers 130, 140, and 150 provided for the respective types of the printers 60, 70, and 80 to the distributed printing utility 120 (step S320). The CPU 30 then extracts the highest performance out of the performance information of the respective printers 60, 70, and 80 and specifies the extracted highest performance as the performance information of the virtual printer (step S330). In the case where the respective printers 60, 70, and 80 have identical performance information, the procedure of step S330 specifies the performance of any one printer selected out of the performance information of the respective printers 60, 70, and 80, for example, the performance information of the printer 60 input first, as the performance information of the virtual printer. The CPU 30 then transmits the performance information of the virtual printer to the application program 100 (step S340).

When the performance information of the virtual printer is transmitted from the virtual printer driver 110, the CPU 30 shifts the processing to the application program 100 and receives the transmitted performance information of the virtual printer (step S240). The CPU 30 subsequently converts the video data generated at step S210 into print data adequate for the virtual printer, based on the performance information as well as the information regarding the basic settings of printing and the information regarding the paper settings among the various pieces of information set and input in the virtual printer driver 110 (excluding the information regarding the printer group and the distributed form) (step S250).

As described above, when the printers 60, 70, and 80 are of different types, the conversion of the print data follows the efficient rendering process and does not include color conversion or halftoning executed by the real printer driver. When the printers 60, 70, and 80 are of an identical type, on the other hand, the real printer driver 130 corresponding to the identical type is called for data conversion, which includes color conversion and halftoning executed by the real printer driver 130. After the data conversion, the CPU 30 transmits the converted print data to the virtual printer driver 110 (step S260). On completion of the processing at step S260, the CPU 30 exits from the processing routine according to the application program 100.

When the print data adequate for the virtual printer is transmitted from the application program 100, the CPU 30 shifts the processing to the virtual printer driver 110 and receives the transmitted print data (step S350). The CPU 30 subsequently outputs the input print data as intermediate print data to the HDD 41 (step S360). A data set or a set of the intermediate print data is then stored as an intermediate print file MF into the HDD 41.

When the available printers 60, 70, and 80 as destinations of distribution are of an identical type, the intermediate print data stored in the intermediate print file MF is substantially identical with the final print data obtained by the real printer drivers 130, 140, and 150 provided for the respective printers 60, 70, and 80 as described previously. The procedure of step S360 accordingly writes flag data, which shows whether or not the intermediate print data is identical with the final print data, together with the intermediate print data into the intermediate print file MF. The determination of whether or not the intermediate print data is identical with the final print data may be based on the comparison among the performance information of the available printers 60, 70, and 80 as the destinations of distribution at step S330.

After the output of the intermediate print file MF to the HDD 41 at step S330, the CPU 30 outputs printer property data PD, which represents the various pieces of information set and input in the virtual printer driver 110, to the HDD 41 to be mapped to and stored with the intermediate print file MF (step S370). The CPU 30 here exits from the processing routine according to the virtual printer driver 110.

Figure 11:
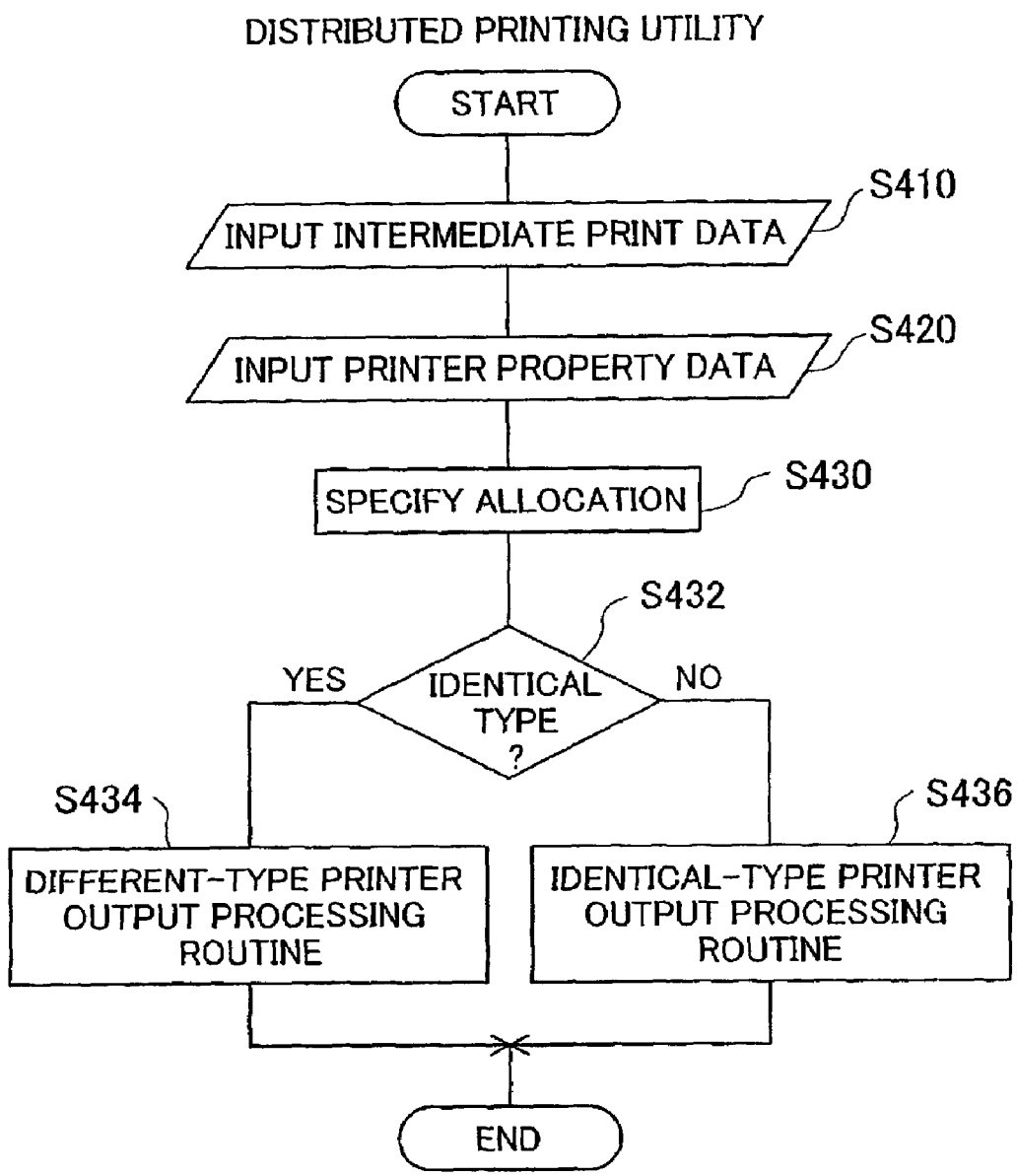
FIG. 11 is a flowchart showing a processing routine described in a distributed printing utility 120.

FIG. 11 is a flowchart showing a processing routine described in the distributed printing utility 120. This processing routine is automatically activated after conclusion of the processing routine according to the virtual printer driver 110. When the program enters this processing routine, the CPU 30 first reads the intermediate print data in the intermediate print file MF from the HDD 41 (step S410). The CPU 30 subsequently reads the printer property data PD, which represents the various pieces of information set in the virtual printer driver 110, from the HDD 41 (step S420).

The CPU 30 then specifies allocation of the intermediate print data input at step S410, based on the information with regard to the printer group and the distributed form included in the printer property data PD input at step S420 (step S430). The concrete procedure of step S430 divides the input intermediate print data by page and allocates the preset pages to the respective printers 60, 70, and 80 belonging to the specified printer group, in order to attain the distributed form set in the 'Distributed Printing Properties' dialog box WN2, that is, the distributed form displayed in the distributed form display box dd of the 'Distribution Settings' card CD1 shown in FIG. 8. Information regarding the preset pages allocated to the respective printers is stored as output resource list data into the RAM 32.

FIG. 12 shows an example of the output resource list data. In the illustrated example, the print job is given to make each of the three printers 60, 70, and 80 print one copy of a document including 3 pages. The $1^{st}$ to the $3^{rd}$ pages are set as the page numbers to be printed with each of the three printers 60, 70, and 80.

After the allocation of the respective pages to the output resources at step S430, the CPU 30 determines whether or not the available printers as the destinations of distribution are of an identical type (step S432). The determination is based on the value of the flag data included in the intermediate print file MF input at step S410. When the flag data has a value showing that the intermediate print data is identical with the final print data, the CPU 30 determines that the respective printers are of an identical type. When the flag data has the other value showing that the intermediate print data is different from the final print data, the CPU 30 determines that the respective printers are of different types. In the case of determination of the different types at step S432, a different-type printer output processing routine is carried out (step S434). In the case of determination of the identical type at step S432, on the other hand, an identical-type printer output processing routine is carried out (step S436). After execution of either step S434 or step S436, the program goes to END and exits from the processing of the distributed printing utility.

Figure 13:
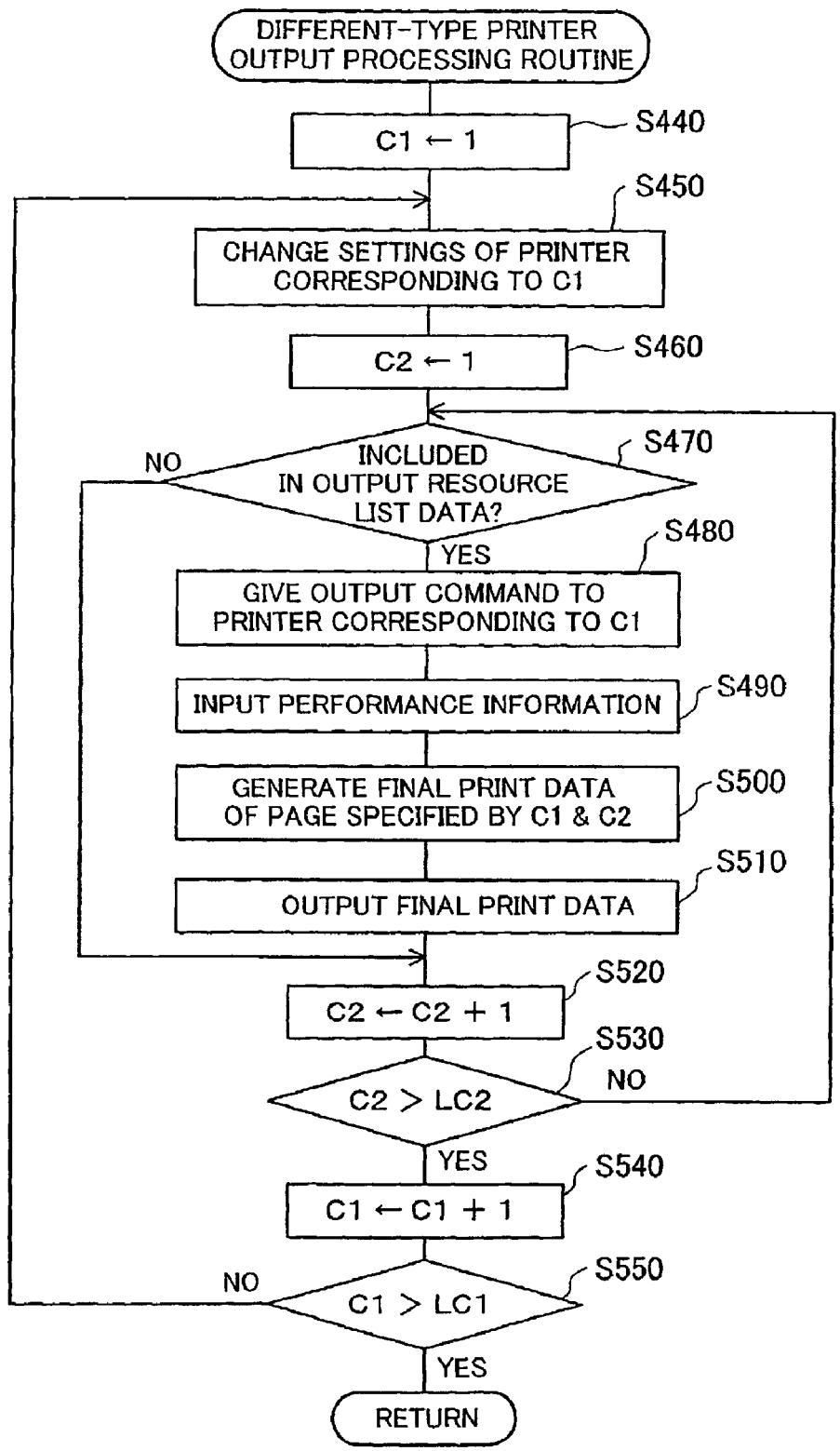
FIG. 13 is a flowchart showing the details of a different-type printer output processing routine.

FIG. 13 is a flowchart showing the details of the different-type printer output processing routine. The CPU 30 first sets a value '1' to a printer counter C1 representing a target printer used for printing (step S440). The printer counter C1 shows each available printer as the destination of distribution; the value '1' represents the first printer 60, the value '2' represents the second printer 70, and the value '3' represents the third printer 70.

The CPU 30 subsequently gives an instruction to change the settings to the printer specified by the value of the printer counter C1 (step S450). This processing makes the target printer ready for printing via the printer driver by transmitting the required information on the settings among the information with regard to the basic settings of printing and the information with regard to the paper settings included in the printer property data PD input at step S420 to the printer driver. For example, the procedure informs the printer driver of the paper type 'Glossy' to make the printer ready for printing suitable for the glossy paper.

The CPU 30 sets a value '1' to a page counter C2 representing the page number to be printed (step S460). The CPU 30 then determines whether or not the output resource list data obtained at step S430 includes the page allocated to the printer specified by the values of the printer counter C1 and the page counter C2 (step S470). When the result of the determination shows that the output resource list data includes the page allocated to the specified printer, the following series of processing is carried out. The CPU 30 gives an output command to the real printer driver 130 (140 or 150) of the printer specified by the value of the printer counter C1 to make the specified printer carry out printing (step S480). The real printer driver 130 (140 or 150) receiving the output command returns the performance information of the corresponding printer 60 (70 or 80), and the CPU 30 inputs the transmitted performance information (step S490).

The CPU 30 subsequently generates final print data with regard to the page specified by the value of the page counter C2 and allocated to the printer specified by the value of the printer counter C1, based on the input performance information as well as the information with regard to the basic settings of printing and the paper settings included in the printer property data input at step S420 (excluding the information with regard to the printer group and the distributed form) (step S500). The concrete procedure of step S500 extracts page data regarding the page corresponding to the value of the page counter C2 from the intermediate print data input at step S410 and converts the extracted page data into data suitable for the printer 60 (70 or 80) corresponding to the value of the printer counter C1 based on the performance information, the information regarding the basic settings of printing, and the information regarding the page settings, so as to generate the final print data.

The CPU 30 then outputs the generated final print data to the real printer driver 130 (140 or 150) of the printer 60 (70 or 80) corresponding to the value of the printer counter C1 (step S110). Any of the real printer drivers 130, 140, and 150 makes the final print data undergo a required series of processing like color conversion or halftoning adequate for the corresponding printer, which has not been carried out by the virtual printer driver, and transmits the processed final print data to the corresponding printer 60, 70, or 80.

Prior to execution of printing at steps S480 to S510, one modified procedure may monitor the status of each printer 60, 70, or 80 based on the signal output from the corresponding real printer driver 130, 140, or 150. When the result of monitoring shows that there is a long queue of print jobs in the printer specified as the output resource or the specified printer is in an error state, the modified procedure may change the output resource to another printer or temporarily stop the output of the print job.

The CPU 30 subsequently increments the value of the page counter C2 by one (step S520). In the case of the negative answer at step S470, the program skips the processing of steps S480 to S510 and directly proceeds to step S520. The CPU 30 then determines whether or not the current value of the page counter C2 exceeds a value LC2 representing the last page (step S530). When it is determined that the current value of the page counter C2 does not exceed the value LC2 representing the last page, the program returns to step S470 and generates and outputs the final print data on the new page specified by the incremented value.

When it is determined at step S530 that the current value of the page counter C2 exceeds the value LC2 representing the last page, on the other hand, the CPU 30 increments the value of the printer counter C1 by one (step S540) and determines whether or not the current value of the printer counter C1 exceeds a value LC1 representing the last printer (step S550). When it is determined that the current value of the printer counter C1 does not exceed the value LC1 representing the last printer, the program returns to step S450 and generates and outputs the final print data on each page of the print job with the next printer 70 (80 or 60) specified by the incremented value of the printer counter C1. When it is determined at step S550 that the current value of the printer counter C1 exceeds the value LC1 representing the last printer, on the other hand, the program determines that generation and output of the final print data has been concluded for all the pages of the print job required for printing with all the printers and goes to RETURN to exit from this different-type printer output processing routine.

The different-type printer output processing routine is described to generate and output the final print data regarding the first page to the last page sequentially by the printer unit, that is, from the first printer to the last printer. Such description is, however, for convenience of illustration in the flowchart. The actual procedure carries out generation and output of the final print data regarding the first page to the last page by the respective printers in parallel by time sharing.

Figure 14:
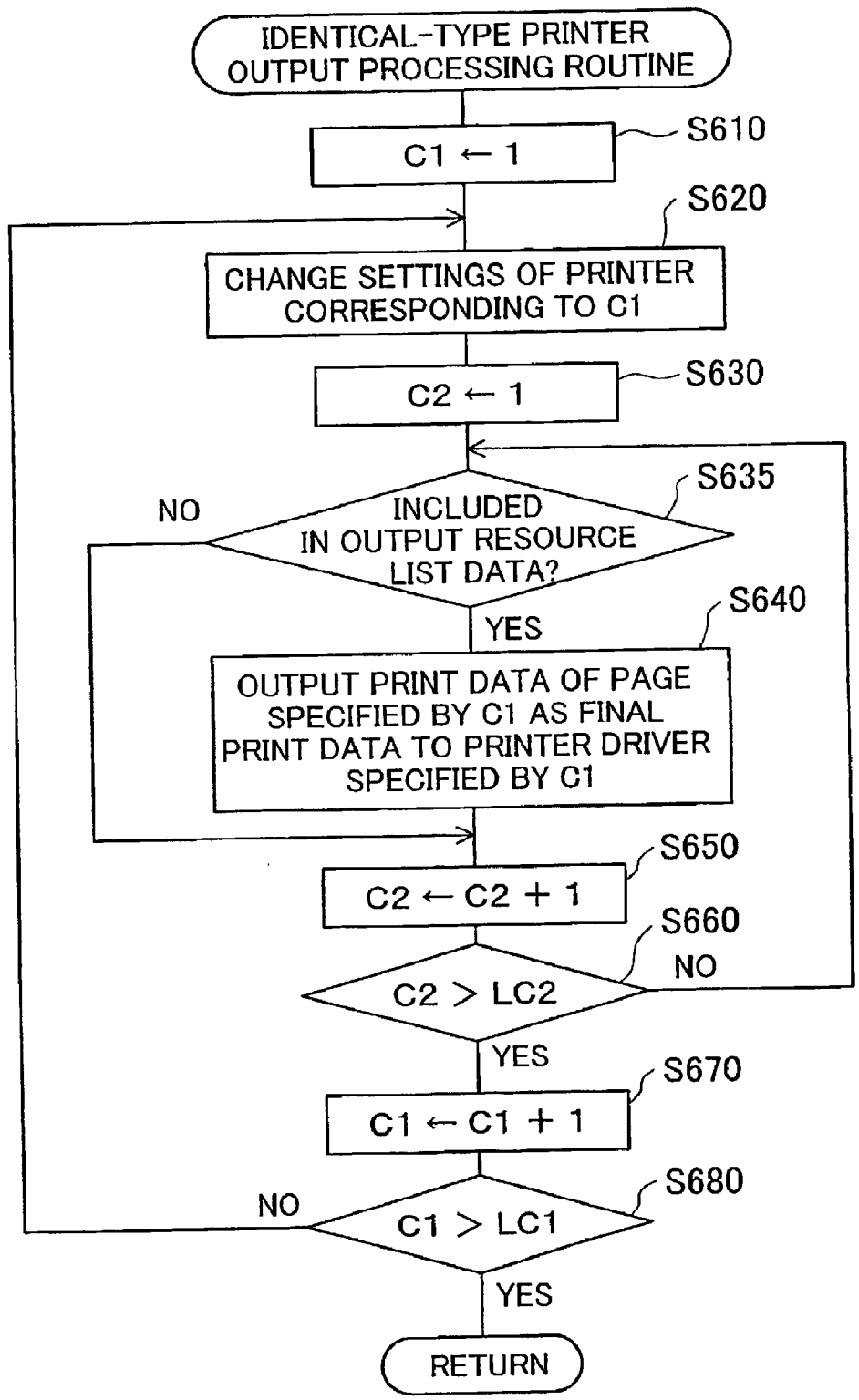
FIG. 14 is a flowchart showing the details of an identical-type printer output processing routine.

FIG. 14 is a flowchart showing the details of the identical-type printer output processing routine executed at step S436. The CPU 30 first sets a value '1' to a printer counter C1 representing a target printer used for printing (step S610). The printer counter C1 shows each available printer as the destination of distribution; the value '1' represents the first printer 60, the value '2' represents the second printer 70, and the value '3' represents the third printer 70.

The CPU 30 subsequently gives an instruction to change the settings to the printer specified by the value of the printer counter C1 (step S620). This processing makes the target printer ready for printing via the printer driver by transmitting the required information on the settings among the information with regard to the basic settings of printing and the information with regard to the paper settings included in the printer property data PD input at step S420 to the printer driver. For example, the procedure informs the printer driver of the paper type 'Glossy' to make the printer ready for printing suitable for the glossy paper.

The CPU 30 sets a value '1' to a page counter C2 representing the page number to be printed (step S630). The CPU 30 then determines whether or not the output resource list data obtained at step S430 includes the page allocated to the printer specified by the values of the printer counter C1 and the page counter C2 (step S635). When the result of the determination shows that the output resource list data includes the page allocated to the specified printer, the CPU 30 extracts page data regarding the page corresponding to the value of the page counter C2 from the intermediate print data input at step S410 and outputs the extracted page data as the final print data to the real printer driver 130 of the printer 60 (70 or 80) corresponding to the value of the printer counter C1 (step S640). In the case where the respective printers 60, 70, and 80 are of an identical type, the intermediate print data has already undergone the required series of processing like color conversion or halftoning as described previously. The real printer driver 130 thus transmits the final print data to the specified printer 60, 70, or 80 without any specific processing. The program then proceeds to step S650.

The procedure of this embodiment transmits the final print data to each of the printers 60, 70, and 80 via the real printer driver 130. One possible modification may transmit the final print data to each of the printers 60, 70, and 80 specified as the destination of distribution not via the real printer driver 130 but directly.

When it is determined at step S635 that the output resource list data does not include the page allocated to the specified printer, on the other hand, the program skips the processing of step S640 and directly proceeds to step S650, at which the CPU 30 increments the value of the page counter C2 by one. The CPU 30 subsequently determines whether or not the current value of the page counter C2 exceeds the value LC2 representing the last page (step S660). When it is determined here that the current value of the page counter C2 does not exceed the value LC2 representing the last page, the program returns to step S635 and outputs the final print data on the page specified by the incremented value. When it is determined at step S660 that the current value of the page counter C2 exceeds the value LC2 representing the last page, on the other hand, the CPU 30 increments the value of the printer counter C1 by one (step S670) and determines whether or not the current value of the printer counter C1 exceeds the value LC1 representing the last printer (step S680). When it is determined here that the current value of the printer counter C1 does not exceed the value LC1 representing the last printer, the program returns to step S620 and outputs the final print data on each page of the print job with the next printer 70 (80 or 60) specified by the incremented value of the printer counter C1. When it is determined at step S680 that the current value of the printer counter C1 exceeds the value LC1 representing the last printer, on the other hand, the program determines that output of the final print data has been concluded for all the pages of the print job required for printing with all the printers and goes to RETURN to exit from this identical-type printer output processing routine.

The identical-type printer output processing routine is described to output the final print data regarding the first page to the last page sequentially by the printer unit, that is, from the first printer to the last printer. Such description is, however, for convenience of illustration in the flowchart. The actual procedure carries out output of the final print data regarding the first page to the last page by the respective printers in parallel by multiple programming.

A6. Effects of Embodiment

Figure 15:
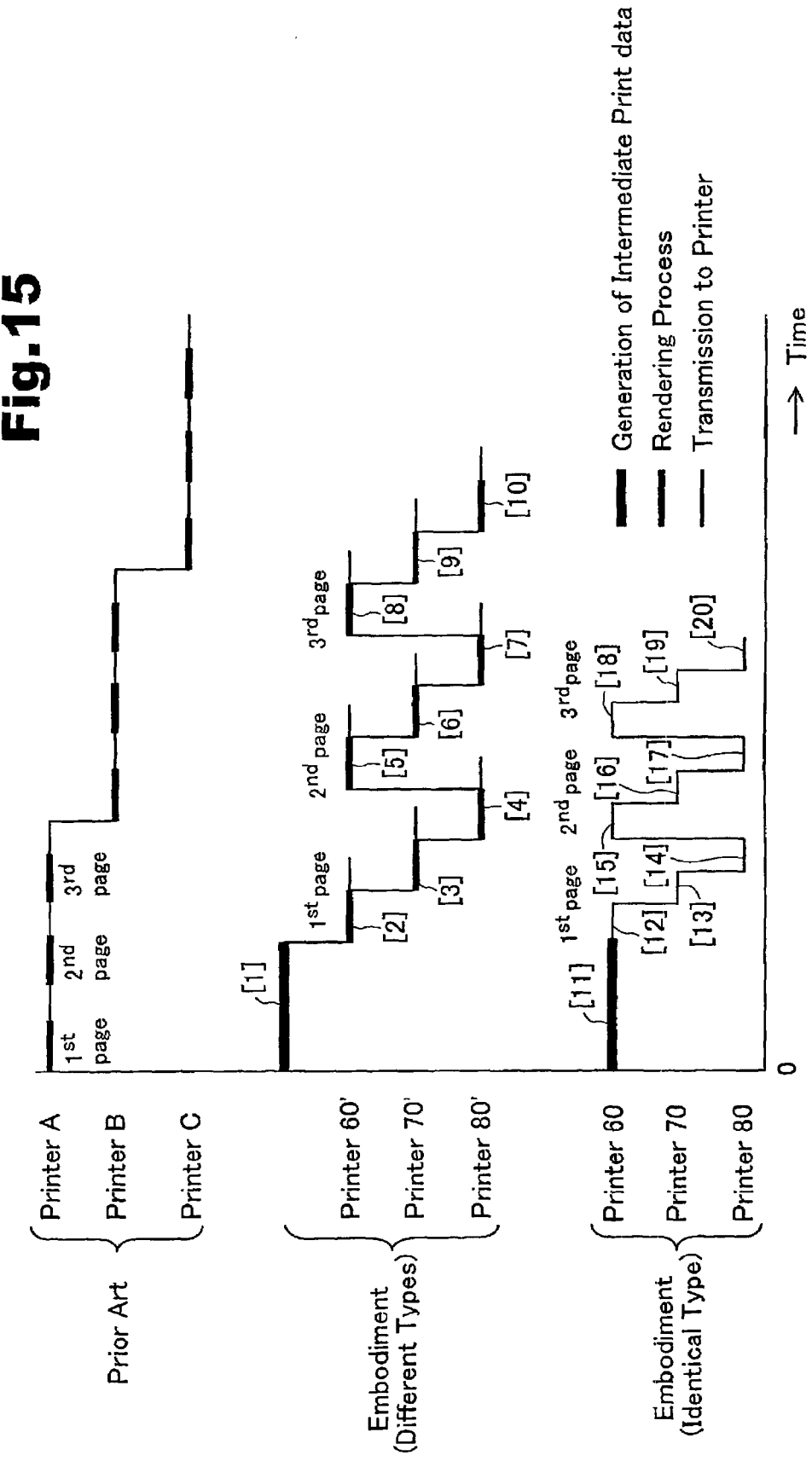
FIG. 15 is a timing chart showing the procedure of the embodiment for distributed printing, compared with a prior art procedure.

FIG. 15 is a timing chart showing a procedure of distributed printing with the computer system constructed as discussed above, compared with a prior art procedure. In the illustrated example, the print job is given to make each of three printers print one copy of a document including 3 pages. As shown in the middle part of the illustration, when the three printers are of different types (here the three printers are expressed as printers 60', 70', and 80'), the procedure of this embodiment first generates the intermediate print data ([1]) and carries out the parallel rendering process to sequentially convert the page data on the first page of the intermediate print data into data adequate for the printer 60', the printer 70', and the printer 80' ([2], [3], [4]). Transmission of the data converted for the printer 60' (that is, the final print data) to the printer 60' is carried out in parallel with the rendering process for the next printer 70'. In a similar manner, transmission of the converted data to the printer 70' and to the printer 80' is carried out in parallel with the rendering process for the next printer. The procedure then carries out the parallel rendering process to sequentially convert the page data on the second page of the intermediate print data into data adequate for the printer 60', the printer 70', and the printer 80' ([5], [6], [7]). The procedure subsequently carries out the parallel rendering process to sequentially convert the page data on the third page of the intermediate print data into data adequate for the printer 60', the printer 70', and the printer 80' ([8], [9], [10]. The printing operation of the whole print job is thus concluded.

As shown in the lower part of the illustration, when the printers 60, 70, and 80 are of an identical type, the procedure of this embodiment first generates the intermediate print data, which has undergone the rendering process to be adequate for the printer 60 (as well as for the printers 70 and 80) ([11]). The procedure sequentially transmits the page data on the first page of the intermediate print data to the printer 60, the printer 70, and the printer 80 in parallel ([12], [13], [14]). The procedure then sequentially transmits the page data on the second page of the intermediate print data to the printer 60, the printer 70, and the printer 80 in parallel ([15], [16], [17]), and transmits the page data on the third page of the intermediate print data to the printer 60, the printer 70, and the printer 80 in parallel ([18], [19], [20]).

As shown in the upper part of the illustration, on the other hand, the prior art procedure first carries out the rendering process to convert the page data on the first page into data adequate for a first printer A and transmits the converted data by the rendering process to the printer A. The prior art procedure then carries out the rendering process to convert the page data on the second page into data adequate for the first printer A and transmits the converted data to the printer A. The prior art procedure subsequently carries out the rendering process to convert the page data on the third page into data adequate for the first printer A and transmits the converted data to the printer A. In the same manner as for the first printer A, the procedure sequentially carries out the rendering process for the first page, the second page, and the third page and transmission of the converted data to a second printer B. Similarly, the procedure sequentially carries out the rendering process for the first page, the second page, and the third page and transmission of the converted data to a third printer C.

When the printers available for printing are of different types, the procedure of the embodiment carries out the rendering process in parallel with transmission of the processed data to the printer. Compared with the prior art procedure, the procedure of this embodiment thus effectively shortens the total time required for printing. When the printers available for printing are of an identical type, the procedure of the embodiment simply generates the intermediate print data and does not require the individual data conversion for the respective printers 60, 70, and 80. Compared with the procedure adopted in the case of the printers of different types, this procedure further shortens the total time required for printing.

In the procedure of this embodiment, the intermediate print data is obtained by simple output of a print command from the application program 100 to the virtual printer driver 110, and the distributed printing of the intermediate print data with the printers 60, 70, and 80 is automatically carried out. The operator is thus only required to execute the 'Print' command once on the application program. This arrangement effectively ensures the excellent operatability.

In the system of this embodiment, the icon IC4 representing the virtual printer driver 110 is displayed together with the icons IC1, IC2, and IC3 representing the real printer drivers 130, 140, and 150 provided for the respective types of the printers 60, 70, and 80 in the 'Printer' window WN1. The virtual printer driver 110 can thus be activated by the same operation as the operation of the icon IC1, IC2, or IC3 to activate the corresponding real printer driver 130, 140, or 150. This arrangement ensures the excellent operatability in setting of various pieces of information regarding the virtual printer driver 110.

In this embodiment, the respective real printer drivers share the information with regard to the basic settings of printing and the information with regard to the paper settings among the various pieces of information set in the virtual printer driver 110. This arrangement does not require the respective real printer drivers to separately set such information, thus ensuring excellent operatability.

In the structure of this embodiment, the information with regard to the distributed form and the information with regard to the printer group as the potential destination of distribution are set in the 'Distributed Printing Properties' dialog box WN2. This arrangement enables the operator to readily set various pieces of information required for specifying the printers as the destinations of distribution. In the procedure of the embodiment, the destination of distribution of printing is restricted to printers in a preset group among all the available printers connected to the computer network 90 by setting the information on the printer group. This arrangement enables the operator to restrict the output resource of resulting prints to the preset range, thus ensuring excellent operatability.

A7. Reuse of Intermediate Print File

The distributed printing utility utilizes the intermediate print file MF stored in the HDD 41 for distributed printing as discussed previously. One preferable modification may allow re-printing with the intermediate print file MF after conclusion of the processing by the distributed printing utility. Such modification is discussed below as a modified example of the embodiment.

Figure 16:
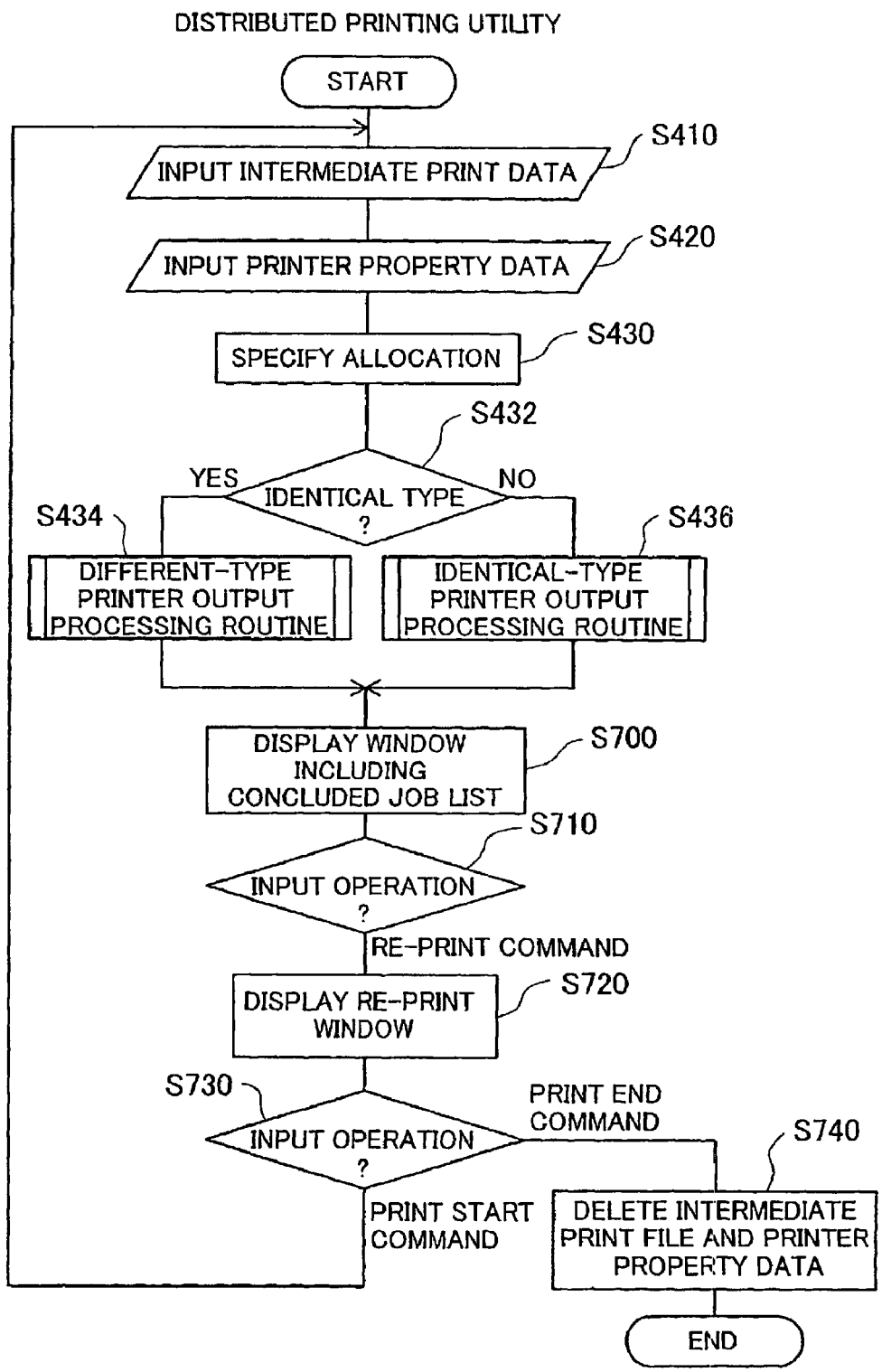
FIG. 16 is a flowchart showing a series of processing described in a distributed printing utility in a modified example.

FIG. 16 is a flowchart showing a processing routine described in the distributed printing utility in the modified example. The modified example has the same hardware structure and the software configuration as that of the above embodiment, except the details of the processing routine described in the distributed printing utility. The series of processing executed at steps S410 through S436 in the processing routine of FIG. 16 described in the distributed printing utility is also identical with the series of processing carried out in the above embodiment. After the processing of either step S434 or step S436, the CPU 30 opens a window including a concluded job list on the CRT display 12 (step S700).

Figure 17:
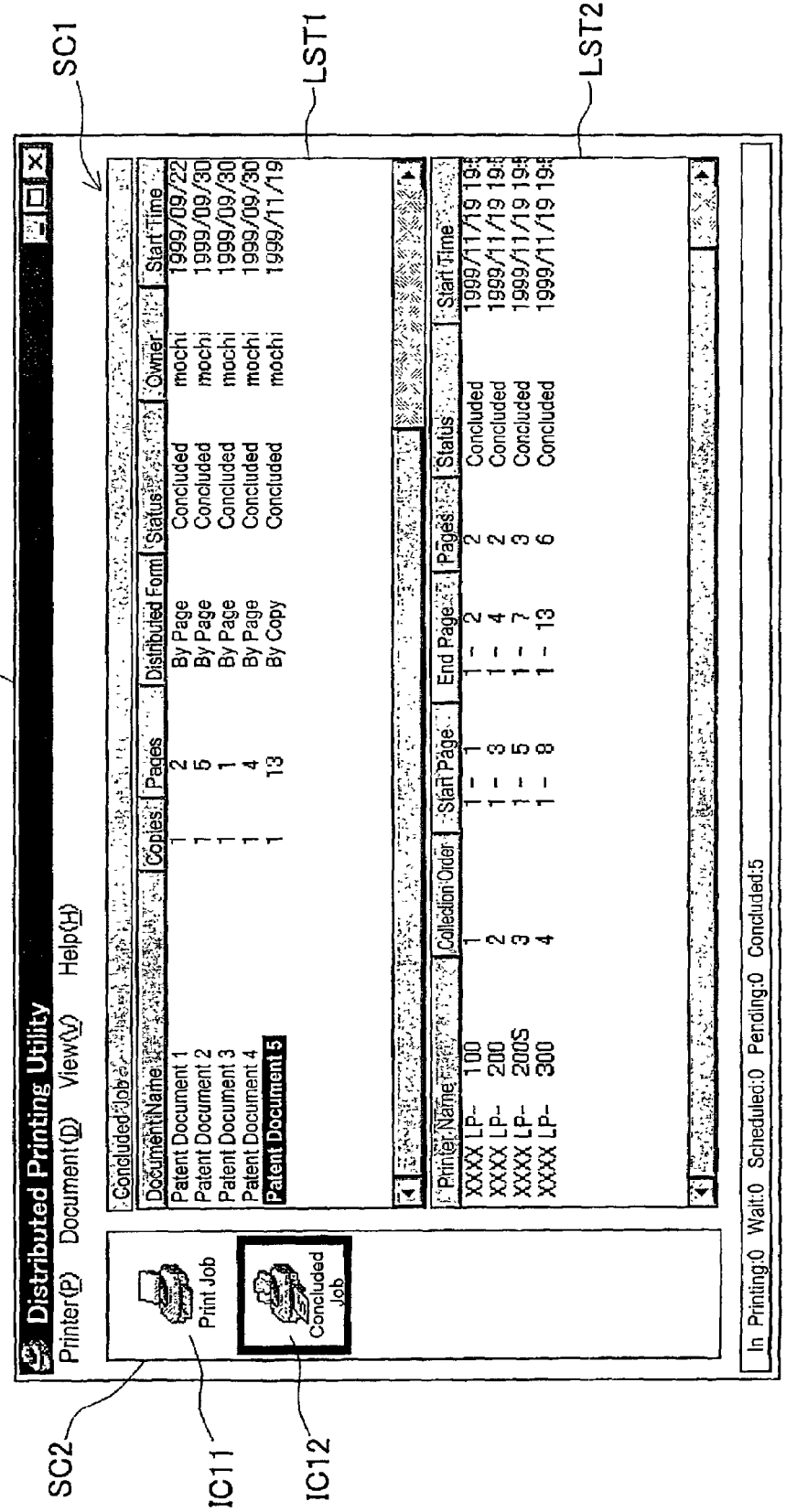
FIG. 17 illustrates a window WN3 including a concluded job list.

FIG. 17 illustrates a window WN3 including a concluded job list. As illustrated, this window WN3 has a main window SC1 and a sub window SC2 located on the left side of the main window SC1. The main window SC1 is vertically divided into two portions: a job list box LST1 in the upper portion and a distributed status list box LST2 in the lower portion.

The sub window SC2 has icons IC11 and IC12 to change over the display on the job list box LST1 between a print job list and a concluded job list. In the example of FIG. 17, the icon IC12 is clicked to give a display of the concluded job list on the job list box LST1. The concluded job list enumerates jobs that have already been printed (where each job represents a unit of printing). The concluded job list includes several fields 'Document Name' showing the names of print documents, 'Copies' showing the number of copies of each document to be printed, 'Pages' showing the number of pages included in each document, 'Distributed Form' showing the distributed form, 'Status' showing the status of printing, 'Owner' showing the owner of the print job, and 'Start Time' showing the date and time when printing started.

The distributed status list box LST2 shows the distributed status of a selected job among the plurality of jobs displayed in the job list box LST1. In this distributed status list box LST2, each row corresponds to one destination of distribution, and includes several fields 'Printer Name' showing the printer specified as the destination of distribution, 'Collection Order' showing the ordinal number of collection allocated to each resulting print, 'Start Page' showing the starting page of each print document to be printed with the destination of distribution, 'End Page' showing the end page of the print document, 'Pages' showing the number of pages included in the print document, 'Status' showing the status of printing in the destination of distribution, and 'Start Time' showing the date and time when printing starts in the destination of distribution.

Execution of step S700 in FIG. 16 makes the window WN3 of the above arrangement displayed on the CRT display 12. In this embodiment, the window WN3 is displayed immediately after the processing of either step S434 or step S436. One possible modification may minimize the window WN3 into a task bar on the desktop. In such modification, a click of a button on the task bar for activating the window WN3 with the mouse 20 opens this window WN3.

When the window WN3 including the concluded job list is displayed at step S700, the CPU 30 reads an input operation on the window WN3 with the mouse 20 or the keyboard 18 and determines whether or not a re-print command is input to re-execute a print job, which has already been concluded (step S710). The re-print command is activated, for example, by right clicking the position of a target print job of re-print in the concluded job list and selecting 'Re-print' on a dialog box thus opened. The CPU 30 determines that the re-print command is input in response to such operations of the mouse 20.

Figure 18:
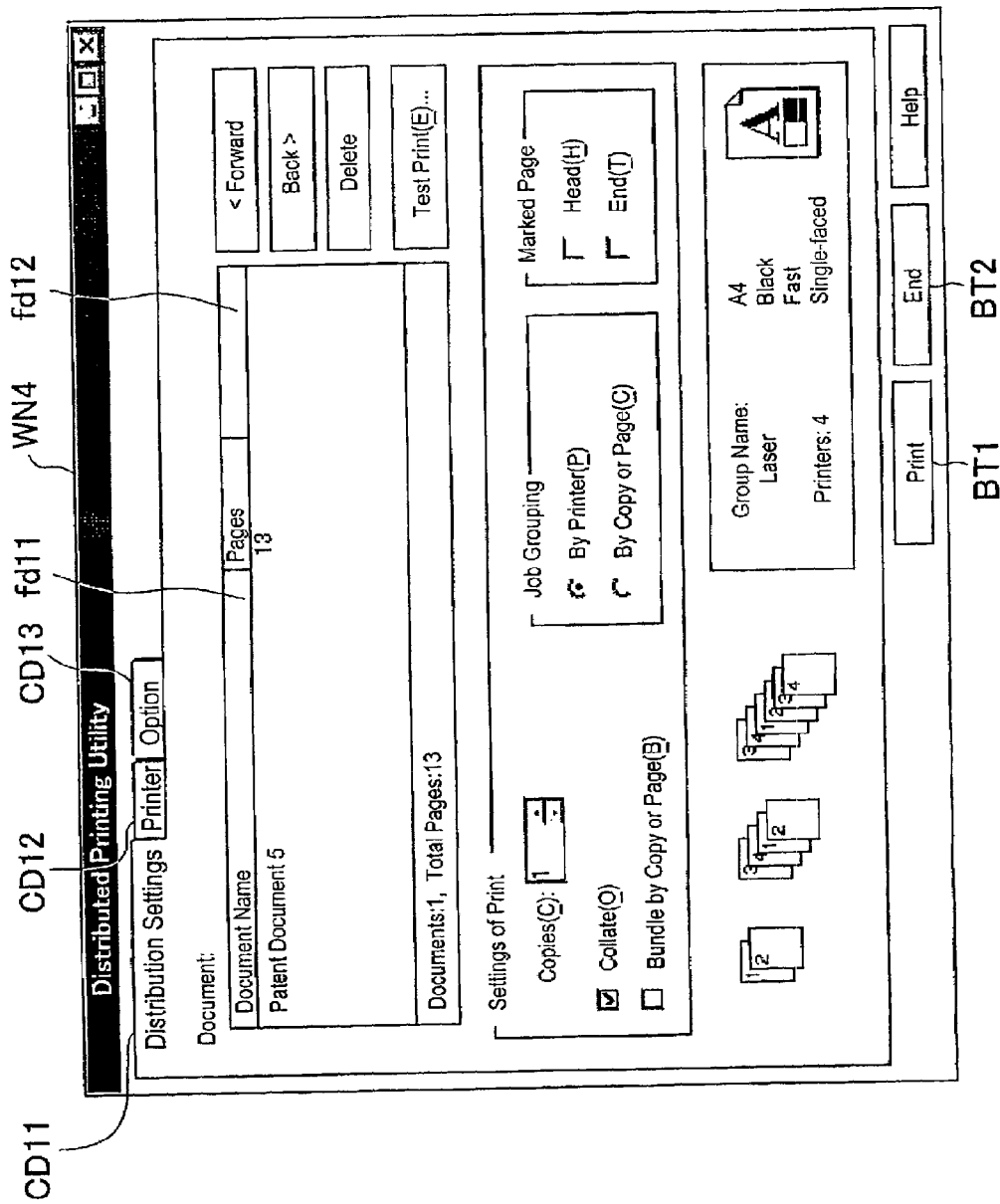
FIG. 18 illustrates a window WN4 for re-printing.

When it is determined at step S710 that the re-print command is input, the CPU 30 opens a re-print window on the CRT display 12 (step S720). FIG. 18 illustrates a re-print window WN4. As illustrated, the re-print window WN4 includes three cards 'Distribution Settings', 'Printer', and 'Options' CD11, CD12, and CD13.

The 'Distribution Settings' card CD11 is used to set information regarding the distributed form in re-print. The 'Printer' card C])12 is used to set information regarding the printer group as the potential destinations of distribution in re-print, information regarding the basic settings of printing, and information regarding the paper settings. The 'Options' card CD13 is used to set other additional pieces of information. The 'Distribution Settings' card CD11 has a 'Document Name' field fd11 showing the names of print documents to be re-printed and a 'Pages' field fd12 showing the number of pages included in each document, in addition to the several data input fields identical with those in the 'Distribution Settings' card CD1 displayed in the 'Distributed Printing Properties' dialog box WN2 discussed previously with FIG. 6. The 'Printer' card CD12 is identical with the 'Printer' card CD12 displayed in the 'Distributed Printing Properties' dialog box WN2 discussed previously. The settings in the previous printing operation, that is, the settings of the printer property data PD input at step S420, are kept as defaults of the respective fields included in the 'Distribution Settings' card CD11 and the 'Printer' card CD12.

The operator checks the name of the document to be re-printed and the distributed form in re-print in the re-print window WN4 displayed on the CRT display 12, changes the number of copies and the printer group specified as the output resource according to the requirements, and clicks a 'Print' button BT1 in the 'Distribution Settings' card CD11. After the display of the re-print window WN4 at step S720, the CPU 30 reads an input operation on the re-print window WN4 with the mouse 20 or the keyboard 18 and determines whether or not the 'Print' button BT1 is clicked to output a print start command (step S730).

When it is determined at step S730 that the print start command is input, the CPU 30 returns to step S410 to read the intermediate print file MF left in the HDD 41 and re-print the specified document. When it is determined at step S730 that an 'End' button BT2 on the re-print window WN4 is clicked to output a print end command, on the other hand, the CPU 30 goes to step S740 to delete the intermediate print file MF and the printer property data PD from the HDD 41 (step S740). The program then goes to END and exits from this series of processing by the distributed printing utility.

The procedure of this modified example enables a specified document to be re-printed without activating the application program after the distributed printing has once been concluded, for example, when there is some failure in resulting prints or when the number of copies is insufficient. This ensures the good operatability in the case of re-print. The modified example uses the re-print window WN4 to change the settings of the printer property data PD in re-print, for example, the information with regard to the distributed form and the information with regard to the destinations of distribution, from the settings in the first print. This further enhances the operatability of re-print.

In the structure of the embodiment, the printer property data PD as well as the intermediate print file MF is stored in the HDD 41, so that the defaults in the re-print window WN4 used for re-print can be specified based on the printer property data PD. No re-input of the same data is required in the case of no necessity of changing the printer property data PD, for example, on the occasion of simple reprinting. This arrangement thus ensures excellent operatability in the case of re-print.

In the distributed printing control apparatus of the above embodiment according to the present invention or its modification, print data is directly output from one computer 10 to the multiple printers 60, 70, and 80. Another possible application is a client-server system, in which a server may be provided on the computer network 90 to manage distributed printing with multiple printers. In this application, the virtual printer driver is incorporated in each client, and the distributed printing utility is incorporated in the server.

B. Second Embodiment

B1. Computer Programs

B1-1. Distributed Printing Process Routine

The details of 'A1. General Hardware Structure', 'A2. Distributed Printing Process', 'A3. Virtual Printer Driver', and 'A4. User Interface' discussed in the first embodiment are adopted in a second embodiment of the present invention. The same parts as those of the first embodiment are expressed by the same numerals. The difference between the first embodiment and the second embodiment is only part of the computer programs. Like the first embodiment, the configuration of the second embodiment includes the virtual printer driver 110 and the distributed printing utility 120 as the computer programs.

The distributed printing utility 120 is mapped to the virtual printer driver 110 and stored in advance in the floppy disk 22. The distributed printing utility 120 is installed from the floppy disk drive 24 into the computer 10 according to an activated preset installation program. The installed distributed printing utility 120 is stored in the HDD 41, and is incorporated in the operating system and loaded into a predetermined area of the RAM 32 in response to power supply to the computer 10. Like the virtual printer driver 110, the distributed printing utility 120 may be stored in another portable recording medium (carriable recording medium), such as a CD-ROM, a magneto-optic disc, or an IC card, in place of the floppy disk 22. The distributed printing utility 120 may be program data, which are downloaded from a specific server connecting with an external computer network (for example, the Internet) via the computer network and transferred to either the RAM 32 or the HDD 41.

Figure 19:
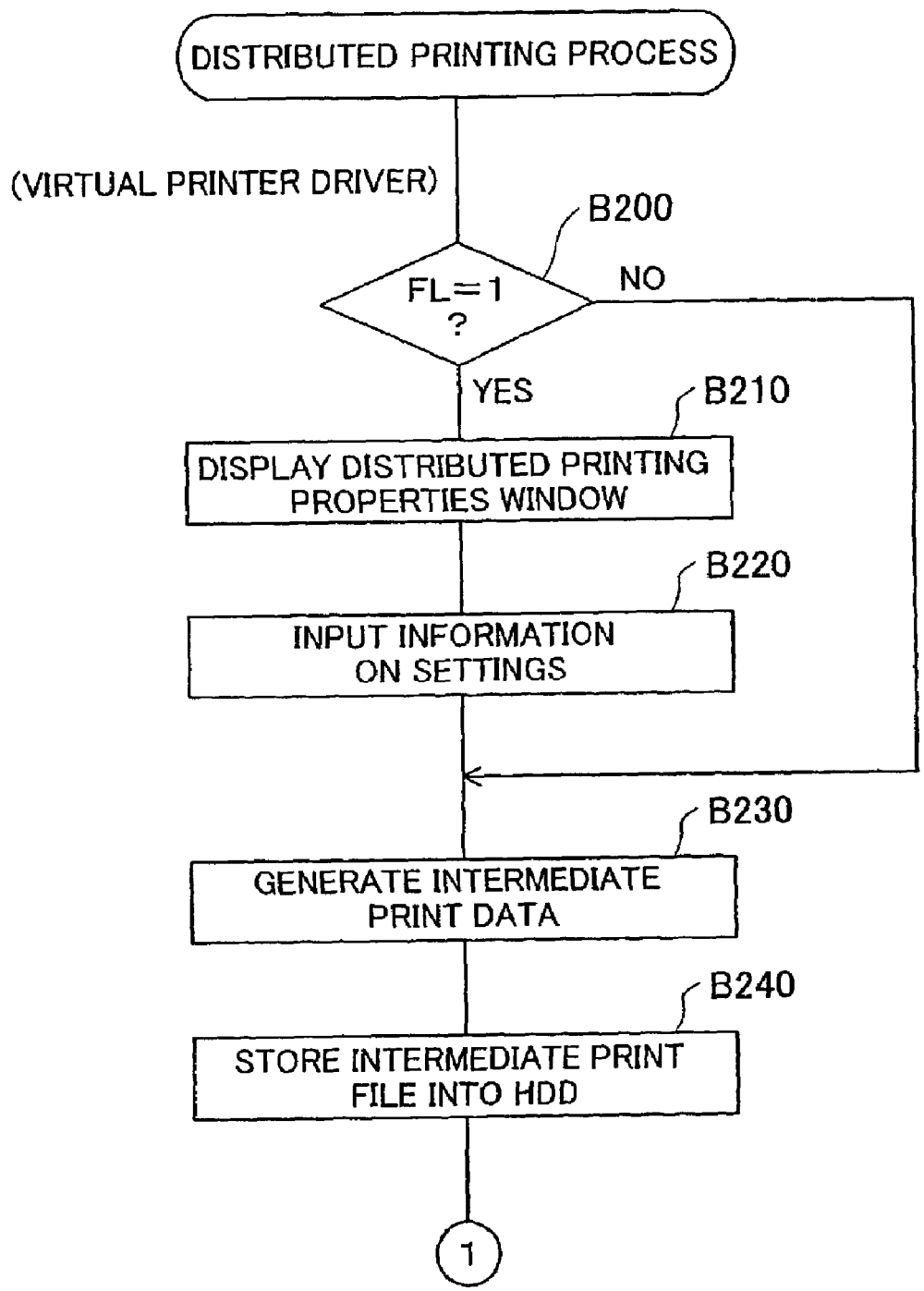
FIG. 19 is a flowchart showing the former half of a distributed printing process routine executed by a CPU 30 in a second embodiment of the present invention.
Figure 20:
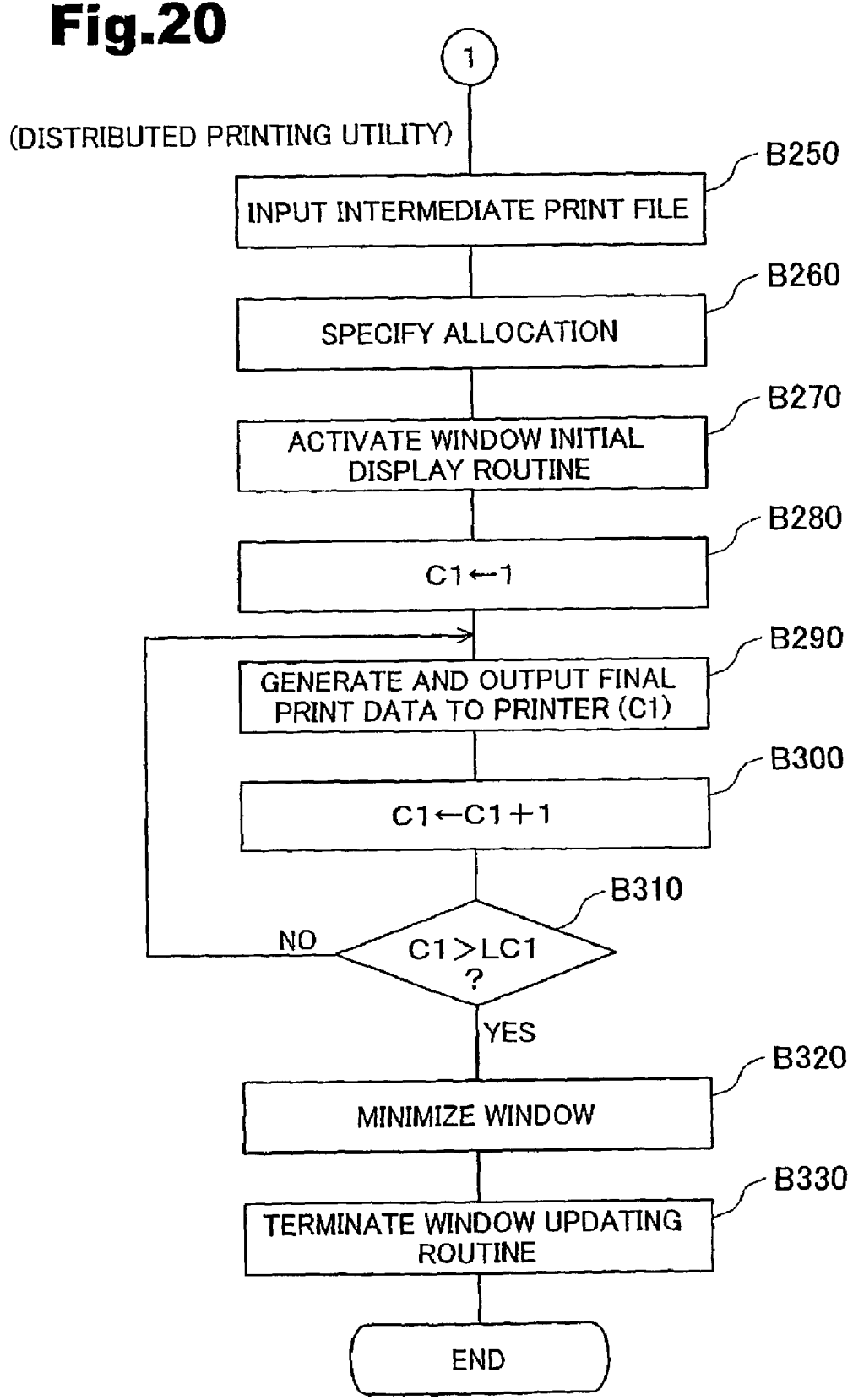
FIG. 20 is a flowchart showing the latter half of the distributed printing process routine.

The following describes the details of the distributed printing process executed by the virtual printer driver 110 and the distributed printing utility 120. FIG. 19 is a flowchart showing the former half of a distributed printing process routine, and FIG. 20 is a flowchart showing the latter half of the distributed printing process routine. The former half shown in FIG. 19 is executed by the virtual printer driver 110, whereas the latter half shown in FIG. 20 is executed by the distributed printing utility 120. This distributed printing process routine is activated in response to an instruction of distributed printing output from the application program 100. The application program 100 may be a general purpose application program used to create documents and pictures, and document data is generated by the functions characteristic of each application program. In response to execution of a 'Print' command on the application program 100, the instruction of distributed printing is output to print the document data thus generated (this unit corresponds to a print job (hereinafter may be simply referred to the job)).

Figure 21:
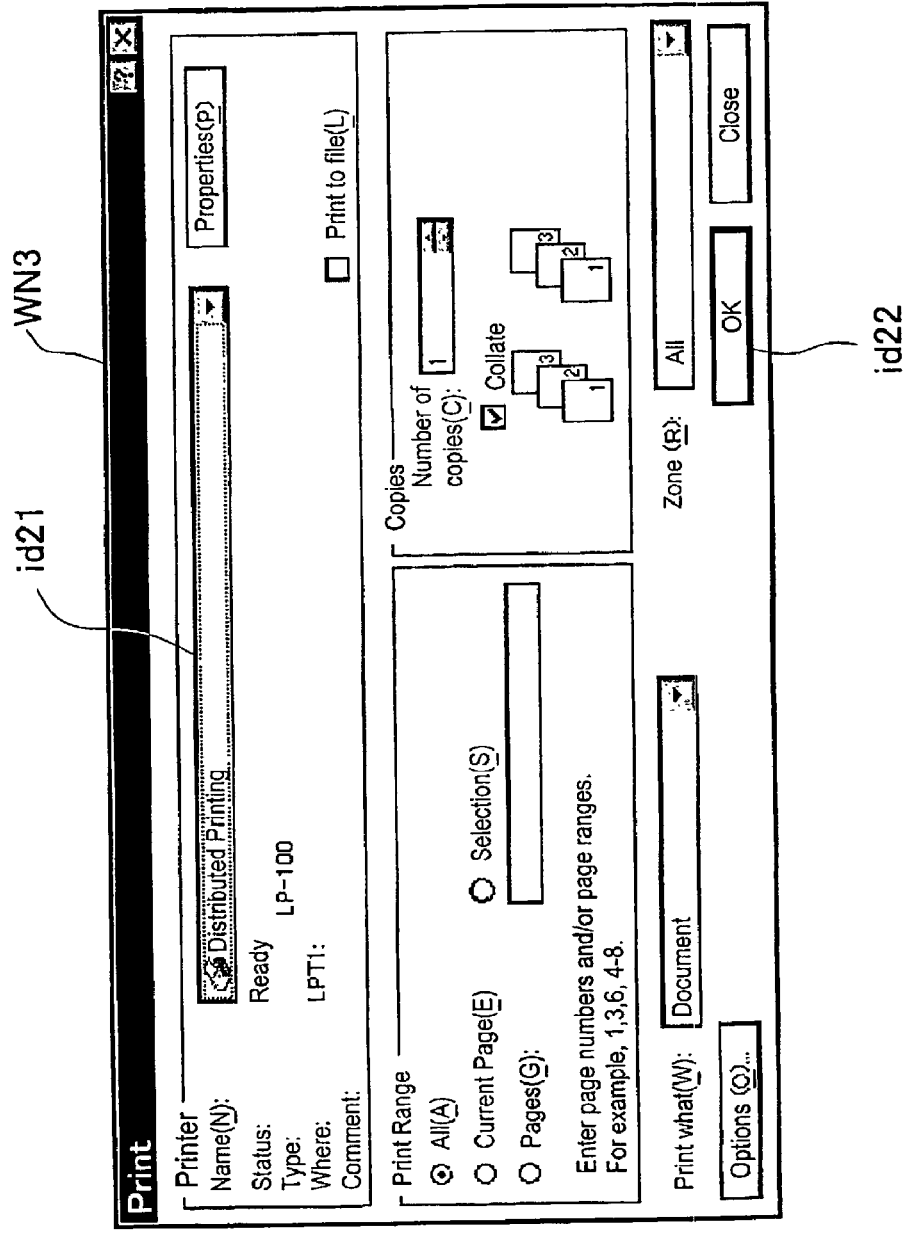
FIG. 21 illustrates a 'Print' dialog box WN3 open on a CRT display 12 in response to execution of a 'Print' command on the application program 100.

FIG. 21 illustrates a 'Print' dialog box WN3 open on the CRT display 12 in response to execution of the 'Print' command on the application program 100. As illustrated, the 'Print' dialog box WN3 has a 'Printer Name' data input box id21. The distributed printing process routine is activated in response to a click of an 'OK' button id22 with the mouse 20, while a series of letters 'Distributed Printing', which corresponds to the 'Distributed Printing' icon IC4 discussed previously with FIG. 5, is selectively input in the 'Printer Name' data input box id21. The dialog box WN3 shown in this embodiment is different from the window WN3 shown in the first embodiment.

When the program enters the processing routine shown in FIG. 19, the CPU 30 first determines whether or not a flag FL is equal to a value '1' (step B200). The flag FL shows the on-off state of the check box id6 'Preview Settings' included in the 'Distribution Settings' card CD 1 on the 'Distributed Printing Properties' dialog box WN2. When it is determined at step B200 that the flag FL is equal to the value '1', that is, in the case of a check in the check box id6 'Preview Settings', the CPU 30 opens the 'Distributed Printing Properties' dialog box WN2 shown in FIG. 6 on the CRT display 12 (step B210). The display enables the operator to confirm and change the settings prior to the actual printing operation. At subsequent step B220, various pieces of information on the settings are input in the 'Distributed Printing Properties' dialog box WN2 according to the requirements. The various pieces of input information on the settings are stored as printer property data.

After execution of step B220, the program proceeds to step S230. In the case of a negative answer at step B200, that is, in the case of no check in the check box id6 'Preview Settings', on the other hand, the program skips the processing of steps B210 and B220 and directly goes to step B230. In this case, the previous settings in the 'Distributed Printing Properties' dialog box WN2 are kept as the printer property data. At step B230, the CPU 30 generates intermediate print data, based on the print data output from the application program 100.

The following series of processing is carried out to generate the intermediate print data. The CPU 30 first returns the processing to the application program 100 and issues a print command to the virtual printer driver 110. The CPU 30 then shifts the processing to the virtual printer driver 110 to receive the print command output from the application program 100. In response to the print command, the CPU 30 reads the performance information of the respective printers 60, 70, and 80, which has been transmitted from the real printer drivers 130, 140, and 150 provided for the respective types of the printers 60, 70, and 80 to the distributed printing utility 120, extracts the highest performance out of the input performance information of the respective printers 60, 70, and 80, and specifies the extracted highest performance as the performance information of the virtual printer. The CPU 30 subsequently transmits the performance information of the virtual printer to the application program 100.

The CPU 30 then shifts the processing to the application program 100 and converts the document data generated by the application program 100 into print data adequate for the virtual printer, based on the performance information of the virtual printer as well as the information with regard to the basic settings of printing and the information with regard to the paper settings among the various pieces of information on the distributed printing set by the virtual printer driver 110 (excluding the information with regard to the printer group and the distributed form). The converted print data is transmitted to the virtual printer driver 110. The CPU 30 shifts the processing to the virtual printer driver 110 to input the transmitted print data as intermediate print data. This series of processing thus generates the intermediate print data.

The CPU 30 subsequently outputs the generated intermediate print data to the HDD 41 and temporarily stores a data set or a set of the intermediate print data as an intermediate print file MF into the HDD 41 (step B240).

After execution of step B240, the CPU 30 shifts the processing to the distributed printing utility 120 and goes to step B250 shown in FIG. 20. At step B250, the CPU 30 inputs the intermediate print file MF from the HDD 41 The CPU 30 then specifies allocation of the intermediate print data input at step B250, based on the information with regard to the printer group and the distributed form included in the printer property data discussed above (step B260). The concrete procedure of step B260 divides the input intermediate print data by page and allocates the preset pages to the respective printers 60, 70, and 80 belonging to the specified printer group, in order to attain the distributed form set in the 'Distributed Printing Properties' dialog box WN2, that is, the distributed form displayed in the distributed form display box dd of the 'Distribution Settings' card CD1 shown in FIG. 8. Information regarding the preset pages allocated to the respective printers is stored as output resource list data into the RAM 32.

Figures 22, 23:
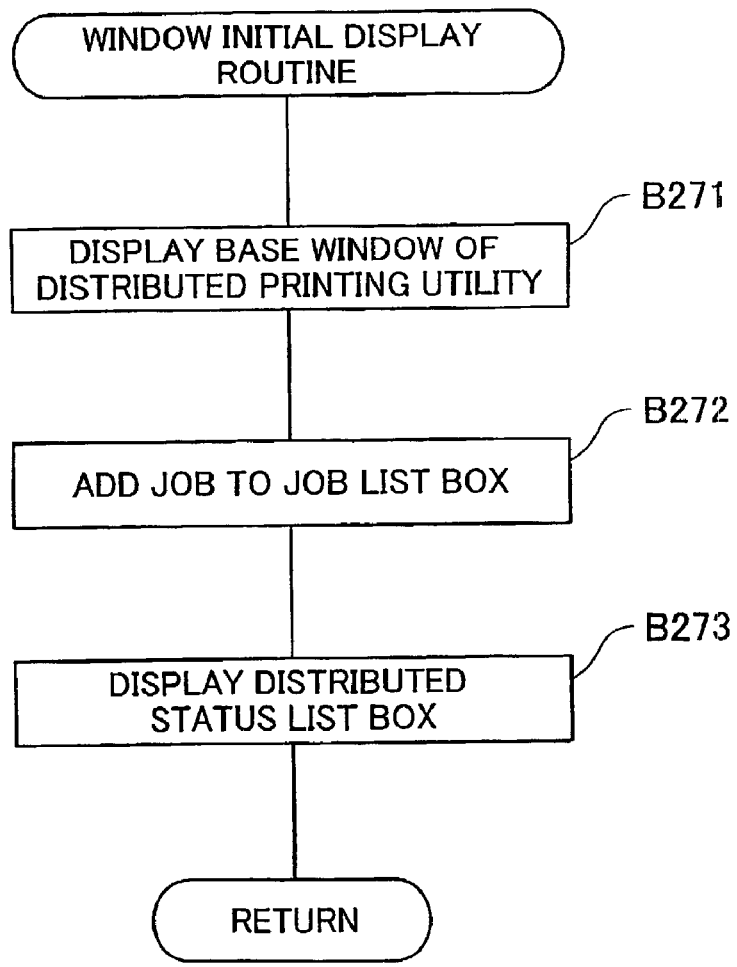
FIG. 22 shows an example of output resource list data.
FIG. 23 is a flowchart showing a window initial display routine executed by the CPU 30.

FIG. 22 shows an example of the output resource list data. In the illustrated example, the print job is given to make each of the three printers 60, 70, and 80 print one copy of a document including 3 pages. The $1^{st}$ to the $3^{rd}$ pages are set as the page numbers to be printed with each of the three printers 60, 70, and 80.

Referring back to FIG. 20, after the allocation of the preset pages to the output resources at step B260, the CPU 30 executes a window initial display routine to display a 'Distributed Printing Utility' window WN4 on the CRT display 12 (step B270).

Figure 24:
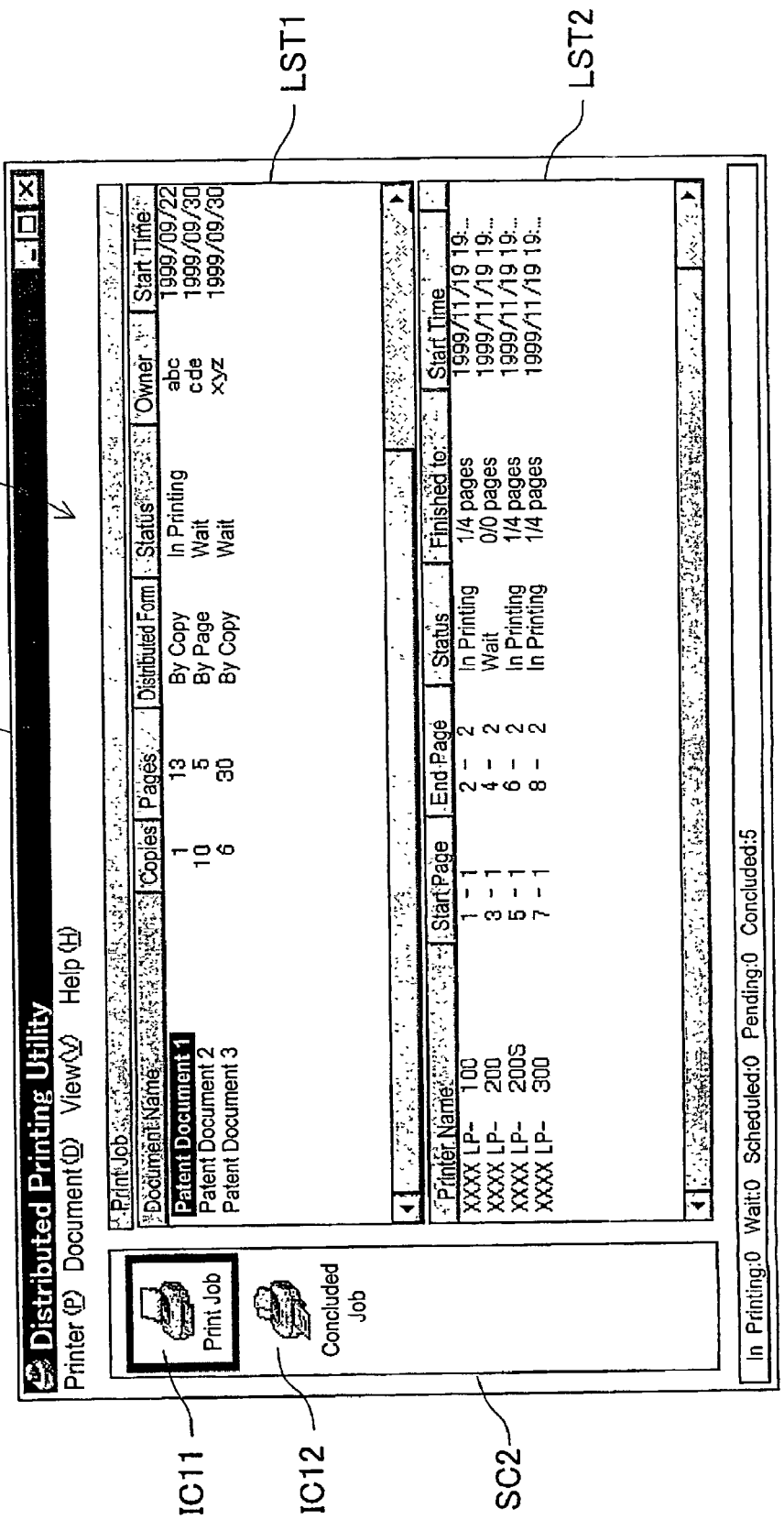
FIG. 24 illustrates a 'Distributed Printing Utility' window WN4.

FIG. 23 is a flowchart showing this window initial display routine. When the program enters the illustrated processing routine, the 'Distributed Printing Utility' window WN4 opens to give a base display (step B271). FIG. 24 illustrates the 'Distributed Printing Utility' window WN4. The window WN4 in this embodiment is different from the window WN4 shown in the first embodiment. As illustrated, this window WN4 has a main window SC1 and a sub window SC2 located on the left side of the main window SC1. The main window SC1 is vertically divided into two portions: a job list box LST1 in the upper portion and a distribution status list box LST2 in the lower portion.

The sub window SC2 has icons IC11 and IC12 to change over the display on the job list box LST1 between a print job list and a concluded job list. In the example of FIG. 24, the icon IC11 is clicked to give a display of the print job list on the job list box LST1. In the initial state, this print job list is displayed. The print job list enumerates jobs in printing or in a waiting queue for printing. The print job list includes several fields 'Document Name' showing the names of print documents, 'Copies' showing the number of copies of each document to be printed, 'Pages' showing the number of pages included in each print document, 'Distributed Form' showing the distributed form, 'Status' showing the current status of printing, 'Owner' showing the owner of the print job, and 'Start Time' showing the date and time when printing starts.

The display in the 'Distributed Form' field is either 'By Copy' or 'By Page' as the method of bundling the print job in the case of distributed printing. The display in the 'Status' field includes 'In Printing', 'Wait', 'Scheduled', and 'Pending'. The status 'In Printing' represents the state of actual printing with any of the printers. The status 'Wait' represents the stand-by state prior to actual printing with any of the printers in response to the execution of the 'Print' command. The status 'Scheduled' represents the state waiting for a print start time specified by schedule management, which is not discussed in detail. The status 'Pending' represents the state of pending the print job specified by the schedule management.

The distributed status list box LST2 shows the distributed status of a selected job among the plurality of jobs displayed in the job list box LST1. In this distributed status list box LST2, each row corresponds to one destination of distribution, and includes several fields 'Printer Name' showing the printer specified as the destination of distribution, 'Start Page' showing the starting page of each print document to be printed with the destination of distribution, 'End Page' showing the end page of the print document, 'Status' showing the current status of printing, and 'Finished to' showing the progress of printing in the destination of distribution, and 'Start Time' showing the date and time when printing starts in the destination of distribution.

The display in the 'Status' field includes 'In Printing', 'Wait', and 'Concluded'. The status 'In Printing' represents the state of actual printing with the specified printer. The status 'Wait' represents the stand-by state prior to actual printing with the specified printer in response to the execution of the 'Print' command. The status 'Concluded' represents conclusion of the allocated printing with the specified printer.

Referring back to FIG. 23, at step B272, the 'Distributed Printing Utility' window WN4 with vacancy in the job list box LST1 and the distributed state list box LST2 opens on the CRT display 12 as the base window. The process of displaying the base window is not carried out at step B272, when the 'Distributed Printing Utility' window WN4 has already been opened by the distributed printing process with regard to another job.

The CPU 30 subsequently adds the display with regard to a new target job of the distributed printing process to the job list box LST1 in the 'Distributed Printing Utility' window WN4 (step B272). The addition of the display is based on the print data of the newly added job and the information with regard to the distributed form included in the printer property data (that is, the information on the settings input in the 'Distribution Settings' card CD1). A series of letters 'Wait' is shown as the default in the 'Status' field of the job newly added.

The CPU 30 then displays the distributed statuses of the respective printers in the distributed status list box LST2 on the 'Distributed Printing Utility' window WN4 (step B273), based on the information of the output resource list data generated at step B260. In the distributed status list box LST2, a series of letters 'Wait' is displayed as the default in the 'Status' field, while a series of letters '0/0 pages' is displayed as the default in the 'Finished to' field. The program then goes to RETURN and exits from this window initial display routine.

Figure 25:
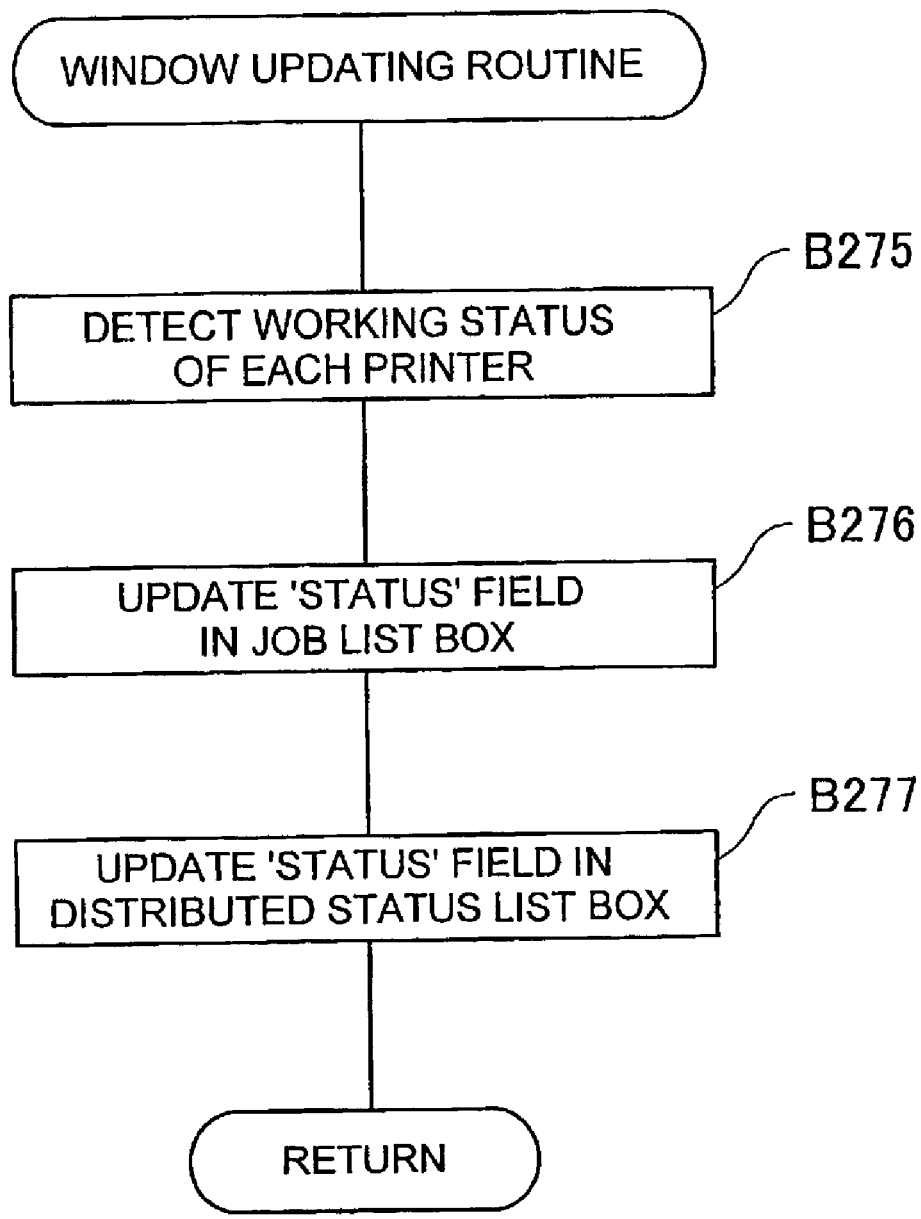
FIG. 25 is a flowchart showing a window updating routine executed by the CPU 30.

FIG. 25 is a flowchart showing a window updating routine executed by the CPU 30. This window updating routine is iteratively executed at preset time intervals, for example, at every 100 msec, after conclusion of the window initial display routine discussed above. When the program enters the window updating routine, the CPU 30 first obtains the current working statuses of the respective printers 60, 70, and 80, which have been specified at B260 as the destinations of allocation, from the real printer drivers 130, 140, and 150 provided for the respective printers 60, 70, and 80 (step B275). The CPU 30 subsequently updates the field 'Status' in the job list box LST1 and the 'Status' and 'Finished to' fields in the distributed status list box LST2 to the current state, based on the obtained current working statuses of the respective printers 60, 70, and 80 and the progress of the distributed printing process routine (steps B276 and B277). The program then goes to RETURN and once exits from the window updating routine. This series of processing continually updates the display in the job list box LST1 and the distributed status list box LST2 on the 'Distributed Printing Utility' window WN4 to the current state.

Referring back to FIG. 20, after conclusion of the window initial display routine at step B270, the CPU 30 carries out a series of processing discussed below to attain the actual printing operation according to the output resource list data representing the allocation specified at step B260. The CPU 30 first sets a value '1' to a printer counter C1 representing a target printer used for printing (step B280). The printer counter C1 shows each available printer as the destination of distribution; the value '1' represents the first printer 60, the value '2' represents the second printer 70, and the value '3' represents the third printer 70.

The CPU 30 subsequently gives an instruction to change the settings to the printer specified by the value of the printer counter C1 (step B290). This processing makes the target printer ready for printing via the printer driver by transmitting the required information on the settings among the information with regard to the basic settings of printing and the information with regard to the paper settings included in the printer property data to the printer driver. For example, the procedure informs the printer driver of the paper type 'Glossy' to make the printer ready for printing suitable for the glossy paper.

The CPU 30 then generates and outputs final print data to the printer corresponding to the value of the printer counter C1 (step B290), according to the output resource list data representing the information on allocation specified at step B260. In accordance with a concrete procedure, the CPU 30 first divides the intermediate print data included in the intermediate print file input at step B250 by page, retrieves the output resource list data to find preset pages to be printed with the printer specified by the value of the printer counter C1 as the output resource, and extracts data regarding the preset pages to be printed among the intermediate print data. The CPU 30 then issues an output command to the real printer driver 130 (140 or 150) of the printer specified by the value of the printer counter C1, so as to make the specified printer execute the printing operation. The CPU 30 receives the performance information regarding the performance of the specified printer 60 (70 or 80) sent back from the real printer driver 130 (140 or 150) in response to the output command, and converts the extracted data on the preset pages into print data adequate for the output resources of the respective pages, based on the input performance information as well as the information with regard to the basic settings of printing and the information with regard to the paper settings included in the property data (excluding the information regarding the printer group and the distributed form). The process of such data conversion is called the rendering process. Final print data is generated as the result of the rendering process and is output to the real printer driver 130 (140 or 150) of the printer 60 (70 or 80) specified by the value of the printer counter C1.

The CPU 30 then increments the value of the printer counter C1 by one (step B300) and determines whether or not the current value of the printer counter C1 exceeds a value LC1 representing the last printer (step B310). When it is determined that the current value of the printer counter C1 does not exceed the value LC1 representing the last printer, the program returns to step B290 and generates and outputs the final print data on each page of the print job with the next printer 70 (80 or 60) specified by the incremented value of the printer counter C1. As discussed above, the processing of steps B290 to B310 is described to generate and output the final print data regarding the first page to the last page sequentially by the printer unit, that is, from the first printer to the last printer. Such description is, however, for convenience of illustration in the flowchart. The actual procedure carries out generation and output of the final print data regarding the first page to the last page by the respective printers in parallel by time sharing.

With the progress of the process of outputting the final print data to the respective printers 60, 70, and 80, the contents of the 'Distributed Printing Utility' window WN4 displayed on the CRT display 12 are updated according to the window updating routine. Namely the 'Status' field in the job list box LST1 and the 'Status' and 'Finished to' fields in the distributed status list box LST2 on the 'Distributed Printing Utility' window WN4 are updated according to the state of printing affected by the output of the final print data.

When it is determined at step B310 that the current value of the printer counter C1 exceeds the value LC1 representing the last printer, on the other hand, the program determines that generation and output of the final print data has been concluded for all the pages of the print job required for printing with all the printers. The CPU 30 minimizes and inactivates the 'Distributed Printing Utility' window WN4 on the CRT display 12 (step B320) and terminates the iterative execution of the window updating routine at the preset time intervals (step B330). The program then exits from this distributed printing process routine.

According to the distributed printing process routine discussed above, the virtual printer driver 110 generates and temporarily stores the intermediate print file MF into the HDD 41, and the distributed printing is carried out with this intermediate print file MF. In the course of distributed printing, the 'Distributed Printing Utility' window WN4 gives a display showing a list of jobs in printing or in a waiting queue.

B1-2. Re-Printing Process Routine

The computer system of the embodiment utilizes the intermediate print file MF for distributed printing. The intermediate print file MF is also usable for re-printing after conclusion of the distributed printing process. The following describes a series of processing for such re-printing.

Figure 26:
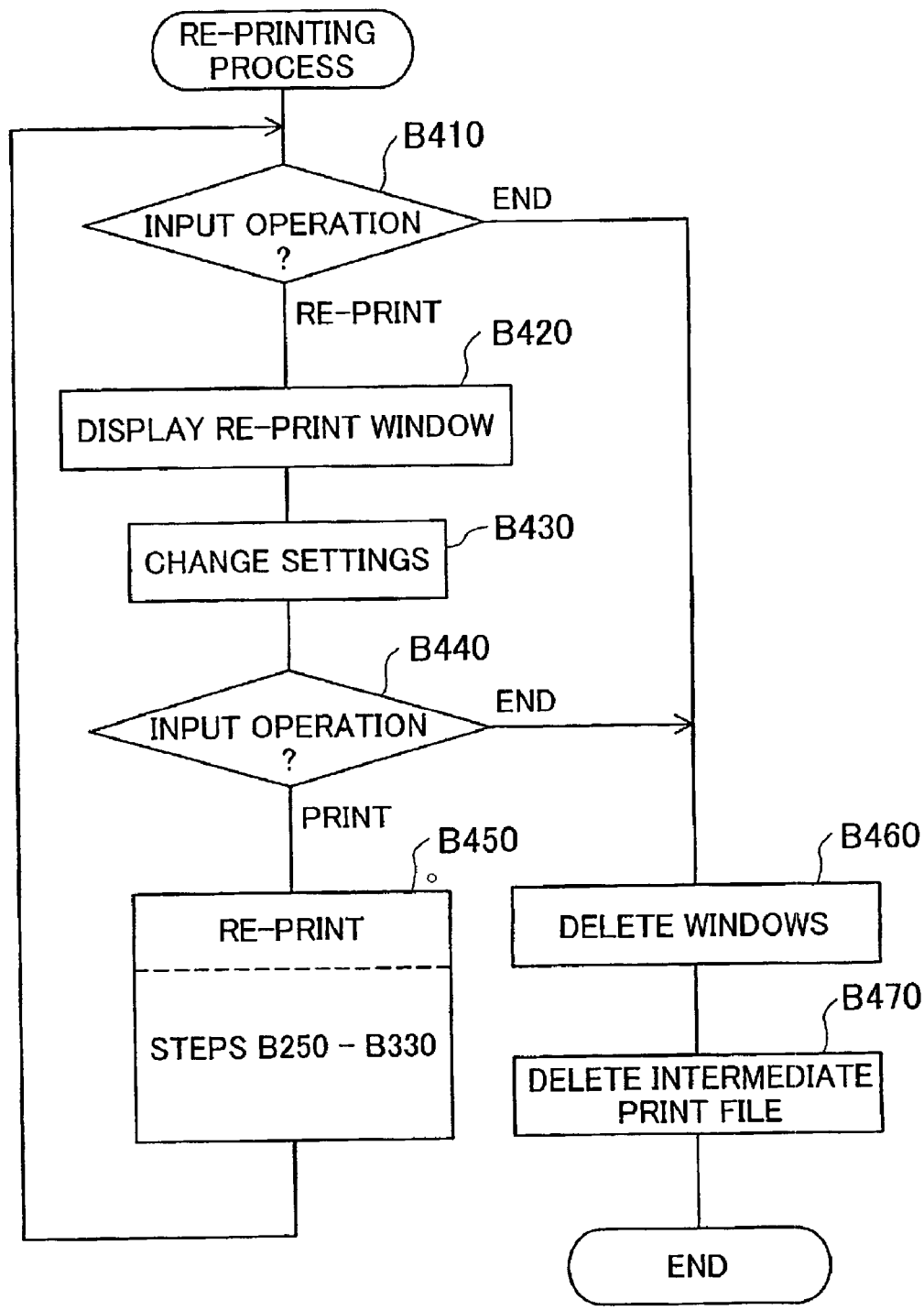
FIG. 26 is a flowchart showing a re-printing process routine executed by the CPU 30.

FIG. 26 is a flowchart showing a re-printing process routine executed by the CPU 30. This re-printing process routine is iteratively executed at preset time intervals. When the program enters this routine, the CPU 30 first reads an input operation with the mouse 20 or the keyboard 18 and determines whether or not a re-print command is input to re-execute a print job, which has already been concluded (step B410).

Figure 27:
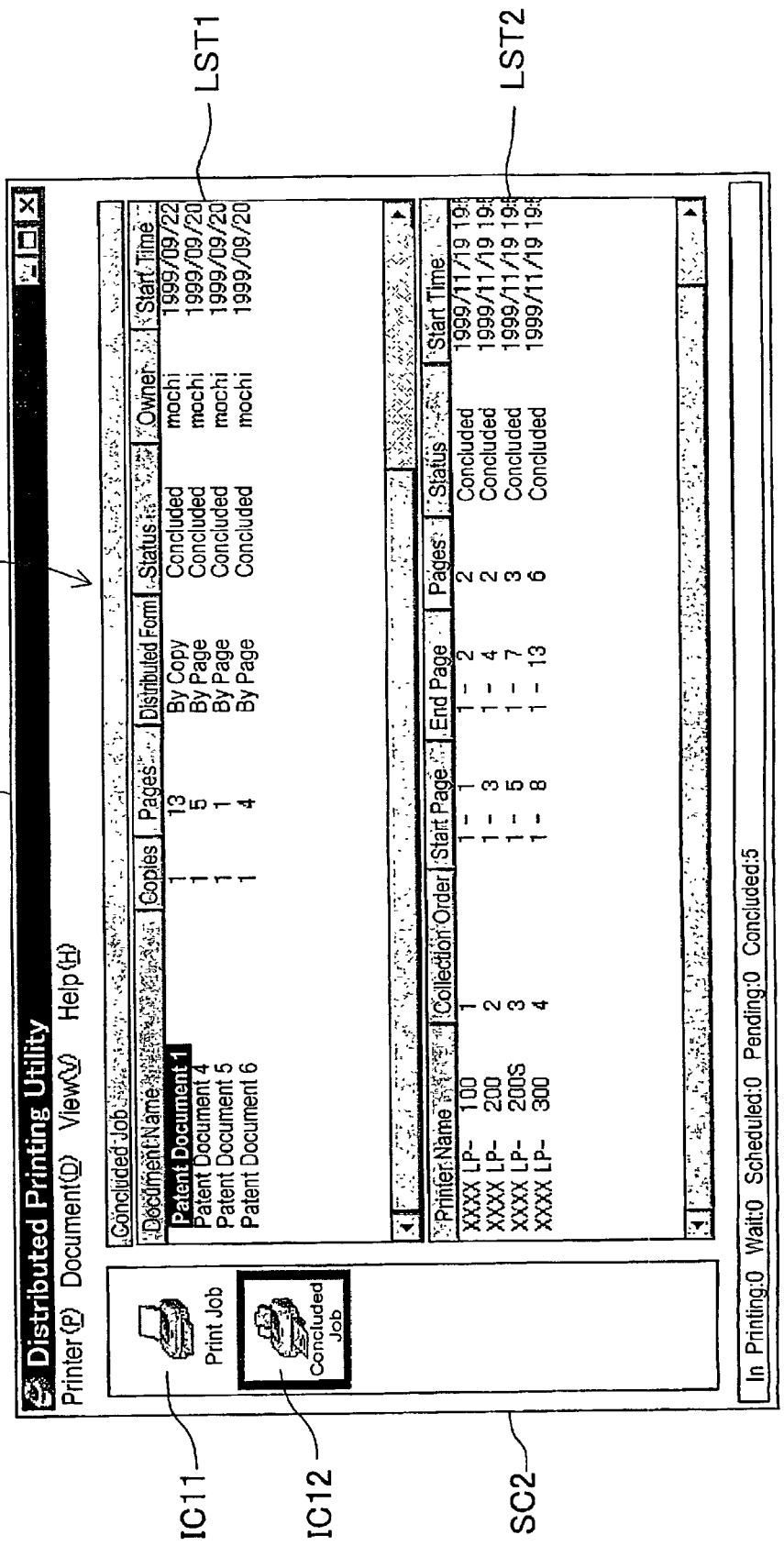
FIG. 27 illustrates the 'Distributed Printing Utility' window WN4 with a concluded job list shown in its job list box LST1.

FIG. 27 illustrates the 'Distributed Printing Utility' window WN4 with a concluded job list shown in the job list box LST1. This window WN4 opens on the CRT display 12 in response to a click of a button included in the task bar on the desktop after conclusion of the distributed printing process routine described above (that is, a button allocated to the minimized window WN4 at step B320) with the mouse 20. In the illustrated example of FIG. 27, it is assumed that the icon IC12 in the sub window SC2 is clicked with the mouse 20 in the 'Distributed Printing Utility' window WN4. In response to the click of the icon IC12, a concluded job list enumerating jobs that have already been printed is displayed in the job list box LST1.

Like the print job list shown in FIG. 24, the concluded job list has the fields 'Document Name', 'Copies', 'Pages', 'Distributed Form', 'Status', 'Owner', and 'Start Time'. The jobs in printing or in a waiting queue shown in the 'Distributed Printing Utility' window WN4 illustrated in FIG. 24 are changed to the concluded jobs shown in FIG. 27 when the jobs have been concluded. The distributed status list box LST2 is present below the job list box LST1 and shows the distributed status of a selected job among the plurality of jobs displayed in the job list box LST1. In this distributed status list box LST2, each row corresponds to one destination of distribution and has the fields 'Printer Name', 'Collection Order', 'Start Page', 'End Page', 'Pages', 'Status', and 'Start Time'. The difference from the fields in the print job list displayed in response to a click of the icon IC11 is to exclude the 'Finished to' field and include the 'Collection Order' and 'Pages' fields. The 'Collection Order' field shows the ordinal number of collection allocated to each printer to complete a preset sequence of collected prints. The 'Pages' field shows the number of pages included in each resulting print output from the specified printer.

Figure 28:
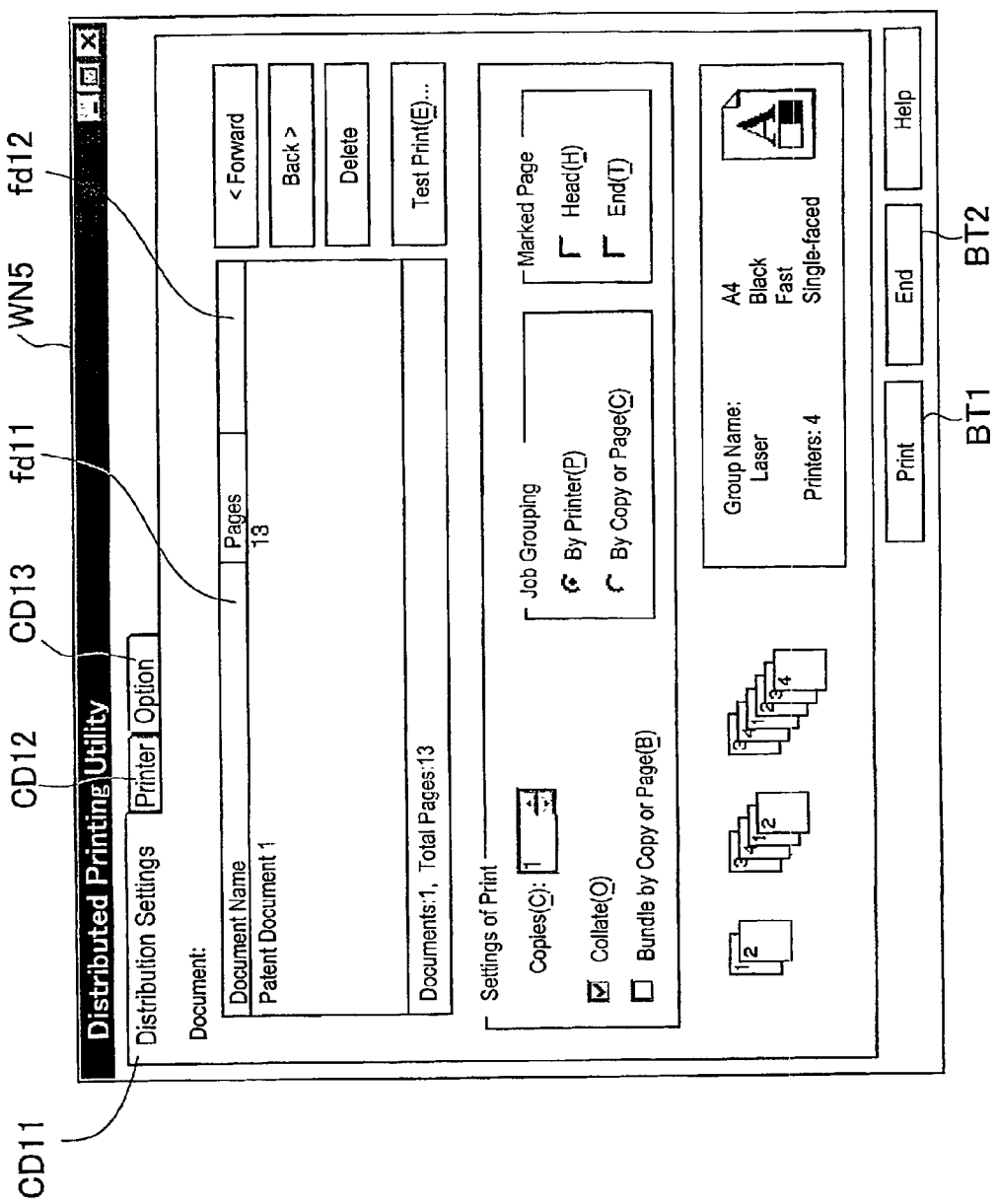
FIG. 28 illustrates a re-print window WN5.

The re-print command is activated at step B410, for example, by right clicking the position of a target print job of re-print in the concluded job list and selecting 'Re-print' on a dialog box thus opened. The CPU 30 determines that the re-print command is input in response to such operations of the mouse 20. When it is determined at step B410 that the re-print command is input, the CPU 30 opens a re-print window on the CRT display 12 (step B420). FIG. 28 illustrates a re-print window WN5. As illustrated, the re-print window WN5 includes three cards 'Distribution Settings', 'Printer', and 'Options' CD11, CD12, and CD13.

The 'Distribution Settings' card CD11 is used to set information regarding the distributed form in re-print. The 'Printer' card CD12 is used to set information regarding the printer group as the potential destinations of distribution in re-print, information regarding the basic settings of printing, and information regarding the paper settings. The 'Options' card CD13 is used to set other additional pieces of information. The 'Distribution Settings' card CD11 has a 'Document Name' field fd11 showing the names of print documents to be re-printed and a 'Pages' field fd12 showing the number of pages included in each document, in addition to the several data input fields identical with those in the 'Distribution Settings' card CD1 displayed in the 'Distributed Printing Properties' dialog box WN2 discussed previously with FIG. 6. The 'Printer' card CD12 is identical with the 'Printer' card CD12 displayed in the 'Distributed Printing Properties' dialog box WN2 discussed previously. The settings in the previous printing operation, that is, the settings of the printer property data, are kept as defaults of the respective fields included in the 'Distribution Settings' card CD11 and the 'Printer' card CD12.

The operator checks the name of the document to be re-printed and the distributed form in re-print in the re-print window WN4 displayed on the CRT display 12, changes the number of copies and the printer group specified as the output resource according to the requirements (step B430), and clicks a 'Print' button BT1 in the 'Distribution Settings' card CD11. After the display of the re-print window WN4 at step B420, the CPU 30 reads an input operation on the re-print window WN4 with the mouse 20 or the keyboard 18 and determines whether or not the 'Print' button BT1 is clicked to output a print start command (step B440).

When it is determined at step B430 that the print start command is input, the CPU 30 executes the processing of steps B250 to B330 discussed above (that is, the series of processing shown in FIG. 20) and re-prints the specified document with the intermediate print file MF left in the HDD 41 (step B450). The program then returns the processing to step B410.

When it is determined at step B410 that an end command is input by clicking a symbol 'x' on the right end of the title bar on the 'Distributed Printing Utility' window WN4 or when it is determined at step B430 that the end command is input by clicking an 'End' button BT2 on the re-print window WN5, the CPU 30 deletes the display of the 'Distributed Printing Utility' window WN4 and the re-print window WN5 (step B460). The CPU 30 also deletes the intermediate print file MF and the printer property data from the HDD 41 (step B470). The program then goes to END and exits from this series of processing by the distributed printing utility.

B2. Effects of Embodiment

In the second embodiment having the configuration discussed above, the intermediate print data is obtained by simple output of a print command from the application program 100 to the virtual printer driver 110, and the distributed printing of the intermediate print data with the printers 60, 70, and 80 is automatically carried out. The operator is thus only required to execute the 'Print' command once on the application program for distributed printing with multiple printers. This arrangement effectively ensures the excellent operatability. The procedure of this embodiment further enables a specified document to be re-printed without activating the application program after the distributed printing has once been concluded, for example, when there is some failure in resulting prints or when the number of copies is insufficient. This ensures the good operatability in the case of re-print. The arrangement of the embodiment uses the re-print window WN4 to change the settings of the printer property data in re-print, for example, the information with regard to the distributed form and the information with regard to the destinations of distribution, from the settings in the first print. This further enhances the operatability of re-print.

In the structure of this embodiment, a list of jobs in printing or in a waiting queue is displayed in the 'Distributed Printing Utility' window WN4. Information on bundling of the print job as one piece of information with regard to the distributed form and information on the current state of each printer specified as the destination of distribution are simultaneously displayed in this window WN4. This arrangement enables the operator to quickly grasp the specified allocation and any problem arising in each printer, such as 'Out of Paper', on one window. The operator can thus quickly obtain required pieces of information in case of any failure of printing or any other trouble and take an adequate countermeasure. This arrangement thus ensures excellent operatability.

In the structure of this embodiment, even after conclusion of the distributed printing of one unit of print data specified as a job, the job is not deleted but is left as a concluded job in the concluded job list on the 'Distributed Printing Utility' window WN4. This arrangement enables the operator to check the information with regard to the allocation of each concluded job and the information with regard to the current working status of each printer specified as the destination of distribution.

A right click at the position of a selected job in the concluded job list makes the switch for starting re-print appear. This arrangement effectively ensures excellent operatability for re-print.

In this embodiment, the 'Collection Order' field is included in the distributed status list box LST2 under the display of the concluded job list. The operator fetches the resulting prints in the order of collection specified in the 'Collection Order' field to arrange the resulting prints in a desired sequence.

In the structure of this embodiment, the information with regard to the distributed form and the information with regard to the printer group as the potential destination of distribution are set in the 'Distributed Printing Properties' dialog box WN2. This arrangement enables the operator to readily set various pieces of information required for specifying the printers as the destinations of distribution.

In the distributed printing control apparatus of the second embodiment according to the present invention, print data is directly output from one computer 10 to the multiple printers 60, 70, and 80. Another possible application is a client-server system, in which a server may be provided on the computer network 90 to manage distributed printing with multiple printers. In this application, the virtual printer driver is incorporated in each client, and the distributed printing utility is incorporated in the server.

C. Third Embodiment

C1. General Hardware Structure

Figure 29:
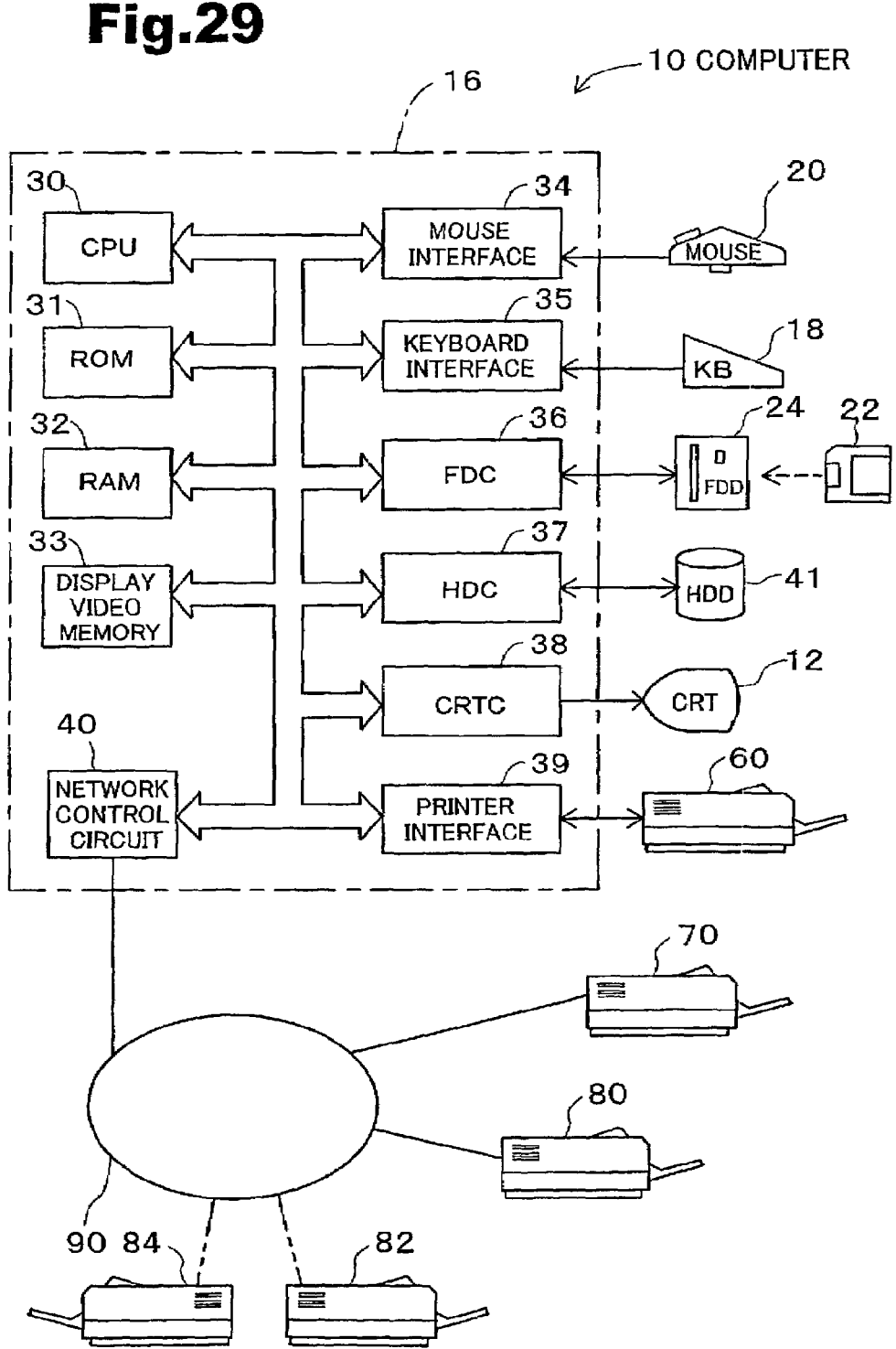
FIG. 29 is a block diagram schematically illustrating the hardware structure of a computer system in a third embodiment of the present invention.

A third embodiment of the present invention has a characteristic structure while sharing many constituents with the first embodiment. The following discussion mainly regards the difference between the third embodiment and the first embodiment. FIG. 29 is a block diagram schematically illustrating the hardware structure of a computer system in the third embodiment of the present invention. As illustrated, the computer system of the third embodiment has a similar hardware structure to that of the computer system of the first embodiment (where like numerals denote like parts), except that four printers 70, 80, 82, and 84 are connected to the computer 10 via the computer network 90. Namely the computer 10 is connected with the total of five printers 60, 70, 80, 82, and 84 including the locally connected printer 60. In this embodiment, the printers 60, 70, 80, 82, and 84 are of different types.

C2. Distributed Printing Process

In the computer system of the above configuration, the computer main body 16 generates print data to be printed and carries out a distributed printing process to distribute the generated print data into multiple printers selected among the printers 60, 70, 80, 82, and 84 connecting with the computer main body 16 for printing (here it is assumed that the three printers 60, 70, and 80 are selected). The details of the distributed printing process are discussed below.

Figure 30:
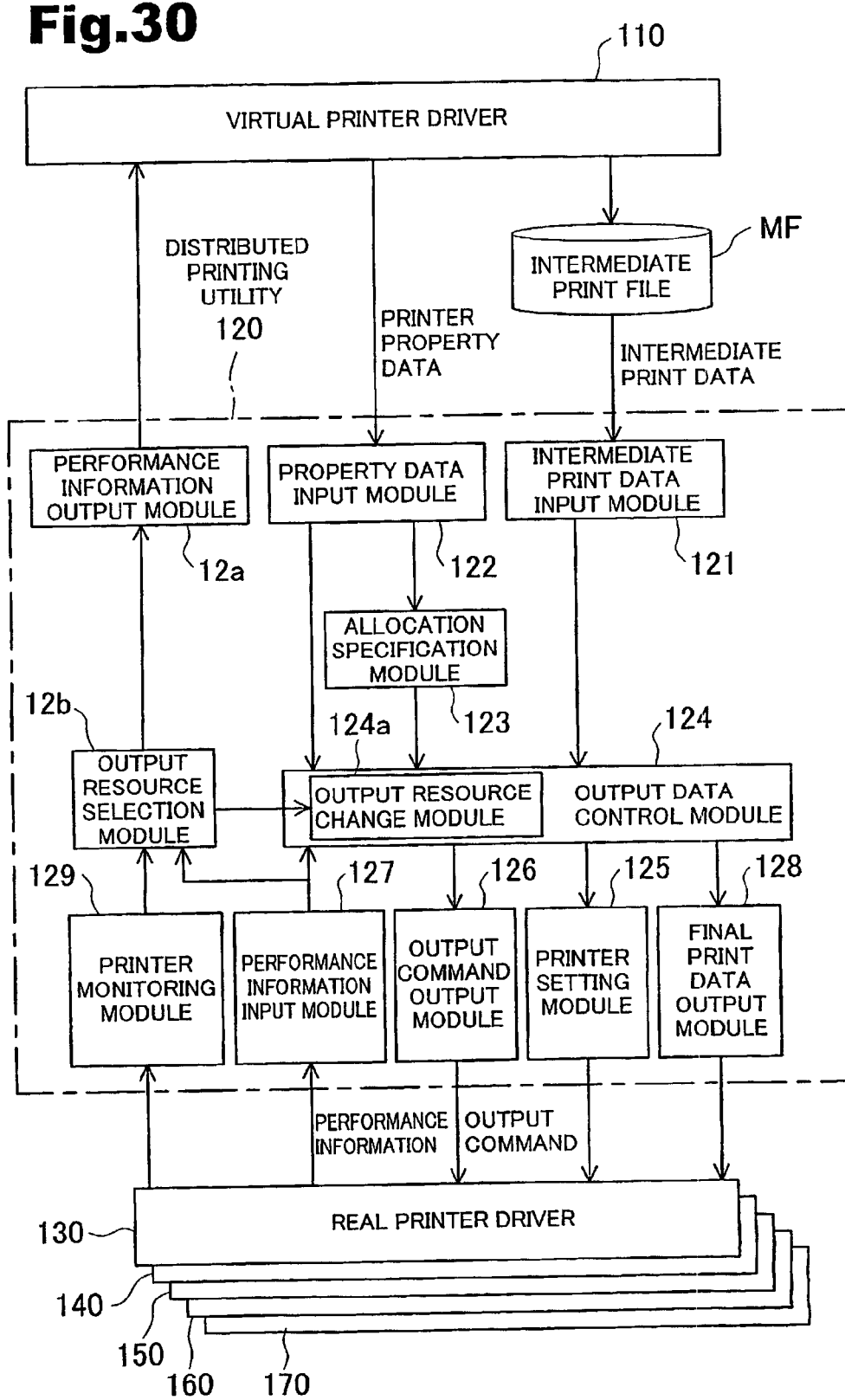
FIG. 30 is a block diagram showing the functions of a distributed printing utility 120, which actualizes part of the distributed printing process.

The general flow of the distributed printing process executed in the third embodiment and the series of processing executed by the virtual printer driver 110 for the distributed printing process are identical with those of the first embodiment and shown in FIGS. 2 and 3. The third embodiment is characterized by the series of processing executed by the distributed printing utility 120 as shown in FIG. 30. As shown in FIG. 30, the distributed printing utility 120c of the third embodiment includes the same constituents as those of the first embodiment, that is, an intermediate print data input module 121, a property data input module 122, an allocation specification module 123, an output data control module 124, a printer setting module 125, an output command output module 126, a performance information input module 127, a final print data output module 128, a printer monitoring module 129, and a performance information output module 12a (they are expressed by the same numerals). The distributed printing utility 120c of the third embodiment additionally has an output resource selection module 12b and an output resource change module 124a included in the output data control module 124 as the constituents characteristic of the third embodiment.

The printer monitoring module 129 is identical with that of the first embodiment. Since the five printers are connected to the computer main body 16 in this embodiment, the printer monitoring module 129 monitors the conditions of all the printers 60, 70, 80, 82, and 84, based on signals output from real printer drivers 130, 140, 150, 160, and 170 individually provided for the respective types of the five printers 60, 70, 80, 82, and 84. The printer monitoring module 129 monitors the length of a waiting queue and occurrence of any error (for example, failure, paper jam, or shortage of expendables like out-of-paper) in each of the printers. The printer monitoring module 129 effectively functions to prevent any potential troubles due to the situation that a certain printer has a long waiting queue and requires a long time to complete a new print job or that a certain printer is in an error state and is incapable of printing.

The output resource selection module 12b receives signals output from the printer monitoring module 129 and the performance information input module 127 and, when some trouble arises in a certain printer, for example, the printer 70, among the multiple printers specified as the destinations of distribution, selects an alternative printer for the printer 70 in trouble. The alternative printer is selected among all the printers 60, 70, 80, 82, and 84 connecting with the computer main body 16 except the printer 70 in trouble. The selection is carried out by taking into account the performance information of the printers 60, 80, 82, and 84, which have been transmitted via the performance information input module 127 from the real printer drivers 130, 150, 160, 170 individually provided for the respective types of the printers 60, 80, 82, and 84, as discussed later in detail. The result of the selection by the output resource selection module 12b is sent to the output resource change module 124a included in the output data control module 124. The output resource change module 124a changes the output resource of the allocated print data from the printer in trouble to the selected alternative printer, based on the result of the selection by the output resource selection module 12b.

The performance information of the respective printers 60, 70, and 80 specified as the destinations of distribution (the alternative printer when the output resource selection module 12b selects the alternative printer as the new output resource), which have been transmitted from the real printer drivers 130, 140, 150, 160, and 170, is utilized by the distributed printing utility 120 as described above, while being transmitted to the virtual printer driver 110 via the performance information output module 12a.

C3. Virtual Printer Driver

Figure 31:
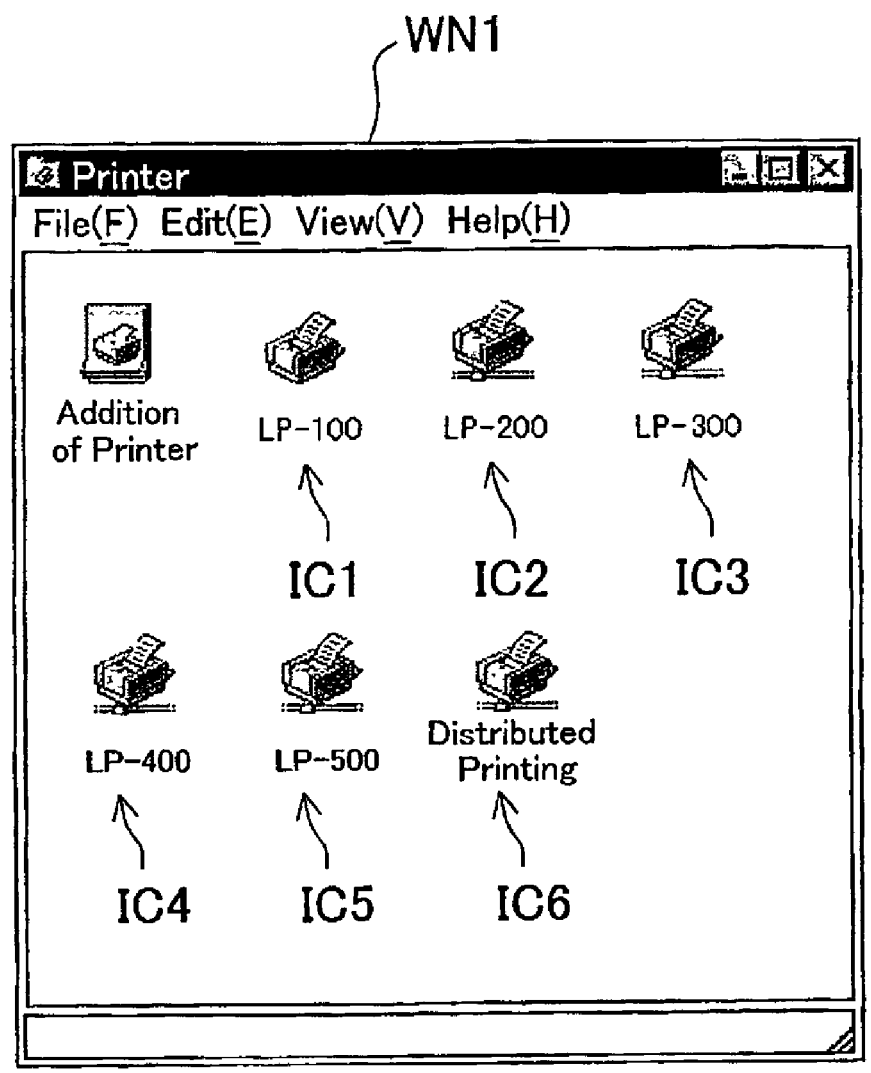
FIG. 31 illustrates a 'Printer' window WN1.

FIG. 31 illustrates a 'Printer' window. In the case where the virtual printer driver 110 is installed in the computer 10 an icon IC6 that corresponds to the virtual printer driver 110 and is expressed as, for example, 'Distributed Printing' is displayed in the illustrated 'Printer' window WN1, in addition to icons IC1, IC2, IC3, IC4, and IC5 representing the real printer drivers 130, 140, 150, 160, and 170 individually provided for the respective types of the printers 60, 70, 80, 82, and 84. Like the real printer driver, installation of the virtual printer driver 110 causes the icon IC6 corresponding to the virtual printer driver 110 to be displayed in the 'Printer' window WN1.

The operator double clicks the icon IC6 'Distributed Printing' corresponding to the virtual printer driver 110 on the 'Printer' window WN1 to open a window of the virtual printer driver 110 and clicks 'Printer' and 'Properties' in the window. This series of operations opens a dialog box 'Distributed Printing Properties' for setting various pieces of information with regard to the virtual printer. The operator can input the settings of the various pieces of information in the dialog box 'Distributed Printing Properties' through the operations of the mouse 20 and the keyboard 18. This dialog box 'Distributed Printing Properties' corresponds to the user interface 116 mentioned previously.

C4. User Interface

Figure 32:
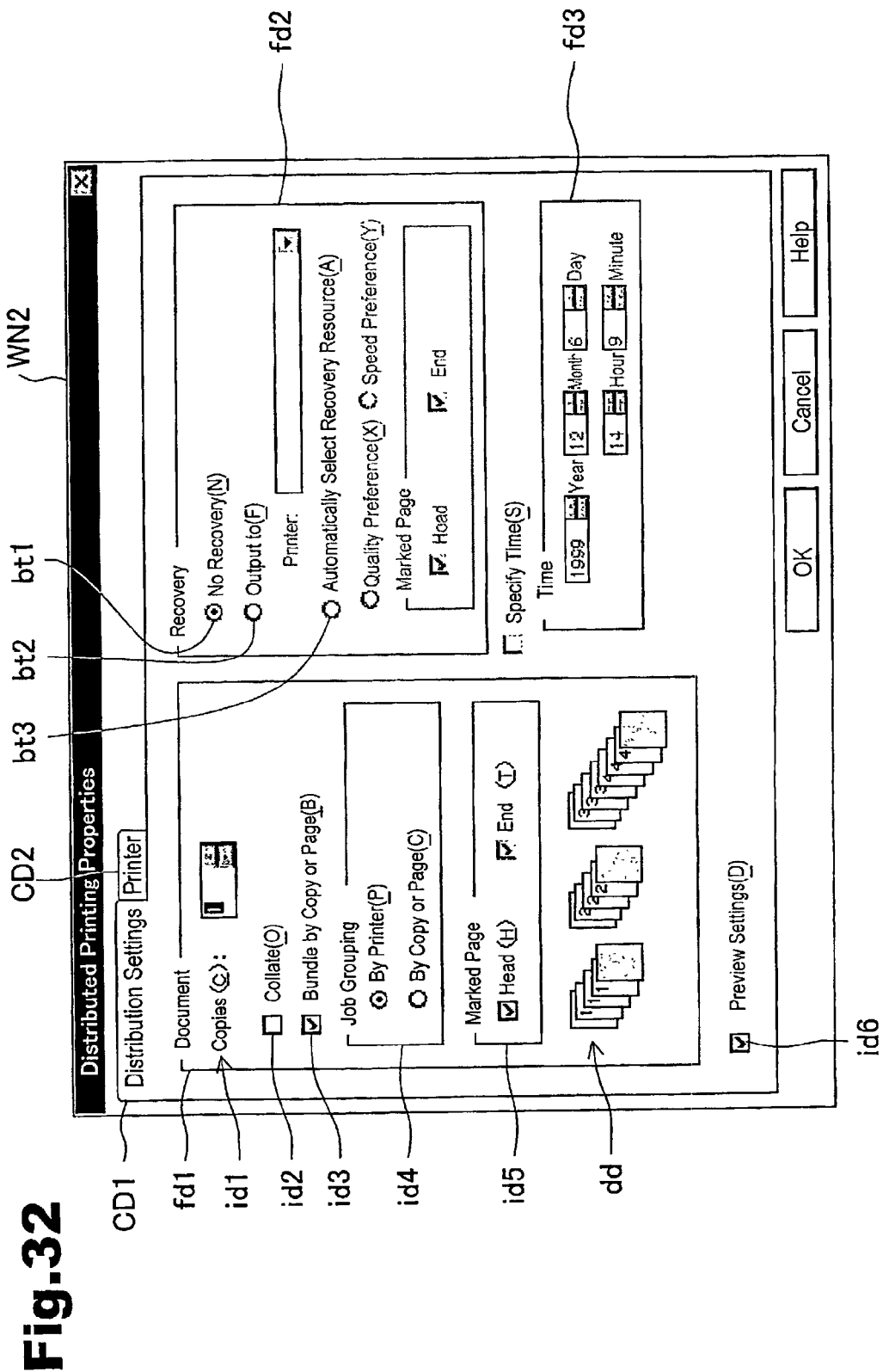
FIG. 32 illustrates a 'Distribution Settings' card CD1 displayed on a 'Distributed Printing Properties' dialog box WN2.

FIG. 32 illustrates a 'Distributed Printing Properties' dialog box WN2. This 'Distributed Printing Properties' dialog box WN2 is identical with that of the first embodiment. The following description supplements the details of the 'Distributed Printing Properties' dialog box WN2.

The 'Copies' data input box id1 and the 'Collate' check box id2 follow the description of the first embodiment. The 'Bundle by Copy or Page' check box id3 is designed to attain the following functions. A check in this check box id3 prohibits one copy or one set of identical pages from being printed with multiple printers. No check in the check box id3, on the other hand, allows the copy or the set of identical pages to be printed with multiple printers. In the off state of this check box id3, that is, in the case of not 'Bundle by Copy or Page', the number of pages allocated to each printer is varied according to the performance of the printing speed (hereinafter referred to as the printing speed performance) of the printer, so as to conclude the printing operation substantially simultaneously in all the printers specified as the destinations of distribution. Hereinafter this working state in which the number of pages allocated to each printer is varied according to the printing speed performance is referred to as the 'speed preference' mode, which will be discussed later in detail. The 'Job Grouping' data input box id4, the 'Marked Page' data input box id5, and the distributed form display box dd follow the description of the first embodiment.

Here the 'Collate' check box id2 corresponds to the 'third command' input module discussed in the claims. The 'Bundle by Copy or Page' check box id3 corresponds to the 'first command' input module discussed in the claims. The 'Job Grouping' data input box id4 corresponds to the 'second command' input module discussed in the claims.

The following describes a change of the illustrated image in the distributed form display box dd by the combination of the settings in the data input boxes id1 to id5 with reference to FIGS. 33 through 36. The description first regards a change of the illustrated image by the combination of the settings in the 'Copies' data input box id1, the 'Collate' check box id2, and the 'Bundle by Copy or Page' check box id3.

Figure 33:
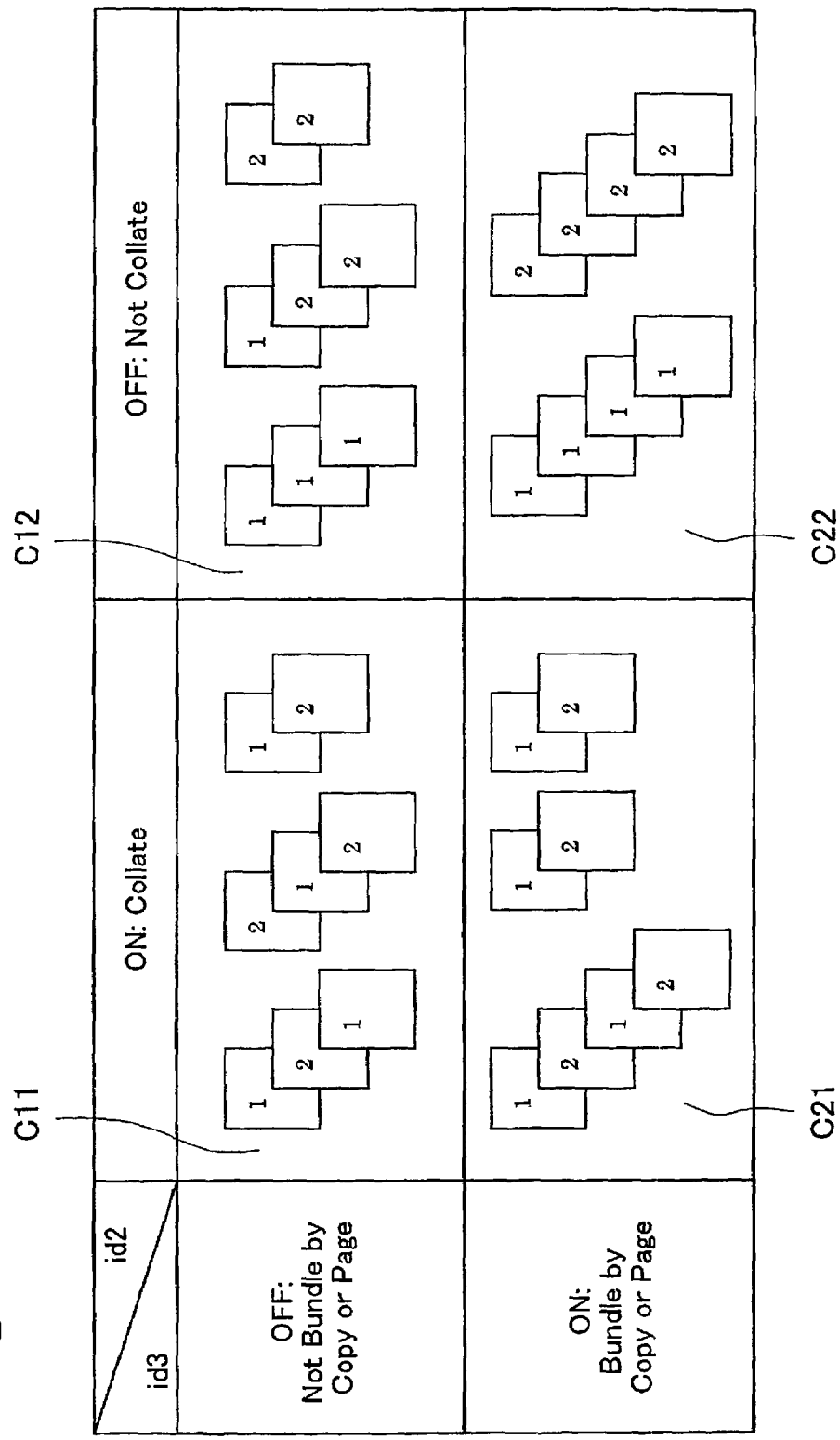
FIG. 33 shows a change of an illustrated image in a distributed form display box by the combination of the settings in data input boxes id1 to id3.

FIG. 33 shows a change of the illustrated image in the distributed form display box dd by the combination of the settings in the data input box id1 and the two check boxes id2 and id3. In the illustration of the table, the columns show whether or not the print job is to be collated, that is, the on-off settings in the 'Collate' check box id2. The rows show whether or not the print job is to be bundled by copy or page, that is, the on-off settings in the 'Bundle by Copy or Page' check box id3. In the example of the table, it is assumed that the number of copies set in the 'Copies' data input box id1 is four copies.

In the combination of 'Collate' and not 'Bundle by Copy or Page', the gathering print is selected. As shown in a cell C11 of the first row and the first column in the table, the illustrated image shows that the $1^{st}$ and the $2^{nd}$ pages of the $1^{st}$ copy and the $1^{st}$ page of the $2^{nd}$ copy are printed with the first printer 60, that the $2^{nd}$ page of the $2^{nd}$ copy and the $1^{st}$ and the $2^{nd}$ pages of the $3^{rd}$ copy are printed with the second printer 70, and that the $1^{st}$ and the $2^{nd}$ pages of the $4^{th}$ copy are printed with the third printer 80. (Here the ordinal numbers, the first, the second and the third, follow the order of priority allocated to the respective printers as discussed later).

In the combination of not 'Collate' and not 'Bundle by Copy or Page', the stack print is selected. As shown in a cell C12 of the first row and the second column in the table, the illustrated image shows that three copies of the $1^{st}$ page are printed with the first printer 60, that the remaining copy of the $1^{st}$ page and two copies of the $2^{nd}$ page are printed with the second printer 70, and that the remaining copies of the $2^{nd}$ page are printed with the third printer 80.

In the combination of 'Collate' and 'Bundle by Copy or Page', printing each specified group with multiple printers is prohibited. As shown in a cell C21 of the second row and the first column in the table, the illustrated image shows that the $1^{st}$ page of the $1^{st}$ copy to the $2^{nd}$ page of the $2^{nd}$ copy are printed with the first printer 60, that the $1^{st}$ and the $2^{nd}$ pages of the $3^{rd}$ copy are printed with the second printer 70, and that the $1^{st}$ and the $2^{nd}$ pages of the $4^{th}$ copy are printed with the third printer 80.

In the combination of not 'Collate' and 'Bundle by Copy or Page', as shown in a cell C22 of the second row and the second column in the table, the illustrated image shows that the required number of copies of the $1^{st}$ page are printed with the first computer 60 and that the required number of copies of the $2^{nd}$ page are printed with the second computer 70.

The example shown in the cells C11 and C12 of the first row in the table of FIG. 33 is on the assumption that the printers 60, 70, and 80 specified as the destinations of distribution have substantially equal printing speed performances. When the printers 60, 70, and 80 have substantially equal printing speed performances, practically similar numbers of pages are allocated to the respective printers. When the printers 60, 70, and 80 specified as the destinations of distribution have different printing speed performances, on the other hand, different numbers of pages are allocated to the different types of printers. This is allocation of distributed printing in the 'speed preference' mode. For example, the printing speed performance of the first printer 60 is 20 ppm (pages per minute), the printing speed performance of the second printer 70 is 40 ppm, and the printing speed performance of the third printer 80 is 40 ppm. In this example, the ratio of the printing speed performance of the respective printers 60, 70, and 80 is 1:2:2. In the case of allocation of distributed printing in the 'speed preference' mode (that is, in the case of not 'Bundle by Copy or Page' corresponding to the first row in the table), the numbers of pages allocated to the respective printers are determined to follow this ratio of the printing speed performance. The printers 60, 70, and 80 can thus conclude the printing operations almost simultaneously.

Figure 34:
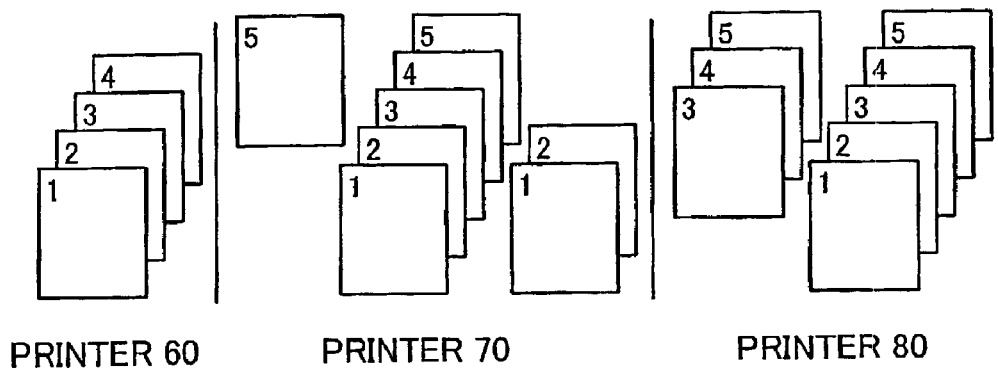
FIG. 34 shows an exemplified allocation of distributed printing in a speed preference mode.

FIG. 34 shows an exemplified allocation of distributed printing in the 'speed preference' mode. In this example, the job of printing four copies of a document including 5 pages is distributed into the three printers 60, 70, and 80. The printing speed performances of the printers 60, 70, and 80 are respectively 20 ppm, 40 ppm, and 40 ppm as mentioned above. In this case, the total number of pages to be printed is 20. The allocation to the first printer 60, to the second printer 70, and to the third printer 80 are respectively 4 pages, 8 pages, and 8 pages according to the ratio of the printing speed performance (1:2:2) of the respective printers 60, 70, and 80. In the case of 'Collate', gathering print is selected as shown in FIG. 34. The $1^{st}$ to the $4^{th}$ pages of the $1^{st}$ copy are printed with the first printer 60. The $5^{th}$ page of the $1^{st}$ copy, the $1^{st}$ to the $5^{th}$ pages of the $2^{nd}$ copy, and the $1^{st}$ and the $2^{nd}$ pages of the $3^{rd}$ copy are printed with the second printer 70. The $3^{rd}$ to the $5^{th}$ pages of the $3^{rd}$ copy and the $1^{st}$ to the $5^{th}$ pages of the $4^{th}$ copy are printed with the third printer 80. In the case of not 'Collate', stack printing is selected, and the numbers of pages allocated to the respective printers 60, 70, and 80 are similarly determined according to the ratio of the printing speed performance (1:2:2) of the respective printers 60, 70, and 80.

Figure 35:
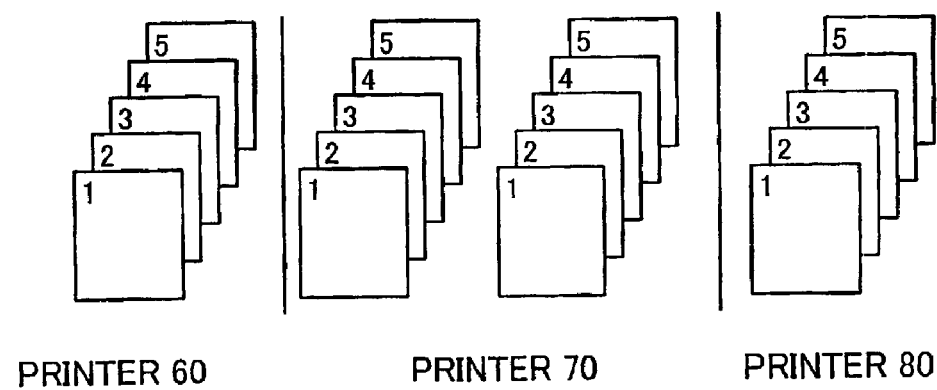
FIG. 35 shows an exemplified allocation of distributed printing in a handling preference mode.

In the arrangement of this embodiment, in the case of not 'Bundle by Copy or Page' on the first row in the table of FIG. 33, allocation of distributed printing is specified in the 'speed preference' mode as discussed above. In the case of 'Bundle by Copy or Page' on the second row in the table of FIG. 33, on the other hand, allocation of distributed printing is specified with preference given to handling (hereinafter this is referred to as the 'handling preference' mode). FIG. 35 shows an exemplified allocation of distributed printing in the 'handling preference' mode. In the 'handling preference' mode, 'Bundle by Copy or Page', that is, allocation of distributed printing to prohibit one copy or one set of identical pages from being printed with multiple printers, facilitates collection of resulting prints from the respective printers. Like the example shown in FIG. 34, in the example of FIG. 35, the job of printing four copies of a document including 5 pages is distributed into the three printers 60, 70, and 80. In the gathering print, the $1^{st}$ to the $5^{th}$ pages of the $1^{st}$ copy are printed with the first printer 60. The $1^{st}$ to the $5^{th}$ pages of the $2^{nd}$ copy and the $1^{st}$ to the $5^{th}$ pages of the $3^{rd}$ copy are printed with the second printer 70. The $1^{st}$ to the $5^{th}$ pages of the $4^{th}$ copy are printed with the third printer 80. In the example of FIG. 35, the second printer 70 prints two copies. This satisfies both the speed preference mode and the handling preference mode. In the speed preference mode, according to the ratio of the printing speed performance 1:2:2, it is expected that the first printer 60 prints one copy, the second printer 70 prints two copies, and the third printer 80 prints two copies. Since only five copies are required, however, the third printer 80 prints the residual one copy.

In the case of 'Bundle by Copy or Page' on the second row in the table of FIG. 33, allocation of distributed printing may be specified to satisfy not the speed preference mode but the handling preference mode. In this case, in the handling preference mode that prohibits one copy or one set of identical pages from being printed with multiple printers, the pages are equally allocated to the respective printers irrespective of the printing speed performances of the printers. In the case where the number of copies can not be equally divided by the number of printers specified as the destinations of distribution as in the examples of FIGS. 34 and 35, the greater number of copies is allocated to the printer having the smaller ordinal number. For example, in the job of printing four copies of a 5-page document with the three printers, the first printer 60 prints two copies, while the second printer 70 and the third printer 80 respectively print one copy.

As described above, in the case of 'Bundle by Copy or Page' on the second row in the table of FIG. 33, allocation of distributed printing may be specified to satisfy both the handling preference mode and the speed preference mode or to satisfy not the speed preference mode but the handling preference mode. The changeover between these two states is based on the settings in the 'Job Grouping' data input box id4. When the radio button 'By Printer' is selected in the data input box id4, all the pages output from one printer are handled as one group. The speed preference mode is thus active to take into account the printing speed performances of the respective printers. When the other radio button 'By Copy or Page' is selected in the data input box id4, one copy or one set of identical pages is handled as one group, so that the speed preference mode is inactive. In the case of selection of the radio button 'By Copy or Page' in the data input box id4, irrespective of the printing speed performances of the respective printers, one copy is allocated to each of available printers and the residual copies are sequentially allocated to the available printers.

Figure 36:
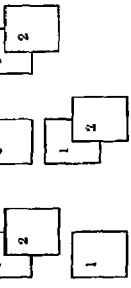
FIG. 36 shows a change of the illustrated image in the distributed form display box by the combination of the settings in data input boxes id4 and id5.

The description then regards a further change of the illustrated image specified by the settings in the data input boxes id1 to id3 by the combination of the settings in the 'Job Grouping' data input box id4 and the 'Marked Page' data input box id5. FIG. 36 shows a change of the illustrated image in the distributed form display box dd by the combination of the data input boxes id4 and id5. The example of FIG. 36 shows a further change of the illustrated image, which is specified by the settings in the data input boxes id1 to id3 in the cell C11 of FIG. 33, by the combination of the settings in the data input boxes id4 and id5.

In the table of FIG. 36, the columns show the settings in the 'Job Grouping' data input box id4, that is, selection of either 'By Printer' or 'By Copy or Page'. The rows show the settings in the 'Marked Page' data input box id5, that is, checks in the two check boxes 'Head' and 'End'.

In the case of a click of the radio button 'By Printer' in the 'Job Grouping' data input box id4, as shown by a cell CE11 of the first row and the first column in the table, the illustrated image in the cell C11 of FIG. 33 is not changed and all the pages printed with one printer are handled as one group. In the case of a click of the other radio button 'By Copy or Page', on the other hand, as shown by a cell CE12 of the first row and the second column, each copy or each page is handled as one group and distinguished from a subsequent group. In the actual services, since no marked page is specified, the same printing results are obtained both in the case of the click of the radio button 'By Printer' and in the case of the click of the other radio button 'By Copy or Page'.

When the marked page is specified in the 'Marked Page' data input box id5, on the other hand, as shown by the second, the third, and the fourth rows in the table, the illustrated image is changed to make the marked pages (closed figures in the table) are inserted at the head, at the end or at both the head and the end of the respective groups specified in the first row. The illustrated image specified by this table is displayed in the distributed form display box dd.

Referring back to FIG. 32, a 'Recovery' field fd2 specifies another printer as a recovery resource in the case of occurrence of any error in the printer specified for distributed printing. The 'Recovery' field fd2 has three radio buttons bt1, bt2, and bt3 'No Recovery', 'Output to', and 'Automatically Select Recovery Resource'. In the case of selection of the 'No Recovery' radio button bt1, no recovery is executed even when an error occurs in the printer specified for distributed printing.

Figure 37:
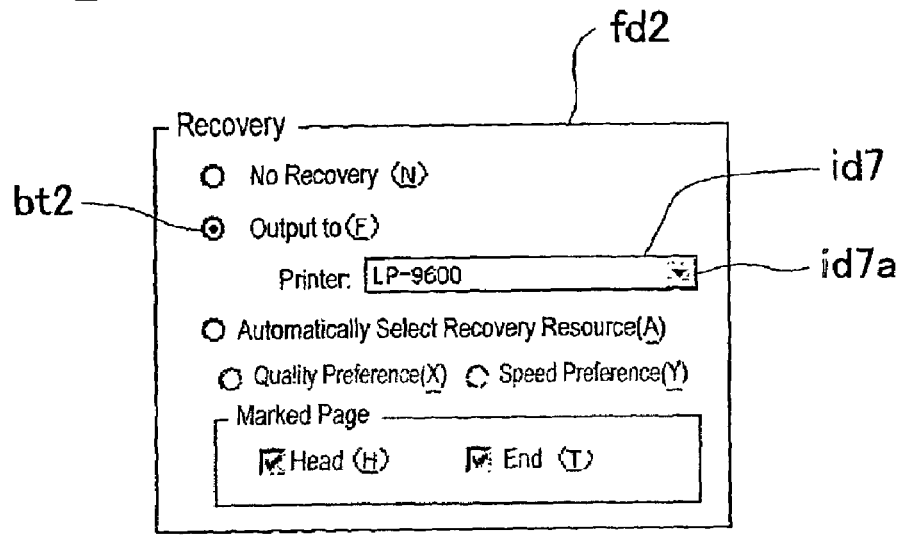
FIG. 37 shows display of a 'Recovery' field fd2 in response to a click of an 'Output to' radio button bt2.

In the case of selection of the 'Output to' radio button bt2 as shown in FIG. 37, the output resource input in a 'Printer' data input box id7 is set as the recovery resource. In accordance with a concrete procedure, a non-illustrated pull-down menu is open in response to a click of a button id7a with an inverse triangle on the right end of the 'Printer' data input box id7. The names of all the printers connecting with the computer main body 16 are preset as possible options in this pull-down menu. The operator clicks one of the options included in the pull-down menu with the mouse 20, so as to input a desired printer name in the data input box id7.

Figure 38:
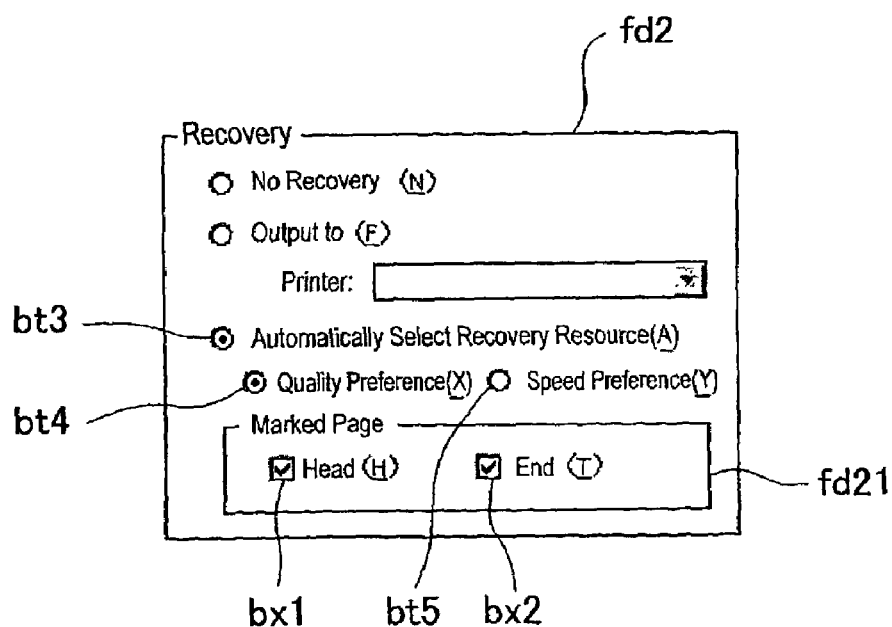
FIG. 38 shows display of the 'Recovery' field fd2 in response to a click of an 'Automatically Select Recovery Resource' radio button bt3.

In the case of selection of the 'Automatically Select Recovery Resource' radio button bt3, the output resource determined according to the following procedure is set as the recovery resource. As shown in FIG. 38, a click of the 'Automatically Select Recovery Resource' radio button bt3 effectuates display of radio buttons bt4 and bt5 'Quality Preference' and 'Speed Preference' below the radio button bt3. The operator clicks a desired one of the radio buttons bt4 and bt5 with the mouse 20 to specify the preference condition for selection of the recovery resource.

When the radio button bt4 is clicked to specify the 'Quality Preference' condition for selection of the recovery resource, the program selects a printer of the same type as the printer with a trouble among all the printers connecting with the computer main body 16 except the printer with the trouble (or select a printer of the identical printing method when there is no printer of the same type), and specifies the selected printer as the recovery resource. If there is no printer of the same type nor printer of the identical printing method among the remaining printers, an available printer (more specifically, a printer of the highest printing speed among a plurality of available printers) is specified as the recovery resource.

When the radio button bt5 is clicked to specify the 'Speed Preference' condition for selection of the recovery resource, on the other hand, a printer of the highest printing speed among all the printers connecting with the computer main body 16 except the printer with a trouble is specified as the recovery resource.

A 'Marked Page' field fd21 is provided below the radio buttons bt4 and bt5. The 'Marked Page' field fd21 has two check boxes bx1 and bx2 to specify whether or not a marked page is to be printed at the head or at the end of each group of resulting prints with the specified recovery resource. When the 'Head' check box bx1 is clicked, the marked page is printed at the head position of each group of resulting prints. When the 'End' check box bx2 is clicked, the marked page is printed at the end position of each group of resulting prints. The name of the originally selected printer (that is, the printer with the trouble), the name of the document to be printed, the total number of pages, the name of the user are printed on the marked page.

A 'Time' field fd3 specifies the printing time. In the case where a 'Specify Time' check box is clicked, the printing operation starts at the time input in the 'Time' field.

Figure 39:
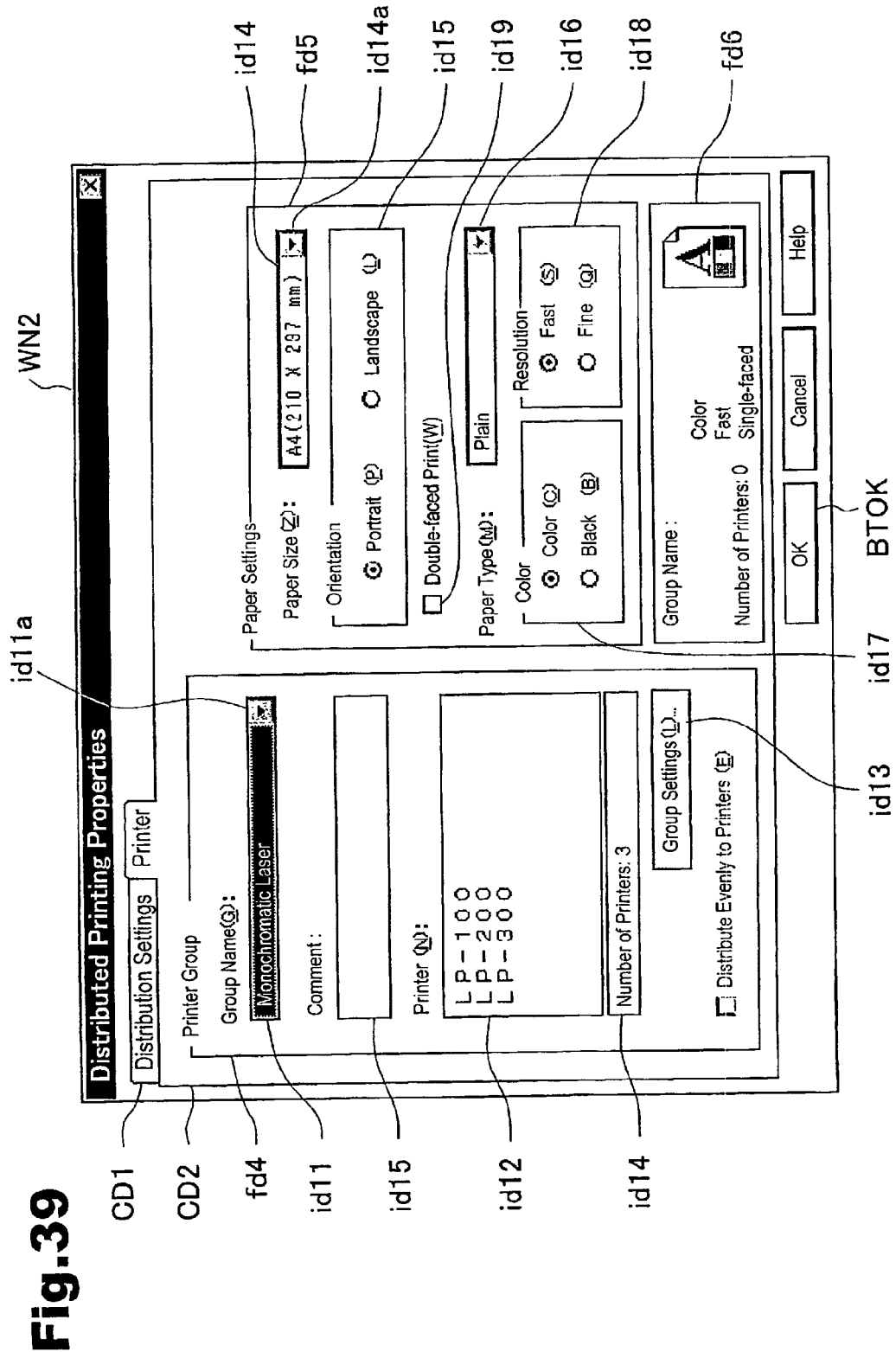
FIG. 39 illustrates a 'Printer' card CD2 displayed on the 'Distributed Printing Properties' dialog box WN2.

The following describes a 'Printer' card CD2 on the 'Distributed Printing Properties' dialog box WN2 with reference to FIG. 39. As illustrated in FIG. 39, the 'Printer' card CD2 includes a 'Printer Group' field fd4, and 'Paper Settings' field fd5, and a settings display box fd6.

The 'Printer Group' field fd4 specifies a group of printers, which are used for distributed printing of a document and attains part of the configuration of the printer specification module of the present invention. The 'Printer Group' field fd4 includes a 'Group Name' data input box id11, a 'Comment' display box id15, a 'Printer' display box id12, a 'Number of Printers' display box id14, and a 'Group Settings' button id13. In the following discussion, the group of printers or the printer group may simply be referred to as the group.

Figure 40:
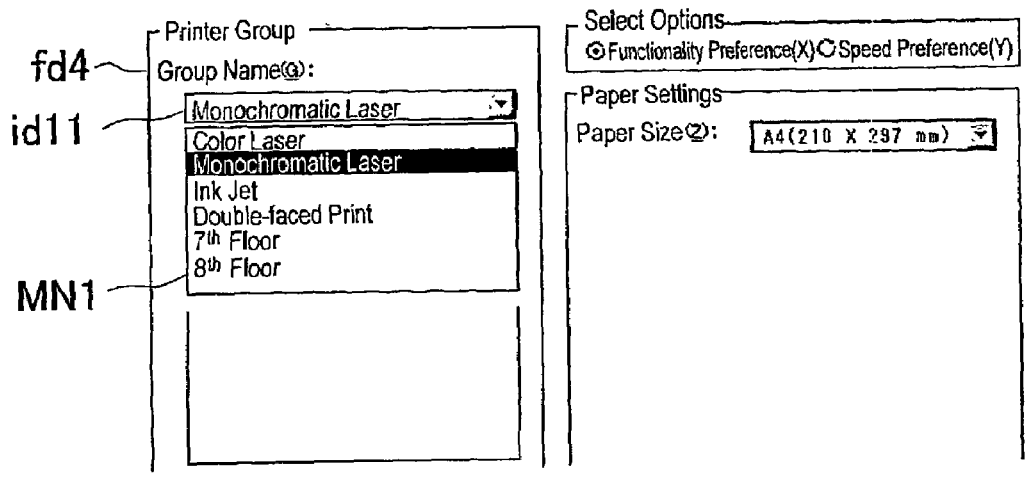
FIG. 40 shows a pull-down menu MN1 used for inputting a group name.

The 'Group Name' data input box id11 sets the name of the group. A click of a button id11a with an inverse triangle on the right end opens a pull-down menu MN1 as shown in FIG. 40. A plurality of group names are preset as possible options in this pull-down menu MN1. The operator clicks one of the options included in the pull-down menu MN1 with the mouse 20, so as to set a desired group name in the data input box id11.

Referring back to FIG. 39, the 'Comment' display box id15 shows any comment given to the currently selected group in the 'Group Name' data input box id11. The 'Printer' display box id12 shows the names of the printers belonging to the currently selected group in the 'Group Name' data input box id11. The 'Number of Printers' display box id14 shows the number of printers used for distribution printing.

The 'Group Settings' button id13 is a switch to start various operations, such as addition of a new group or change of settings in an existing group. The following describes the operation of adding a new group. When the operator clicks the 'Group Settings' button id13 with the mouse 20, a 'Group List' dialog box is open on the CRT display 12.

Figure 41:
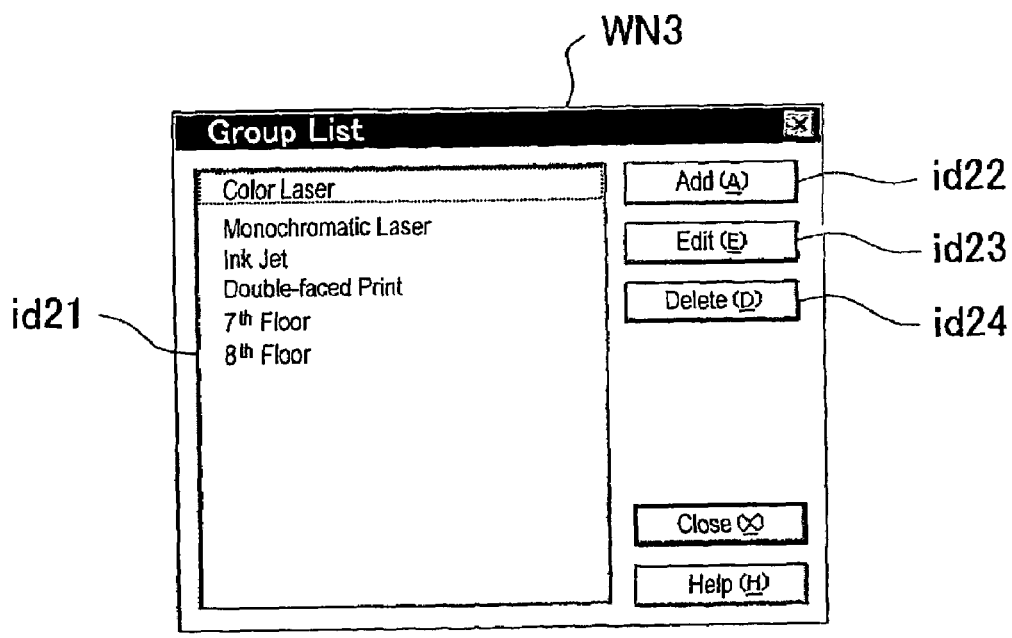
FIG. 41 shows a 'Group List' dialog box WN3.

FIG. 41 shows a 'Group List' dialog box WN3. As illustrated, the 'Group List' dialog box WN3 includes a 'List' display box id21, an 'Add' button id22, an 'Edit' button id23, and a 'Delete' button id24. The 'List' display box id21 shows a list of existing groups. The 'Add' button id22 is used to add a new group to the list. In response to a click of the 'Add' button id22 with the mouse 20, a 'Group Settings' dialog box is open on the CRT display 12. The dialog box WN3 of this embodiment is different from the window WN3 discussed in the first embodiment and the dialog box WN3 discussed in the second embodiment, and the symbols allocated to the respective parts of the dialog box WN3 are also unique to this embodiment. A dialog box WN4 of this embodiment discussed below is also different from the windows WN4 discussed in the first embodiment and the second embodiment, and the symbols allocated to the respective parts of the dialog box WN4 are unique to this embodiment.

Figure 42:
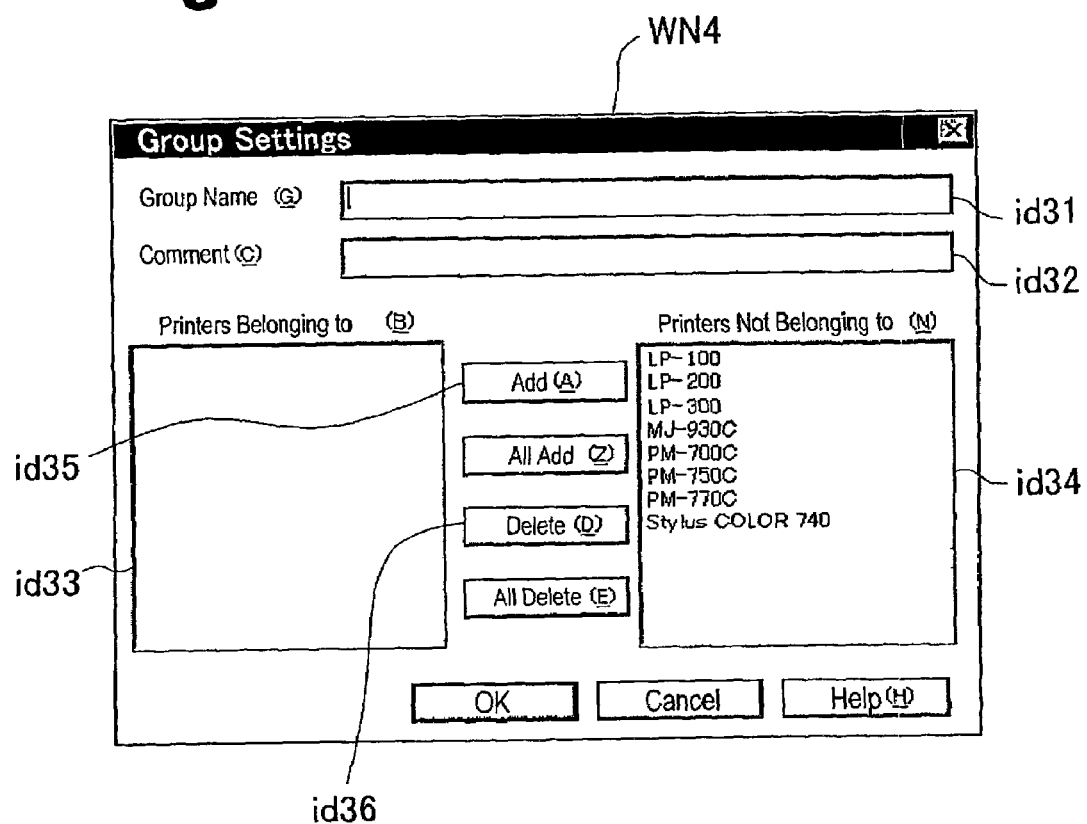
FIG. 42 shows a 'Group Settings' dialog box WN4.

FIG. 42 shows a 'Group Settings' dialog box WN4. As illustrated, the 'Group Settings' dialog box WN4 includes a 'Group Name' data input box id31, a 'Comment' data input box id32, a 'Printers Belonging to' display box id33, and a 'Printers Not Belonging to' display box id34.

The 'Group Name' data input box id31 is used to input the name of the selected group of printers. The 'Comment' data input box id32 is used to input any description of the selected group. The 'Printers Belonging to' display box id33 shows printers belonging to the selected group. The 'Printers Not Belonging to' display box id34 shows printers that are not included in the selected group among a large number of preset printer names.

Figures 43, 44:
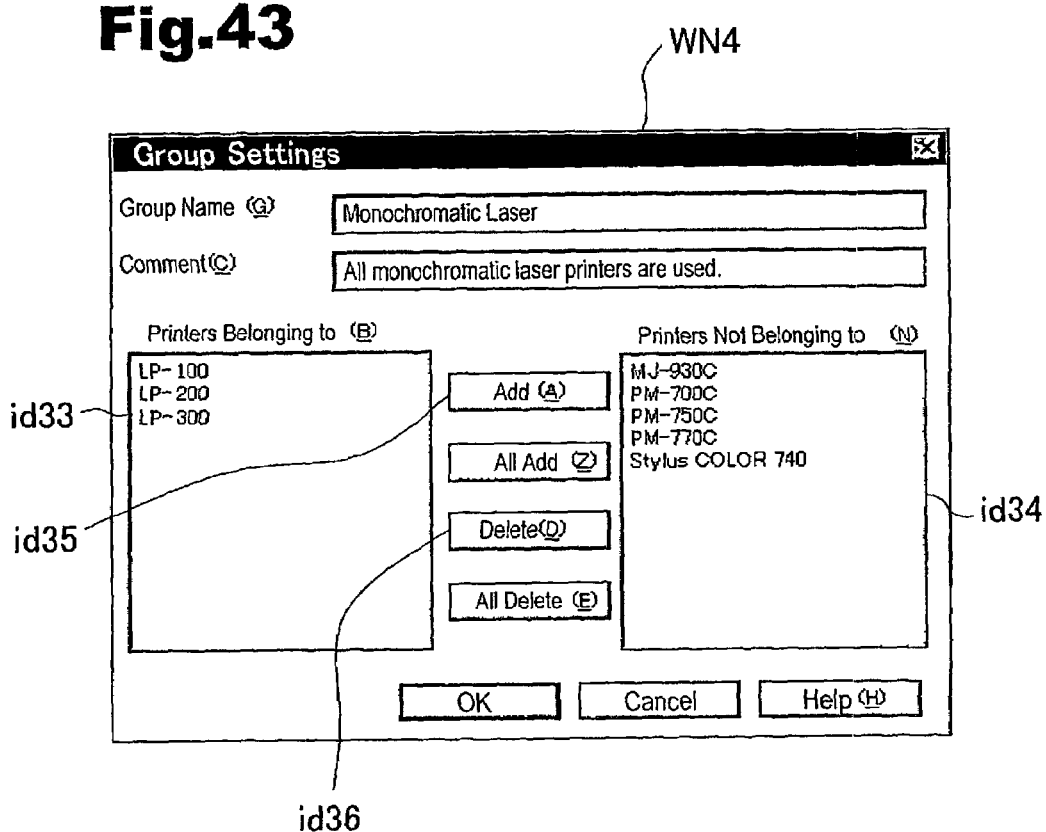
FIG. 43 shows addition to a 'Printers Belonging to' display box id33.
FIG. 44 shows an example of group registration list data PD.

The operator selects a desired one out of the printer names shown in the 'Printers Not Belonging to' display box id34 and clicks an 'Add' button id35. The selected printer name is then transferred to the 'Printers Belonging to' display box id33. In the example of FIG. 42, there are the names of eight printers in the 'Printers Not Belonging to' display box id34. When the operator selects three printers 'LP-100', 'LP-200', and 'LP-300' and clicks the 'Add' button id35, the names of the selected three printers are transferred to the 'Printers Belonging to' display box id33 as shown in FIG. 43.

A 'Delete' button id36 is used to delete a selected printer from the names of the printers included in the 'Printers Belonging to' display box id33.

One or a plurality of printers are allocated to each group through a series of operations on the 'Group Settings' dialog box WN4. The results of allocation are stored as group registration list data in the RAM 32. FIG. 44 shows an example of group registration list data PD. The group registration list data PD includes one or multiple group names, wherein one or multiple printer names and any related comment are mapped to each group name.

The group names displayed in the 'List' display box id21 on the 'Group List' dialog box WN3 are based on the group name data included in the group registration list data PD. Referring back to FIG. 39, the contents of the 'Group Name' data input box id11, the 'Comment' display box id15, and the 'Printer' display box id12 in the 'Printer Group' field fd4 are updated with the group registration list data PD, that is, the new registration in the 'Group List' dialog box WN3 and the 'Groups Settings' dialog box WN4. The pull-down menu open from the 'Group Name' data input box id11 accordingly includes the group names registered in the 'Group List' dialog box WN3. The registration in the 'Group Settings' dialog box WN4 is reflected on the contents of the 'Comment' display box id15 and the 'Printer' display box id12.

A 'Paper Settings' field fd5 sets the paper and the printing quality and has data input boxes 'Paper Size', 'Orientation', 'Double-faced Print', 'Paper Type', 'Color', and 'Resolution' id14, id15, id19, id16, id17, and id18.

The 'Paper Size' data input box id14 sets the paper size as well as the paper type. A pull-down menu (not shown) is open in response to a click of a button id14a with an inverse triangle on the right end. A plurality of paper sizes are preset as possible options in this pull-down menu. Examples of the possible options include 'A4 210×297 mm', 'A4 Lateral 210×297 mm', 'Envelop 120×235 mm', and 'Postcard 100×147 mm'.

The 'Orientation' data input box id15 represents the orientation of paper set in the printer and has two options 'Portrait' and 'Landscape'. The 'Double-faced Print' data input box id19 has a check box to specify double-faced printing. When this check box is clicked, only the printers having the double-faced printing function are used for distributed printing.

The 'Paper Type' data input box id16 specifies the type of paper, and 'Plain', 'Superfine', and 'Glossy' are provided as possible options. The 'Color' data input box id17 specifies the type of ink used in the printer 14, and 'Color' and 'Black' are provided as possible options. The 'Resolution' data input box id18 sets the printing resolution, and 'Fast' and 'Fine' are provided as possible options. For example, 'Fast' and 'Fine' respectively represent the resolutions of 360×360 (dots) and 720×720 (dots).

A settings display box fd6 displays desired data among the settings in the 'Printer Group' field fd1 and the 'Paper Settings' field fd5.

Various pieces of information with regard to the settings in the 'Distributed Printing Properties' dialog box WN2, for example, information on the form of distributed printing, information on the printer group as the destination of distribution, information on the paper settings, and information on the basic settings of printing, are input into the computer main body 16 through the user's operations of the mouse 20 and the keyboard 18.

C5. Computer Programs

The respective modules 111 through 119 in the virtual printer driver 110 are actualized by the virtual printer driver 110 as the computer program and series of processing executed by the CPU 30 according to the virtual printer driver 110. The respective modules 121 through 12b in the distributed printing utility 120 shown in FIG. 30 are actualized by the distributed printing utility 120 as the computer program and series of processing executed by the CPU 30 according to the distributed printing utility 120.

Like the virtual printer driver 110, the distributed printing utility 120 is stored in advance in the floppy disk 22 and is installed from the floppy disk drive 24 into the computer 10 according to an activated preset installation program. The installed distributed printing utility 120 is stored in the HDD 41, and is incorporated in the operating system and loaded into a predetermined area of the RAM 32 in response to power supply to the computer 10. Like the virtual printer driver 110, the distributed printing utility 120 may be stored in another portable recording medium (carriable recording medium), such as a CD-ROM, a magneto-optic disc, or an IC card, in place of the floppy disk 22. The distributed printing utility 120 may be program data, which are downloaded from a specific server connecting with an external computer network (for example, the Internet) via the computer network and transferred to either the RAM 32 or the HDD 41.

Figure 45:
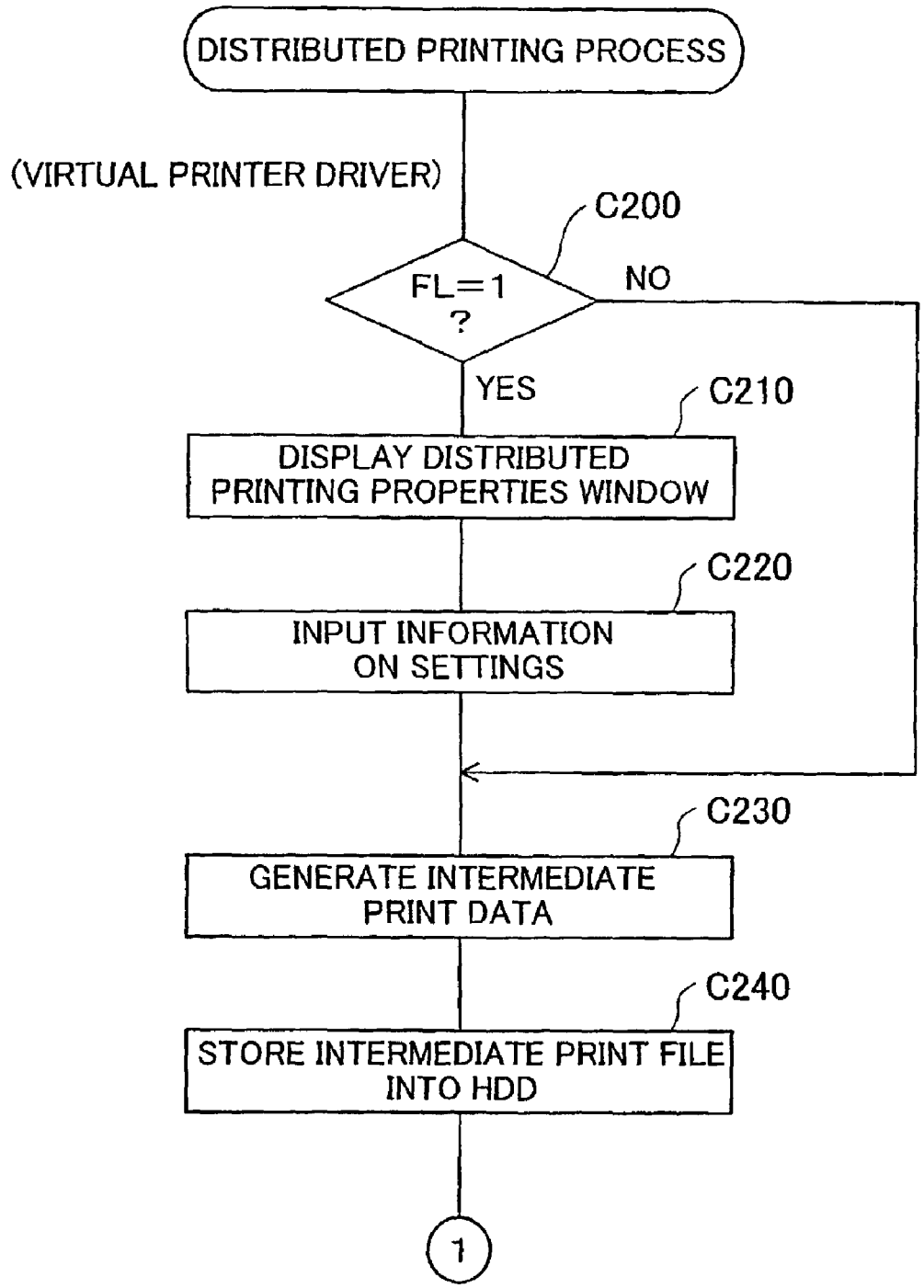
FIG. 45 is a flowchart showing a first part of a distributed printing process routine executed by the CPU 30.
Figure 46:
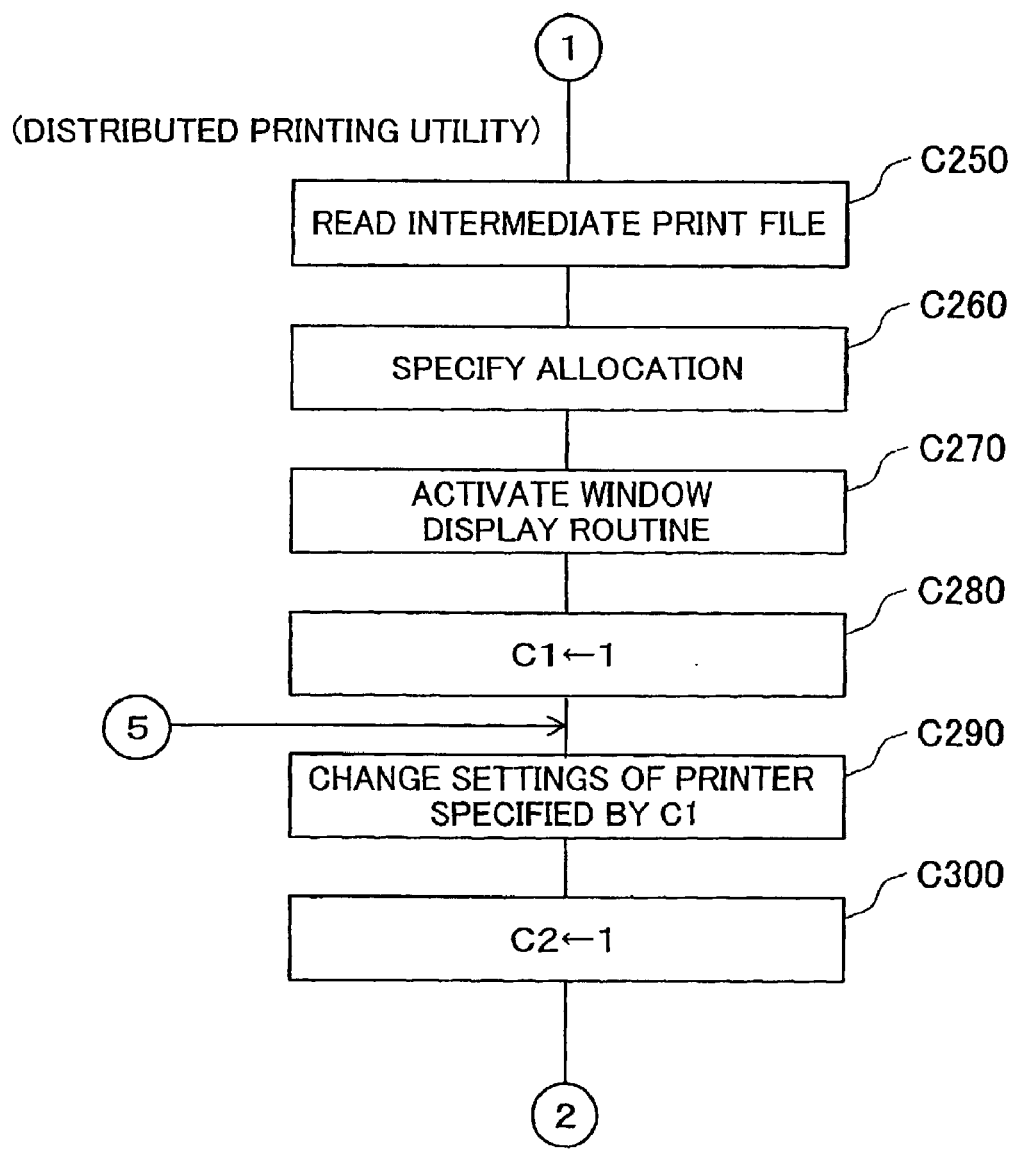
FIG. 46 is a flowchart showing a second part of the distributed printing process routine.
Figure 47:
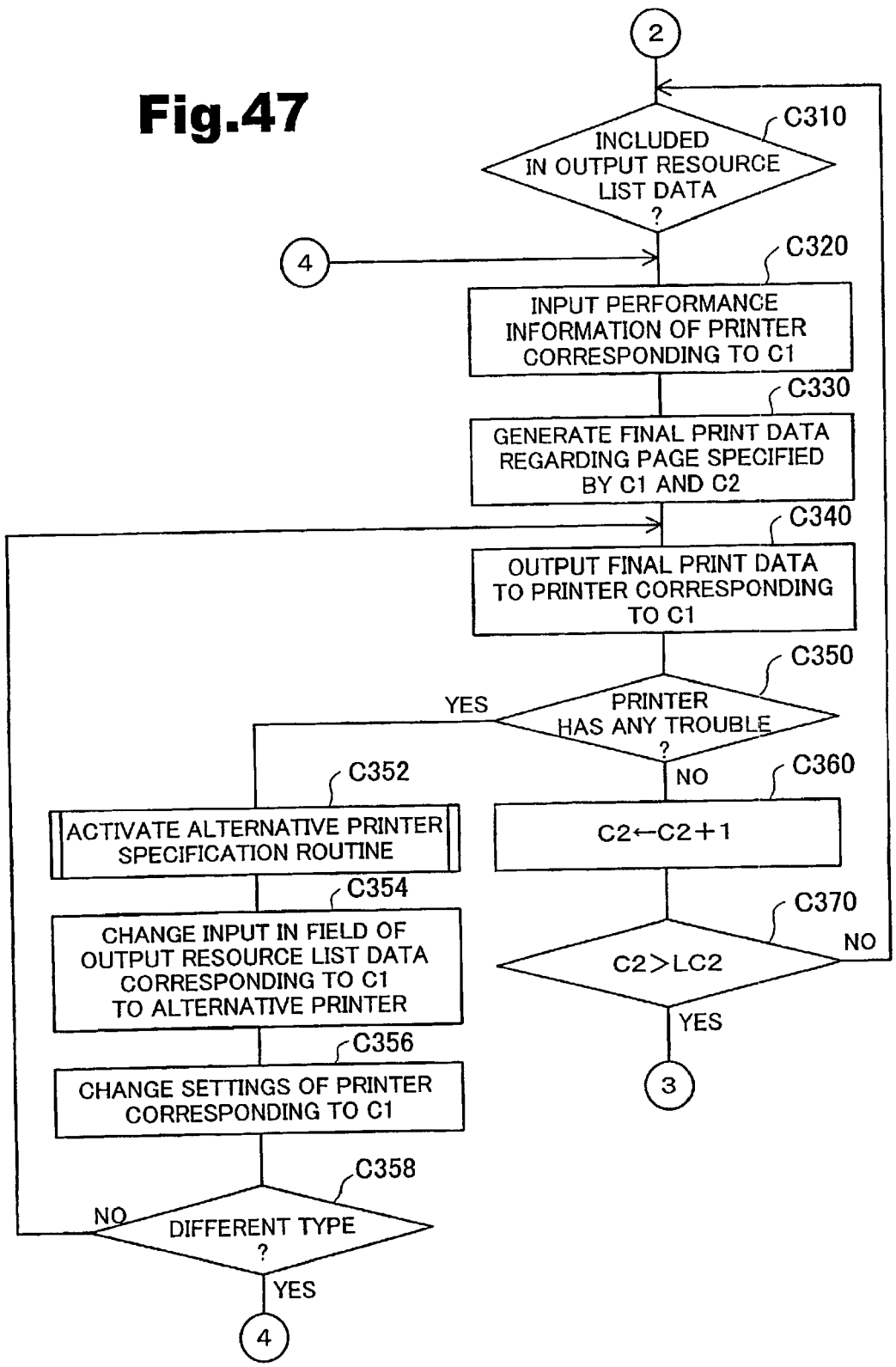
FIG. 47 is a flowchart showing a third part of the distributed printing process routine.
Figure 48:
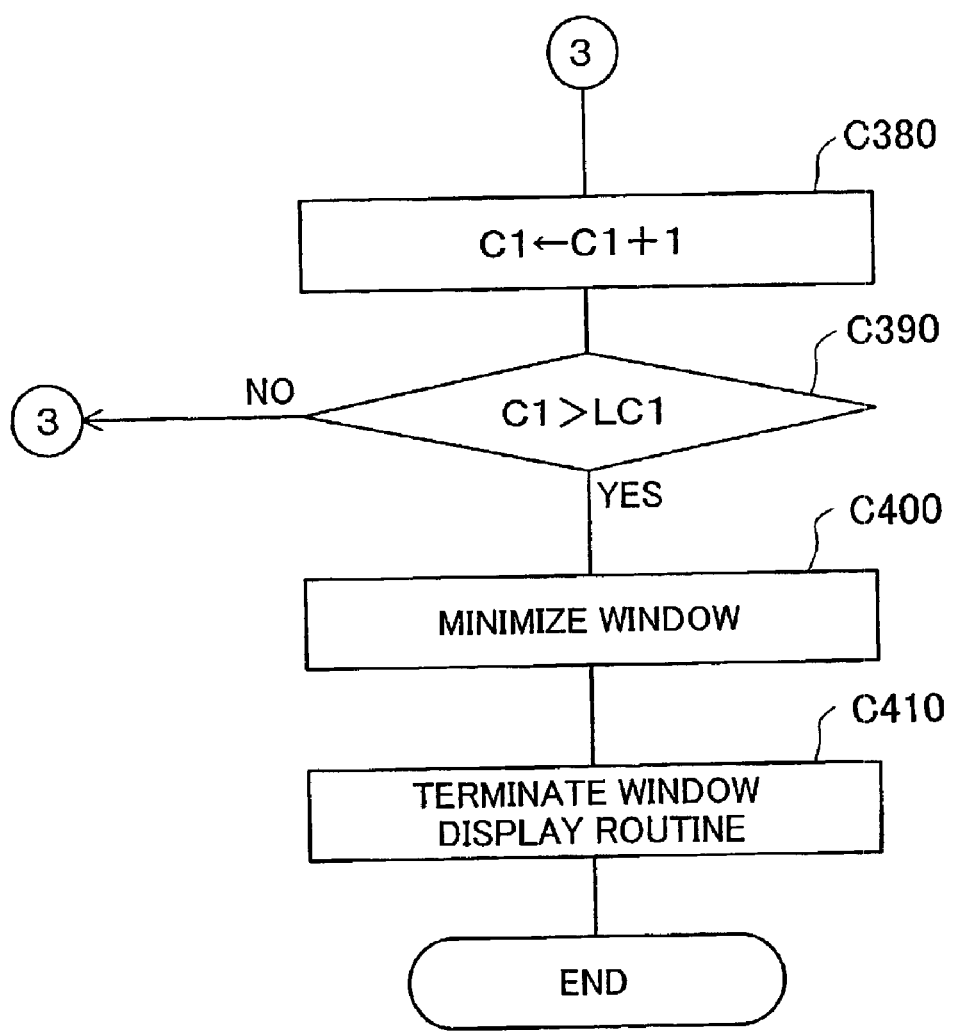
FIG. 48 is a flowchart showing a fourth part of the distributed printing process routine.

The following describes the details of the distributed printing process executed by the virtual printer driver 110 and the distributed printing utility 120. FIGS. 45 through 48 are flowcharts showing a distributed printing process routine. The part shown in FIG. 45 is executed by the virtual printer driver 110, whereas the parts shown in FIGS. 46 to 48 are executed by the distributed printing utility 120. This distributed printing process routine is activated in response to an instruction of distributed printing output from the application program 100. The application program 100 may be a general purpose application program used to create documents and pictures, and document data is generated by the functions characteristic of each application program. In response to execution of a 'Print' command on the application program 100, the instruction of distributed printing is output to print the document data thus generated (this unit corresponds to a print job (hereinafter may be simply referred to the job)).

Figure 49:
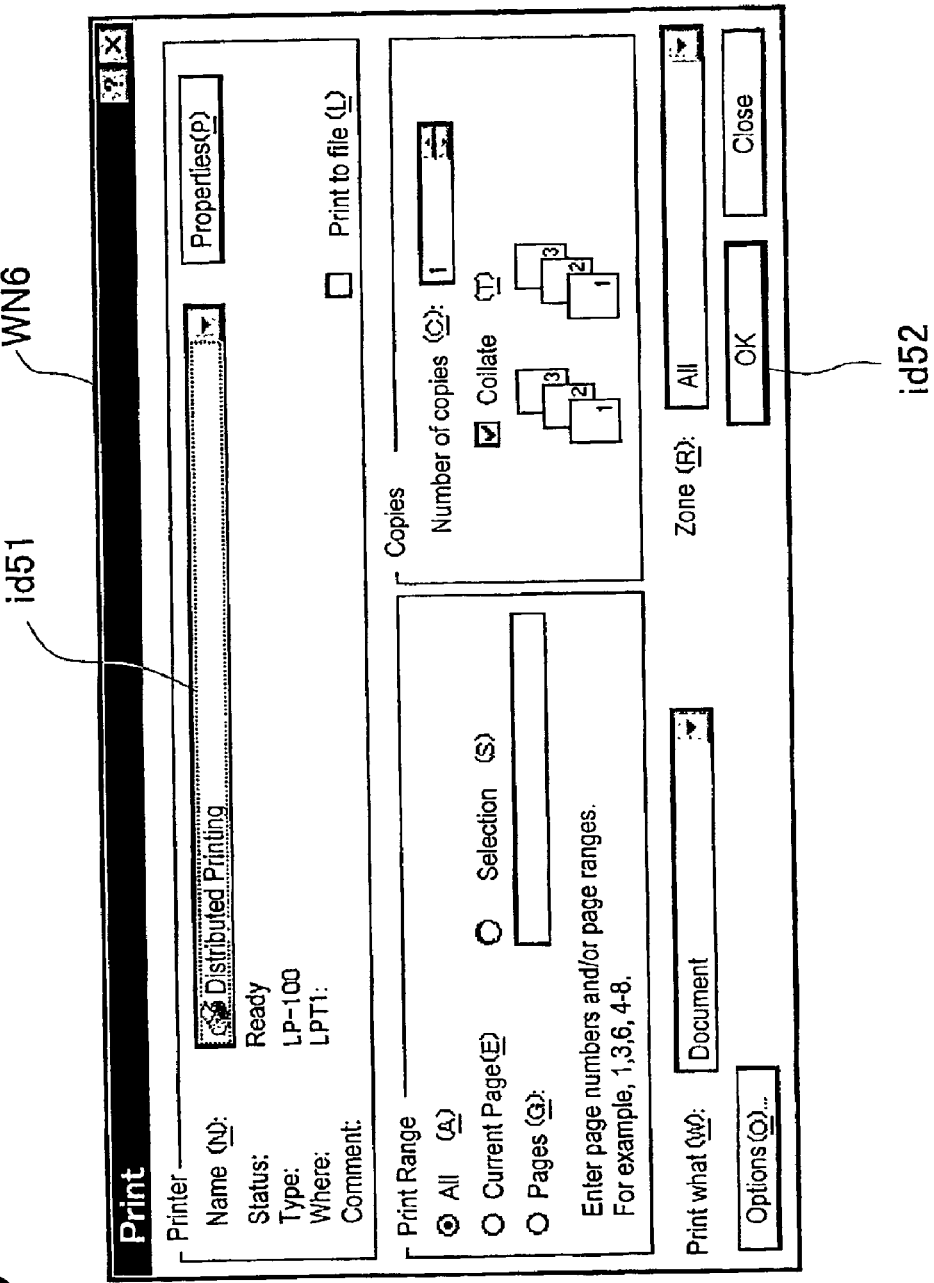
FIG. 49 illustrates a 'Print' dialog box WN6 open on the CRT display 12 in response to execution of a 'Print' command on an application program.

FIG. 49 illustrates a 'Print' dialog box WN6 open on the CRT display 12 in response to execution of the 'Print' command on the application program 100. As illustrated, the 'Print' dialog box WN6 has a 'Printer Name' data input box id21. The distributed printing process routine is activated in response to a click of an 'OK' button id52 with the mouse 20, while a series of letters 'Distributed Printing', which corresponds to the 'Distributed Printing' icon IC6 discussed previously with FIG. 31, is selectively input in a 'Printer Name' data input box id51.

When the program enters the processing routine shown in FIG. 45, the CPU 30 first determines whether or not a flag FL is equal to a value '1' (step C200). The flag FL shows the on-off state of a check box id6 'Preview Settings' included in the 'Distribution Settings' card CD1 on the 'Distributed Printing Properties' dialog box WN2. When it is determined at step C200 that the flag FL is equal to the value '1', that is, in the case of a check in the check box id6 'Preview Settings', the CPU 30 opens the 'Distributed Printing Properties' dialog box WN2 shown in FIG. 32 on the CRT display 12 (step C210). The display enables the operator to confirm and change the settings prior to the actual printing operation. At subsequent step C220, various pieces of information on the settings, for example, information regarding the distributed form, the printer group, the paper settings, and the basic settings of printing, are input in the 'Distributed Printing Properties' dialog box WN2 according to the requirements. The various pieces of input information on the settings are stored as printer property data.

After execution of step C220, the program proceeds to step C230. In the case of a negative answer at step C200, that is, in the case of no check in the check box id6 'Preview Settings', on the other hand, the program skips the processing of steps C210 and C220 and directly goes to step C230. In this case, the previous settings in the 'Distributed Printing Properties' dialog box WN2 are kept as the printer property data. At step C230, the CPU 30 generates intermediate print data, based on the print data output from the application program 100.

The following series of processing is carried out to generate the intermediate print data. The CPU 30 first returns the processing to the application program 100 and issues a print command to the virtual printer driver 110. The CPU 30 then shifts the processing to the virtual printer driver 110 to receive the print command output from the application program 100. In response to the print command, the CPU 30 reads the performance information with regard to the printers belonging to the printer group specified by the printer property data (here it is assumed that the printers 60, 70, and 80 are specified), which has been transmitted from the corresponding real printer drivers 130, 140, and 150 via the distributed printing utility 120, extracts the highest performance out of the input performance information of the respective printers 60, 70, and 80, and specifies the extracted highest performance as the performance information of the virtual printer. The CPU 30 subsequently transmits the performance information of the virtual printer to the application program 100.

The CPU 30 then shifts the processing to the application program 100 and converts the document data generated by the application program 100 into print data adequate for the virtual printer, based on the performance information of the virtual printer as well as the information with regard to the basic settings of printing and the information with regard to the paper settings among the various pieces of information on the distributed printing set by the virtual printer driver 110 (excluding the information with regard to the printer group and the distributed form). The converted print data is transmitted to the virtual printer driver 110. The CPU 30 shifts the processing to the virtual printer driver 110 to input the transmitted print data as intermediate print data. This series of processing thus generates the intermediate print data.

The CPU 30 subsequently outputs the generated intermediate print data to the HDD 41 and temporarily stores a data set or a set of the intermediate print data as an intermediate print file MF into the HDD 41 (step C240).

After execution of step C240, the CPU 30 shifts the processing to the distributed printing utility 120 and goes to step C250 shown in FIG. 46. At step C250, the CPU 30 inputs the intermediate print file MF from the HDD 41. The CPU 30 then specifies allocation of the intermediate print data input at step C250, based on the information with regard to the printer group and the distributed form included in the printer property data discussed above (step C260). The concrete procedure of step C260 divides the input intermediate print data by page and allocates the preset pages to the respective printers 60, 70, and 80 belonging to the specified printer group, in order to attain the distributed form set in the 'Distributed Printing Properties' dialog box WN2, that is, the distributed form displayed in the distributed form display box dd of the 'Distribution Settings' card CD1 shown in FIG. 36. Information regarding the preset pages allocated to the respective printers is stored as output resource list data into the RAM 32.

FIG. 50 shows an example of the output resource list data. The illustrated example corresponds to the allocation specified in FIG. 34. Pages 1, 2, 3, and 4 are allocated in this order to the first printer 60 (having the first priority) as page numbers to be printed; pages 5, 1, 2, 3, 4, 5, 1, and 2 are allocated in this order to the second printer 70; and pages 3, 4, 5, 1, 2, 3, 4, and 5 are allocated in this order to the third printer 80 (having the last priority).

Referring back to FIG. 46, after the allocation of the preset pages to the output resources at step C260, the CPU 30 executes a window display routine to display a 'Distributed Printing Utility' window WN7 on the CRT display 12 (step C270).

Figure 51:
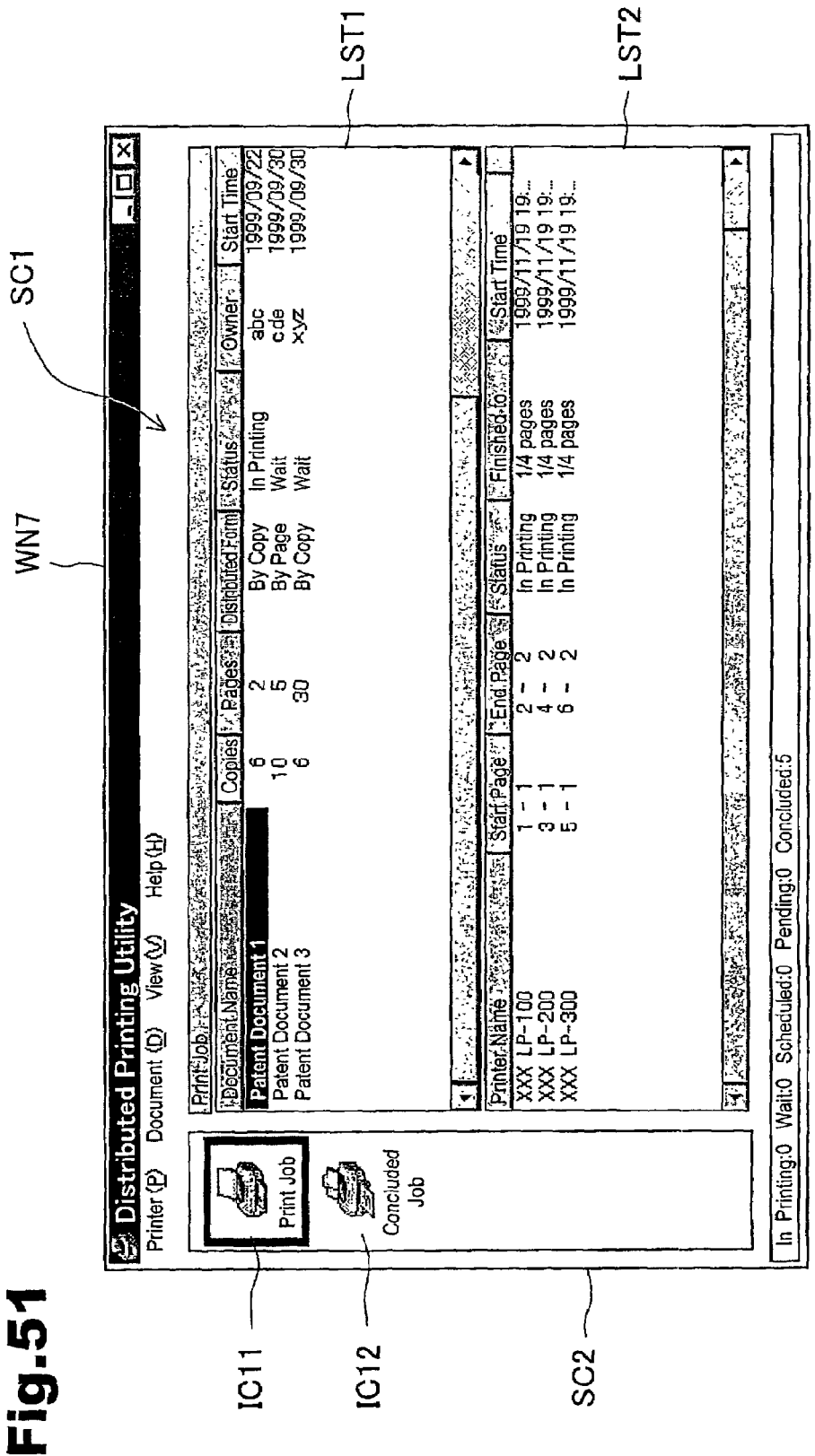
FIG. 51 illustrates the 'Distributed Printing Utility' window WN7.

FIG. 51 illustrates the 'Distributed Printing Utility' window WN7. As illustrated, this window WN7 has a main window SC1 and a sub window SC2 located on the left side of the main window SC1. The main window SC1 is vertically divided into two portions: a job list box LST1 in the upper portion and a distribution status list box LST2 in the lower portion.

The sub window SC2 has icons IC11 and IC12 to change over the display on the job list box LST1 between a print job list and a concluded job list. In the example of FIG. 51, the icon IC11 is clicked to give a display of the print job list on the job list box LST1. The print job list enumerates jobs in printing or in a waiting queue for printing. The print job list includes several fields 'Document Name' showing the names of print documents, 'Copies' showing the number of copies of each document to be printed, 'Pages' showing the number of pages included in each print document, 'Distributed Form' showing the distributed form, 'Status' showing the current status of printing, 'Owner' showing the owner of the print job, and 'Start Time' showing the date and time when printing starts.

The display in the 'Distributed Form' field is either 'By Copy' or 'By Page' as the method of bundling the print job in the case of distributed printing. The display in the 'Status' field includes 'In Printing', 'Wait', 'Scheduled', and 'Pending'. The status 'In Printing' represents the state of actual printing with any of the printers. The status 'Wait' represents the stand-by state prior to actual printing with any of the printers in response to the execution of the 'Print' command. The status 'Scheduled' represents the state waiting for a print start time specified by schedule management, which is not discussed in detail. The status 'Pending' represents the state of pending the print job specified by the schedule management.

The distributed status list box LST2 shows the distributed status of a selected job among the plurality of jobs displayed in the job list box LST1. In this distributed status list box LST2, each row corresponds to one destination of distribution, and includes several fields 'Printer Name' showing the printer specified as the destination of distribution, 'Start Page' showing the starting page of each print document to be printed with the destination of distribution, 'End Page' showing the end page of the print document, 'Status' showing the current status of printing, and 'Finished to' showing the progress of printing in the destination of distribution, and 'Start Time' showing the date and time when printing starts in the destination of distribution.

The names of the printers specified as the destinations of distribution are shown in the 'Printer Name' field. When a series of recovery processing is executed at subsequent steps to change the destination of distribution to an alternative printer, the name of the alternative printer is also shown in this 'Printer Name' field. In this case, the name of the originally specified printer with a trouble is shown after the name of the alternative printer. For example, the display 'XXXX LP-400 (XXXX LP-200) means that the recovery is executed to change the destination of distribution from the originally specified printer XXXX LP-200 to the alternative printer XXXX LP-400.

The display in the 'Status' field includes 'In Printing', 'Wait', and 'Concluded'. The status 'In Printing' represents the state of actual printing with the specified printer. The status 'Wait' represents the stand-by state prior to actual printing with the specified printer in response to the execution of the 'Print' command. The status 'Concluded' represents conclusion of the allocated printing with the specified printer.

The details of the window display routine activated at step C270 are not specifically described here. This window display routine is iteratively executed at preset time intervals to display the 'Distributed Printing Utility' window WN7 of the above arrangement, while updating the contents in the job list box LST1 and the distributed status list box LST2 on the window WN7 by a subsequent series of the distributed printing process discussed below.

Referring back to FIG. 46, after the processing of step C270, the CPU 30 carries out a series of processing discussed below to attain the actual printing operation according to the output resource list data representing the allocation specified at step C260. The CPU 30 first sets a value '1' to a printer counter C1 representing a target printer used for printing (step C280). The printer counter C1 shows the priority in the output resource list data (see FIG. 50) generated at step C260.

The CPU 30 subsequently specifies the printer as the output resource corresponding to the value of the printer counter C1 in the output resource list data and gives an instruction to change the settings to the specified printer (step C290). This processing makes the target printer ready for printing via the printer driver by transmitting the required information on the settings among the information with regard to the basic settings of printing and the information with regard to the paper settings included in the printer property data to the printer driver. For example, the procedure informs the printer driver of the paper type 'Glossy' to make the printer ready for printing suitable for the glossy paper.

The CPU 30 then sets a value '1' to a page counter C2 representing the page number to be printed (step C300). The CPU 30 subsequently determines whether or not the output resource list data includes the page specified by the values of the printer counter C1 and the page counter C2 (step C310). When the result of the determination shows that the output resource list data includes the specified page, the following series of processing is carried out. First, the CPU 30 receives performance information regarding the performances of the printer 60 (70, 80) specified by the value of the printer counter C1 (step C320). In accordance with a concrete procedure, the CPU 30 gives an output command to the real printer driver 130 (140 or 150) corresponding to the specified printer and receives performance information sent back from the real printer driver 130 (140, 150) receiving the output command. Here the performance information includes information regarding, for example, the resolution, the availability of color printing, the availability of double-faced printing, the and maximum paper size.

The CPU 30 subsequently generates final print data with regard to the page specified by the values of the page counter C2 and the printer counter C1, based on the input performance information as well as the information with regard to the basic settings of printing and the paper settings included in the printer property data (excluding the information with regard to the printer group and the distributed form) (step C330). The concrete procedure of step C330 extracts page data regarding the page corresponding to the value of the page counter C2 from the intermediate print data and carries out the rendering process to convert the extracted page data into data suitable for the printer 60 (70 or 80) corresponding to the value of the printer counter C1 based on the performance information, the information regarding the basic settings of printing, and the information regarding the page settings, so as to generate the final print data.

The CPU 30 then outputs the generated final print data to the real printer driver 130 (140 or 150) of the printer 60 (70 or 80) corresponding to the value of the printer counter C1 (step C340). The CPU 30 monitors the status of each printer 60 (70 or 80) based on a signal output from the real printer driver 130 (140 or 150) of the printer 60 (70 or 80) specified by the value of the printer counter C1, and determines whether or not the printer 60 (70 or 80) has any trouble (step C350). The trouble may be, for example, a long waiting queue that leads to an undesirably long time required for completion of printing or an error state that leads to failed printing. The length of the waiting queue is specified by the number of print jobs in the wait status and the number of pages to be printed by such print jobs.

The process of step C340 outputs the final print data regarding the page corresponding to the value of C2 to the printer specified by the value of C1. The process of step C350, which is executed immediately after the output, determines whether or not the specified printer has any trouble. This determines whether printing of the final print data regarding the specified page will be completed successfully or will be interrupted due to any trouble arising in the printer specified by the value of C1.

When it is determined at step C350 that the printer 60 (70 or 80) specified by the value of the printer counter C1 has no trouble, it is expected that printing of the specified page will be completed successfully. The CPU 30 thus goes to step C360. The CPU 30 increments the value of the page counter C2 by one at step C360. The CPU 30 then determines whether or not the current value of the page counter C2 exceeds a value LC2 representing the last page (step C370). When it is determined that the current value of the page counter C2 does not exceed the value LC2 representing the last page, the program returns to step C310 and generates and outputs the final print data with regard to the new page specified by the incremented value. When it is determined at step C370 that the current value of the page counter C2 exceeds the value LC2 representing the last page, on the other hand, the CPU 30 goes to step C380 in the flowchart of FIG. 48.

When it is determined at step C350 in FIG. 47 that the specified printer has any trouble, the program proceeds to step C352 to activate an alternative printer specification routine. The alternative printer specification routine specifies an alternative printer for the printer, which has been determined to have any trouble at step C350, and attains the printer selection module of the present invention. The details of the alternative printer specification routine will be discussed later. Here it is assumed that a printer 82 is specified as the alternative printer according to the alternative printer specification routine.

After execution of the processing at step C352, the CPU 30 rewrites the output resource list data (step C354). In accordance with a concrete procedure, the CPU 30 changes the input in the 'Output Resource' field corresponding to the printer counter C1 in the output resource list data to the alternative printer 82 specified at step C352. The CPU 30 subsequently outputs an instruction to change the settings to the alternative printer 82, which currently corresponds to the printer counter C1, based on the rewritten output resource list data (step C356). This is equivalent to the processing of step C290 and makes the alternative printer 82 ready for printing.

After execution of step C356, it is determined whether or not the type of the alternative printer changed at step C354 is different from the type of the originally specified printer (step C356). The alternative printer specification routine activated at step C352 specifies the alternative printer by taking into account the type of the printer. The determination of step C356 is thus readily performed, based on a flag transferred from the alternative printer specification routine, which will be discussed later.

When it is determined at step C356 that the type of the printer is not changed, that is, the type of the alternative printer is identical with the type of the originally specified printer, the program returns to step C340 and repeats the series of processing of and after step C340. When the type of the alternative printer is identical with the type of the printer with a trouble, it is not required to generate the final print data anew, but the final print data generated at step C330 is output to the alternative printer 82 that currently corresponds to C1. When it is determined at step C358 that the type of the printer is changed, on the contrary, the program returns to step C320 and repeats the series of processing of and after step C320. When the type of the alternative printer is different from the type of the printer with a trouble, it is required to generated the final print data anew (step C330). The newly generated final print data is then output to the alternative printer 82 that currently corresponds to C1 (step C340).

At step C380 in FIG. 48, to which the program proceeds after the affirmative answer at step C370, the CPU 30 increments the value of the printer counter C1 by one. The CPU 30 subsequently determines whether or not the current value of the printer counter C1 exceeds a value LC1 representing the last printer (step C310). When it is determined that the current value of the printer counter C1 does not exceed the value LC1 representing the last printer, the program returns to step C290 and generates and outputs the final print data on each page of the print job with the next printer 70 (80 or 60) specified by the incremented value of the printer counter C1. As discussed above, the processing of steps C290 to C390 is described to generate and output the final print data regarding the first page to the last page sequentially by the printer unit, that is, from the first printer to the last printer. Such description is, however, for convenience of illustration in the flowchart. The actual procedure carries out generation and output of the final print data regarding the first page to the last page by the respective printers in parallel by time sharing.

With the progress of the process of outputting the final print data to the respective printers, the contents of the 'Distributed Printing Utility' window WN7 displayed on the CRT display 12 according to the window display routine are updated. Namely the 'Status' field in the job list box LST1 and the 'Status' and 'Finished to' fields in the distributed status list box LST2 on the 'Distributed Printing Utility' window WN7 are updated according to the state of printing affected by the output of the final print data.

When it is determined at step C390 that the current value of the printer counter C1 exceeds the value LC1 representing the last printer, on the other hand, the program determines that generation and output of the final print data has been concluded for all the pages of the print job required for printing with all the printers specified as the destinations of distribution. The CPU 30 minimizes and inactivates the 'Distributed Printing Utility' window WN7 on the CRT display 12 (step C400) and terminates the iterative execution of the window display routine at the preset time intervals (step C410). The program then exits from this distributed printing process routine.

Although not being specifically included in the distributed printing process routine shown in the flowchart, the marked page is printed according to the on-off state of the check boxes bx1 and bx2 'Head' and 'End' included in the 'Marked Page' field fd21 of the 'Recovery' field fd2. In response to a check in the 'Head' check box bx1, the program prints the head marked page between the processing of steps C354 and C356. The end marked page is printed, on the other hand, prior to the change of the destination of distribution. The name of the originally specified printer (that is, the printer with a trouble), the name of the document to be printed, the total number of pages, and the user's name are printed in the marked page. The marked page distinctly informs the operator of the printing results. This arrangement thus ensures excellent usability.

Figure 52:
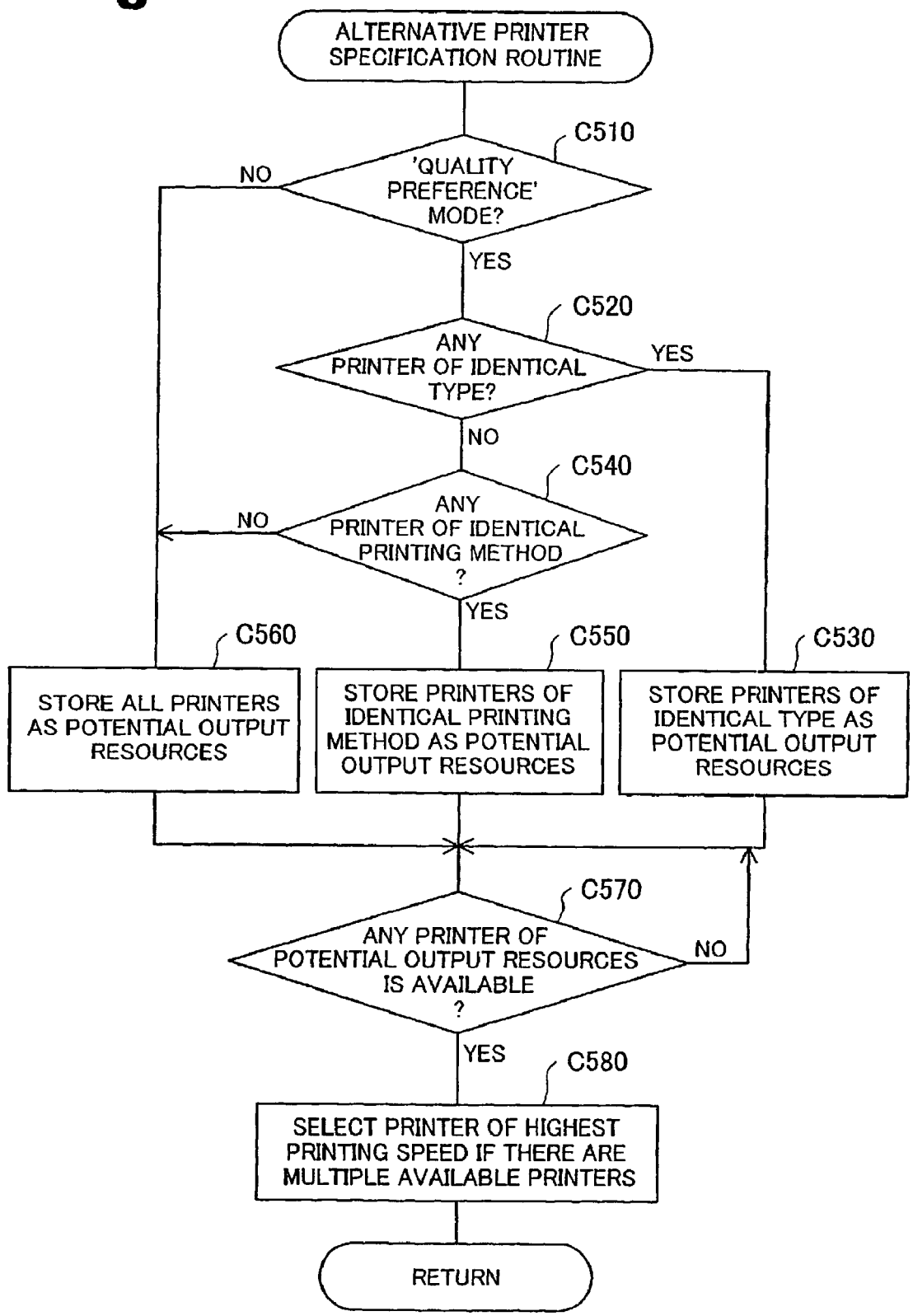
FIG. 52 is a flowchart showing an alternative printer specification routine activated in the distributed printing process routine.

The following describes the alternative printer specification routine activated at step C352 in the distributed printing process routine. FIG. 52 is a flowchart showing the alternative printer specification routine. When the program enters this routine, the CPU 30 first determines whether or not the 'Quality Preference' mode is set in the 'Recovery' field fd2 on the 'Distribution Settings' card CD1 (step C510). The determination is based on the selection of either the radio button bt4 'Quality Preference' or the radio button bt5 'Speed Preference' in the 'Recovery' field fd2.

When it is determined at step C510 that the 'Quality Preference' mode is set, the CPU 30 subsequently determines whether or not there is any printer of the identical type with the printer that has been determined to have any trouble at step C350 in the distributed printing process routine (step C520). The target of identification at step C520 is all the printers except the printer with the trouble. It is here determined whether or not there is any printer of the same type as the printer with the trouble.

The process of identification reads the performance information from the real printer driver corresponding to each target printer and determines whether or not the input performance information is perfectly coincident with the performance information of the printer with the trouble. In the case of an affirmative answer at step C520, that is, when it is determined that there is any printer of the identical type, the CPU 30 goes to step C530 to store the names of all the printers of the identical type, which have been identified at step C520, as potential output resources in the RAM 32. A flag representing the identical type is simultaneously stored with each of the printer names. This flag is used for the determination at step C358 discussed previously.

In the case of a negative answer at step C520, on the other hand, the CPU 30 goes to step C540 to determine whether or not there is any printer of the identical printing method with the printer that has been determined to have any trouble at step C350 in the distributed printing process routine, among the printers that are currently not specified as the destinations of distribution. The printing method is, for example, laser, ink jet, or thermal transfer. The determination is based on the resolution included in the performance information read from the printer driver. The process of step C540 carries out retrieval to find a printer having similar printing performances, such as similar resolution, and determines that such a printer adopts the identical printing method with that of the printer having the trouble.

In the case of an affirmative answer at step C540, that is, when it is determined that there is any printer of the identical printing method, the CPU 30 goes to step C550 to store the names of all the printers of the identical printing method, which have been specified at step C540, as potential output resources in the RAM 32. The determination of the identical type at step C520 is carried out prior to the determination of the identical printing method at step C540. If there is even one printer of the identical type, no printers of the identical printing method are stored as potential output resources. The printer of the identical type with the printer having the trouble is expected to give the preferable printing results satisfying the user's requirements.

In the case of a negative answer at step C540, on the other hand, the CPU stores all the printers except the printer with the trouble as potential output resources in the RAM 32 (step C560). When it is determined at step S510 that not the 'Quality Preference' mode but the 'Speed Preference' mode is set, the program also proceeds to step S560 to store all the printers except the printer with the trouble as potential output resources in the RAM 32.

After execution of any of steps C530, C540, and C560, the CPU 30 determines whether or not any of the printers stored as the potential output resources in the RAM 32 is immediately available for printing. The determination of the availability is based on the information output from the corresponding real printer driver.

In the case of a negative answer at step C570, that is, when it is determined that there is no available printer, the determination of availability at step C570 is carried out iteratively until any printer of the potential output resources becomes available. In the case of an affirmative answer at step C570, that is, when it is determined that there is any available printer, the program proceeds to step C580 to select a printer of the highest printing speed if there are a plurality of printers determined to be available. The printing speed can be estimated from the performance information read from the real printer driver, so that one applicable procedure uses the performance information for the comparison of the printing speed. The performance information, however, does not specify the accurate printing speed of each printer, so that another applicable procedure stores in advance speed list data, which records the printing speeds of the respective types of printers, in the RAM 32 and refers to the speed list data for comparison of the printing speed. After execution of step C580, the program goes to RETURN and exits from this alternative printer specification routine.

Figure 53:
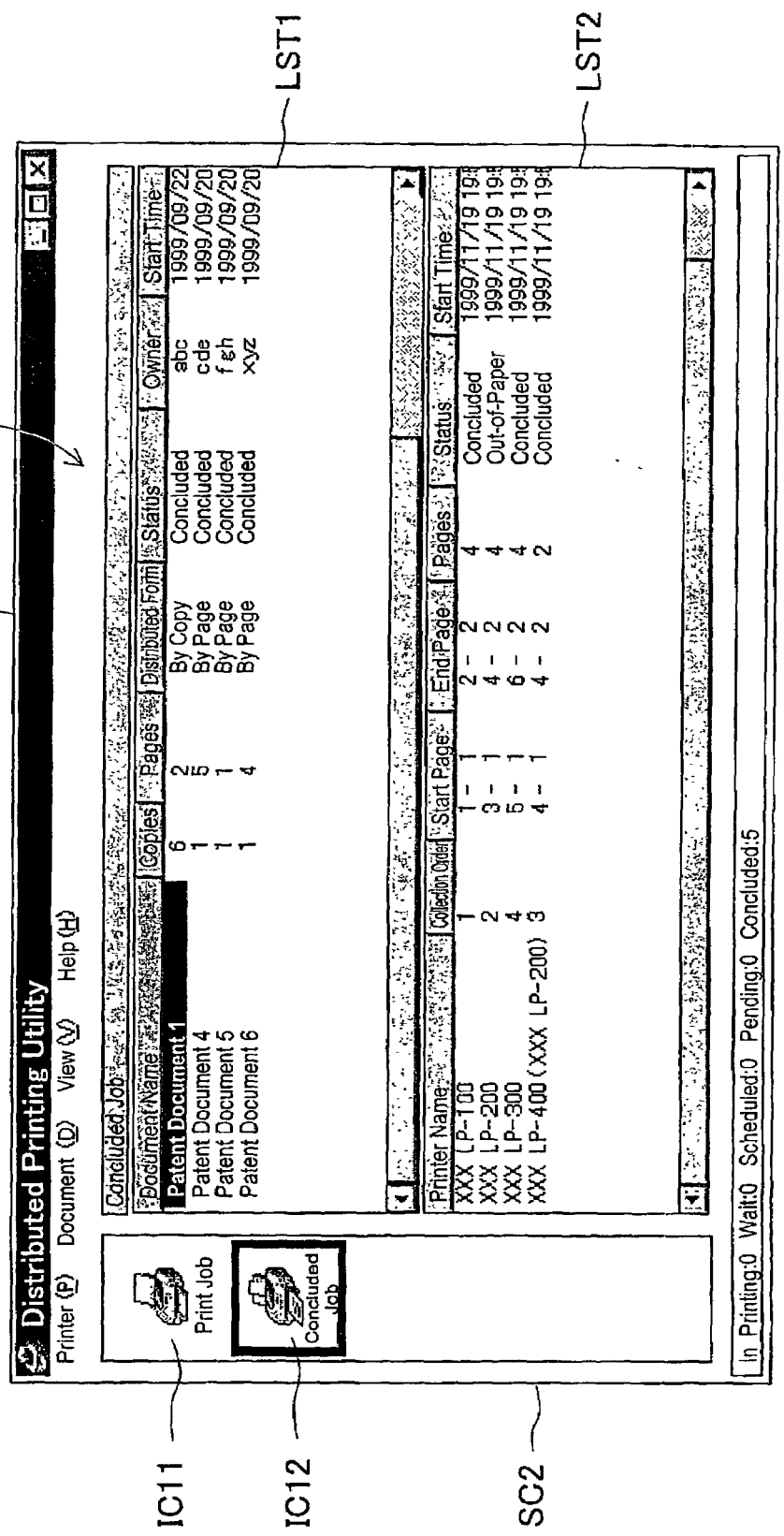
FIG. 53 illustrates the 'Distributed Printing Utility' window WN7 with a concluded job list shown in its job list box LST1.

FIG. 53 illustrates the 'Distributed Printing Utility' window WN7 with a concluded job list shown in the job list box LST1. This window WN7 opens on the CRT display 12 in response to a click of a button included in the task bar on the desktop after conclusion of the distributed printing process routine described above (that is, a button allocated to the minimized window WN7 at step C320) with the mouse 20. In the illustrated example of FIG. 53, it is assumed that the icon IC12 in the sub window SC2 is clicked with the mouse 20 in the 'Distributed Printing Utility' window WN7. In response to the click of the icon IC12, a concluded job list enumerating jobs that have already been printed is displayed in the job list box LST1.

Like the print job list shown in FIG. 51, the concluded job list has the fields 'Document Name', 'Copies', 'Pages', 'Distributed Form', 'Status', 'Owner', and 'Start Time'. The jobs in printing or in a waiting queue shown in the 'Distributed Printing Utility' window WN7 illustrated in FIG. 51 are changed to the concluded jobs shown in FIG. 53 when the jobs have been concluded. The distributed status list box LST2 is present below the job list box LST1 and shows the distributed status of a selected job among the plurality of jobs displayed in the job list box LST1. In this distributed status list box LST2, each row corresponds to one destination of distribution and has the fields 'Printer Name', 'Collection Order', 'Start Page', 'End Page', 'Pages', 'Status', and 'Start Time'. The difference from the fields in the print job list displayed in response to a click of the icon IC11 is to exclude the 'Finished to' field and include the 'Collection Order' and 'Pages' fields. The 'Collection Order' field shows the ordinal number of collection allocated to each printer to complete a preset sequence of collected prints. The 'Pages' field shows the number of pages included in each resulting print output from the specified printer.

In the same manner as the print job list, when the recovery process is carried out to change the destination of distribution to the alternative printer, the name of the originally specified printer with the trouble is written after the name of the alternative printer in the 'Printer Name' field. In the example of FIG. 53, while distributed printing by the unit of copy is set to print 2 copies of a 2-page document with each of three printers, some trouble arises in a certain printer 'LP-200' when the printer 'LP-200' is going to print the $1^{st}$ page of the $4^{th}$ copy. Another printer 'LP-400' is then specified as the alternative printer for printing. The trouble arising in the printer 'LP-200' is 'out-of-paper' as clearly shown in the 'Status' field.

C6. Effects of Embodiment

In the third embodiment having the configuration discussed above, the intermediate print data is obtained by simple output of a print command from the application program 100 to the virtual printer driver 110, and the distributed printing of the intermediate print data with the printers 60, 70, and 80 is automatically carried out. The operator is thus only required to execute the 'Print' command once on the application program for distributed printing with multiple printers. This arrangement effectively ensures the excellent operatability.

In the case where any trouble arises in any of multiple printers specified as destinations of distribution during a time period between a start of output of print data to the respective printers and completion of the printing operation with the respective printers, the technique of this embodiment automatically specifies one available printer among all the printers (that is, all the printers connecting with the computer main body 16 locally or via a network) except the printer with the trouble and continues the distributed printing using the specified printer as an alternative printer.

Unlike the prior art technique, this arrangement does not require re-allocation of print data to the respective printers in the case of occurrence of any trouble. The specified alternative printer is not under work of another print job but is immediately available. In the case of occurrence of any trouble in any of the printers specified as the destinations of distribution, this arrangement resumes the printing operation immediately, thus sufficiently shortening the printing time. Even when a trouble, such as out-of-paper, arises in a printer in the course of printing, this arrangement immediately resumes the distributed printing with an alternative printer.

The technique of this embodiment identifies the type of the printer, so that the type of the alternative printer is identical with or similar to the type of the printer with a trouble. The resulting prints obtained from the alternative printer are the same as or close to the resulting prints expected from the printer with a trouble, and thus sufficiently satisfy the user's requirements. Information transmitted from the printer driver is used for the identification. This desirably simplifies the configuration for the identification.

In the case of occurrence of a trouble in the alternative printer, the procedure of this embodiment resumes printing with another alternative printer, which is selected among all the printers except the first alternative printer. This arrangement allows iterative recovery, thus enabling the distributed printing to be completed with normal printers.

In the structure of the embodiment, the 'Output to' radio button bt2 used for manual specification of the recovery resource and the 'Automatically Select Recovery Resource' radio button bt3 for automatic specification of the recover resource are provided as interfaces. The operator selects manual specification or automatic specification of the alternative printer. The manual specification allows an operator's desired printer to be used for printing and enhances the convenience of collection of resulting prints by the operator, thus improving the operatability. The automatic specification of the alternative printer also ensures excellent operatability.

The procedure of the embodiment selects the printer of the highest printing speed for the alternative printer among the potential output resources stored in the RAM 32. This desirably shortens the printing time. In the 'Speed Preference' mode, the procedure of this embodiment selects the printer of the highest printing speed among available printers, irrespective of the type of the printer. This arrangement gives the preference to fast printing over high-quality printing.

In this embodiment, a list of jobs in printing or in a waiting queue is displayed in the 'Distributed Printing Utility' window WN7. In the event that any trouble arises in any of the printers specified as the destinations of distribution and recovery is performed, the name of the alternative printer is also shown in this window WN7. The display quickly informs the operator of the alternative printer specified for the recovery. This arrangement ensures excellent usability. The contents of the 'Distributed Printing Utility' window WN7 are not eliminated even after conclusion of distributed printing of print data but are kept in the form of a concluded job list. This informs the operator of the alternative printer specified for recovery with regard to each concluded print job.

There are some possible modifications of the third embodiment.

(1) The procedure of this embodiment carries out recovery in the case of occurrence of any trouble in any of multiple printers specified as destinations of distribution during a time period between a start of output of print data to the respective printers and completion of the printing operation with the respective printers. One modified procedure may carry out recovery in the case of occurrence of any trouble in any of multiple printers specified as destinations of distribution during a time period between specification of the destinations of distribution of print data and actual distributive output of the print data. Namely the series of processing of steps C350 to C358 may be placed immediately after step C310. This arrangement enables the distributed printing to be completed with an alternative printer, when any trouble arises in any of multiple printers specified as destinations of distribution immediately before the actual output of resulting prints from the printers.

(2) When there is a change in type of the printer immediately before generation of the final print data at step C330 in the distributed printing process routine (that is, in the case of an affirmative answer at step C358), data correction may be performed to make the resulting prints obtained from the specified alternative printer coincident with the resulting prints expected from the printer with a trouble. For example, the alternative printer specified for recovery has a different resolution, the data correction expands or contracts coordinate data given as the print data according to the resolution of the originally specified printer with the trouble. In another example, the alternative printer has a different margin, the data correction expands or contracts the whole image according to the margin of the originally specified printer with the trouble. Such data correction enables the resulting prints obtained from the alternative printer to be significantly close to the resulting prints expected from the originally specified printer, thus satisfying the user's requirements.

(3) In the distributed printing control apparatus according to the present invention, print data is directly output from one computer 10 to the multiple printers 60, 70, and 80. Another possible application is a client-server system, in which a server may be provided on the computer network 90 to manage distributed printing with multiple printers. In this application, the virtual printer driver is incorporated in each client, and the distributed printing utility is incorporated in the server.

The above embodiments are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

INDUSTRIAL APPLICABILITY

The technique of the present invention is applicable to diverse information processing apparatuses like various computers connectable with a plurality of printers.

What is claimed is:

1. A distributed printing control apparatus connecting with a plurality of printers, said distributed printing control apparatus distributing print data of interest, which is generated by an application program and is to be printed, into said plurality of printers, and transmitting the distributed print data to each of said printers, said distributed printing control apparatus comprising:
a printer driver storage module that stores a plurality of printer drivers provided for a type of each of said printers;
a virtual printer driver execute module that collects information with regard to performances of all available printers as destinations of distribution from said printer drivers, decides performance information with regard to a virtual printer driver from the collected information of performances of all said available printers, makes the application program execute a data conversion process based on the decided performance information, and obtains intermediate print data adequate for a virtual printer from said application program;
a distribute module that distributes the intermediate print data to said plurality of printers; and
an output control module that converts the distributed intermediate print data into final print data suitable for each of said printers by executing a data conversion process based on information regarding performance of each printer obtained by each of said printer drivers, and transmits the final print data to each of said printers via said printer drivers.

2. A distributed printing control apparatus in accordance with claim 1, wherein the virtual printer driver specifies information with regard to a highest-performance printer among all available printers as destinations of distribution.

3. A distributed printing control apparatus in accordance with claim 2, said distributed printing control apparatus further comprising:
a performance information collection module that collects information with regard to performances of all said available printers as the destinations of distribution from printer drivers individually provided for said available printers; and
a highest performance selection module that selects a highest performance among the performances of all said available printers collected by said performance information collection module.

4. A distributed printing control apparatus in accordance with claim 1, said distributed printing control apparatus further comprising:
a virtual printer printing information setting module that displays an input window on a display device and sets various pieces of information required for printing with said virtual printer, based on input data from an input device.

5. A distributed printing control apparatus in accordance with claim 4, said distributed printing control apparatus further comprising:
an information transmission module that causes at least part of the various pieces of information set by said virtual printer printing information setting module to undergo a series of processing carried out by each printer driver.

6. A distributed printing control apparatus in accordance with claim 4, said distributed printing control apparatus further comprising:
a real printer printing information setting module that is individually provided for each of said plurality of printers connected to said distributed printing control apparatus to set various pieces of information required for printing with said each printer; and
a display control module that displays a display window on said display device, the display window including a plurality of icons for individually activating said real printer printing information setting modules and an icon for activating said virtual printer printing information setting module.

7. A distributed printing control apparatus in accordance with claim 1, said distributed printing control apparatus further comprising:
a distribution information setting module that displays an input window for distribution of the print data and sets various pieces of information required for distributing the print data into said plurality of printers, based on the input data from said input device; and
a print data distribution module that distributes the print data into said plurality of printers, based on the various pieces of information set by said distribution information setting module.

8. A distributed printing control apparatus in accordance with claim 7, wherein one of the various pieces of information required for distributing the print data into said plurality of printers restricts a destination of distribution of the print data to a printer included in a specific group selected among said plurality of printers connected to said distributed printing control apparatus.

9. A distributed printing control apparatus in accordance with claim 1, wherein the intermediate print data obtained by said intermediate print data generation module is temporarily registered as an intermediate print file in an external storage device.

10. A distributed printing control apparatus in accordance with claim 1, wherein said plurality of printers is connected to said distributed printing control apparatus via a computer network.

11. A distributed printing control method that distributes print data of interest, which is generated by an application program and is to be printed, into a plurality of printers, and transmits the distributed print data to each of said printers, said distributed printing control method comprising the steps of:
(a) providing a plurality of printer drivers for a type of each of said printers in a storage device;
(b) executing a virtual printer driver to obtain intermediate print data adequate for a virtual printer from said application program, the executing of the virtual printer driver including collecting information with regard to performances of all available printers as destinations of distribution from said printer drivers, deciding performance information with regard to said virtual printer driver from said collected information of performances of all said available printers, and making the application program execute a data conversion process based on the decided performance information;
(c) distributing the intermediate print data to the plurality of printers;
(d) converting the distributed intermediate print data into final print data suitable for each of said printers by executing a data conversion process based on information regarding performance of each printer obtained by each of said printer drivers; and
(e) transmitting the final print data to each of said printers via said printer drivers.

12. A computer readable recording medium used in a distributed printing control apparatus, said distributed printing control apparatus connecting with a plurality of computers, distributing print data of interest, which is generated by an application program and is to be printed, into a plurality of printers, and transmitting the distributed print data to each of said printers, said computer readable recording medium comprising computer-executable instructions causing a computer to perform the functions of:
(a) providing a plurality of printer drivers for a type of each of said printers in a storage device;
(b) executing a virtual printer driver to obtain intermediate print data adequate for a virtual printer from said application program and using the obtained intermediate print data as the print data of interest, the executing of the virtual printer driver including collecting information with regard to performances of all available printers as destinations of distribution from said printer drivers, deciding performance information with regard to said virtual printer driver from said collected information of performances of all said available printers, and making the application program execute a data conversion process based on the decided performance information;
(c) distributing the intermediate print data to the plurality of printers;
(d) converting the distributed intermediate print data into final print data suitable for each of said printers by executing a data conversion process based on information regarding performance of each printer obtained by each of said printer drivers; and
(e) transmitting the final print data to each of said printers via said printer drivers.

13. A computer readable recording medium in accordance with claim 12, wherein the virtual printer driver specifies information with regard to a highest-performance printer among all available printers as destinations of distribution.

14. A computer readable recording medium in accordance with claim 13, wherein said computer-executable instructions further cause the computer to perform the functions of:
(f) collecting information with regard to performances of all said available printers as the destinations of distribution from printer drivers individually provided for said available printers; and
(g) selecting a highest performance among the performances of all said available printers collected by said function (f).

15. A computer readable recording medium in accordance with claim 12, wherein said computer-executable instructions further cause the computer to perform the function of:
(h) displaying an input window on a display device and setting various pieces of information required for printing with said virtual printer, based on input data from an input device.

16. A computer readable recording medium in accordance with claim 15, wherein said computer-executable instructions further cause the computer to perform the function of:
causing at least part of the various pieces of information set by said function (h) to undergo a series of processing carried out by each printer driver.

17. A computer readable recording medium in accordance with claim 15, wherein said computer-executable instructions further cause the computer to perform the functions of:
(i) setting various pieces of information required for printing with each of said plurality of printers connected to said distributed printing control apparatus, said function (i) being individually set for said each printer; and
(j) displaying a display window on said display device, the display window including a plurality of icons for individually activating said functions (i) and an icon for activating said function (h).

18. A distributed printing control apparatus that distributes print data of interest, which is generated by an application program and is to be printed, into a plurality of printers and outputs the distributed print data to each of said plurality of printers via a printer driver corresponding to a type of each of said printers, said distributed printing control apparatus comprising:
a printer driver storage module that stores a plurality of printer drivers;
a virtual printer driver execute module that collects, when said plurality of printers is of the same type, information with regard to the performance of that particular type of printer from the printer driver corresponding to the type, which is stored in said printer driver storage module, decides performance information with regard to a virtual printer from the collected information of the performance of the printer, makes the application program execute a data conversion process based on the decided performance information, and obtains intermediate print data adequate for said virtual printer from said application program;

a print data allocation module that allocates the intermediate print data to said plurality of printers; and an output data control module that transmits the intermediate print data respectively to said plurality of printers according to the allocation by said print data allocation module without any data conversion by the corresponding printer driver.

19. A distributed printing control apparatus in accordance with claim 18, wherein a predetermined unit of the allocation of the intermediate print data by said print data allocation module is each page of a document expressed by print data.

20. A distributed printing control apparatus in accordance with claim 18, wherein the intermediate print data obtained by said intermediate print data generation module is temporarily registered as an intermediate print file in an external storage device.

21. A distributed printing control apparatus in accordance with claim 20, said distributed printing control apparatus reading the intermediate print file registered in said external storage device in response to an external command and re-executing distributed printing of the intermediate print data in the intermediate print file with said plurality of printers.

22. A distributed printing control apparatus in accordance with claim 21, wherein said print data allocation module and said output data control module are activated again to attain the re-execution of the distributed printing.

23. A distributed printing control apparatus in accordance with claim 18, said distributed printing control apparatus further comprising:

a performance information collecting module that collects information regarding performances of each of said plurality of printers from a printer driver provided for each of said printers; and an identity decision module that determines that said plurality of printers is of the identical type, based on the performances of said plurality of printers collected by said performance information collecting module.

24. A distributed printing control apparatus in accordance with claim 18, said distributed printing control apparatus further comprising:

a distribution information setting module that displays an input window for distribution of the print data and sets various pieces of information required for distributing the print data into said plurality of printers, based on input data from an input device, wherein said print data allocation module allocates the intermediate print data, based on the various pieces of information set by said distribution information setting module.

25. A distributed printing control apparatus in accordance with claim 24, wherein one of the various pieces of information required for distributing the print data into said plurality of printers restricts a destination of distribution of the print data to a printer included in a specific group selected among said plurality of printers connected to said distributed printing control apparatus.

26. A distributed printing control apparatus in accordance with claim 24, wherein the intermediate print data obtained by said intermediate print data generation module is specified as an intermediate print file and is temporarily registered, together with the various pieces of information set by said distribution information setting module, in an external storage device.

27. A distributed printing control apparatus in accordance with claim 18, wherein at least one of said plurality of printers is connected to said distributed printing control apparatus via a computer network.

28. A computer readable recording medium used in a distributed printing control apparatus, said distributed printing control apparatus distributing print data of interest, which is generated by an application program and is to be printed, into a plurality of printers of an identical type and outputting the distributed print data to each of said plurality of printers via a printer driver provided for each of said printers, said computer readable recording medium comprising computer-executable instructions causing a computer to perform the functions of:

(a) providing a plurality of printer drivers in a storage device;

(b) executing a virtual printer driver to obtain intermediate print data adequate for a virtual printer from said application program, the executing of the virtual printer driver including collecting, when said plurality of printers is of the same type, information with regard to the performance of that particular type of printer from the printer driver corresponding to the type, deciding performance information with regard to said virtual printer from the collected information of the performance of the printer, and making the application program execute a data conversion process based on the decided performance information;

(c) allocating the intermediate print data to said plurality of printers; and (d) transmitting the intermediate print data respectively to said plurality of printers according to the allocation by said function (c) without any data conversion by the corresponding printer driver.

29. A computer readable recording medium in accordance with claim 28, wherein a predetermined unit of the allocation of the intermediate print data by said function (c) is each page of a document expressed by print data.

30. A computer readable recording medium in accordance with claim 28, wherein the intermediate print data obtained by said function (b) is temporarily registered as an intermediate print file in an external storage device.

31. A computer readable recording medium in accordance with claim 30, wherein said computer-executable instructions further cause the computer to perform the function of:

reading the intermediate print file registered in said external storage device in response to an external command and re-executing distributed printing of the intermediate print data in the intermediate print file with said plurality of printers.

32. A computer readable recording medium in accordance with claim 28, wherein said computer-executable instructions further cause the computer to perform the functions of:

(e) displaying an input window for distribution of the print data and setting various pieces of information required for distributing the print data into said plurality of printers, based on input data from an input device, where said function (c) allocates the intermediate print data, based on the various pieces of information set in said step (e); and (f) specifying the intermediate print data obtained by said function (b) as an intermediate print file and outputting the intermediate print file together with the various pieces of information set in said step (e) to an external storage device.

33. A distributed printing control apparatus that distributes print data of interest, which is generated by an application program and is to be printed, into a plurality of printers and outputs the distributed print data to each of said plurality of printers via a printer driver corresponding to a type of each of said printers, said distributed printing control apparatus comprising:

a printer driver storage module that stores a plurality of printer drivers;

a virtual printer driver execute module that collects, when said plurality of printers is of the same type, information with regard to the performance of that particular type of printer from the printer driver corresponding to the type, which is stored in said printer driver storage module, decides performance information with regard to a virtual printer from the collected information of the performance of the printer, makes the application program execute a data conversion process based on the decided performance information, and obtains intermediate print data adequate for said virtual printer from said application program;

a print data allocation module that allocates the intermediate print data to said plurality of printers;

an identity decision module that determines whether or not said plurality of printers is of the identical type; and an output data control module that, when it is determined that said plurality of printers is of the identical type, transmits the intermediate print data respectively to said plurality of printers according to the allocation by said print data allocation module without any data conversion by the corresponding printer driver, and when it is determined that said plurality of printers is not of the identical type, transmits the intermediate print data respectively to said plurality of printers according to the allocation by said print data allocation module with data conversion by the corresponding printer driver.

34. A distributed printing control method that distributes print data of interest, which is generated by an application program and is to be printed, into a plurality of printers and outputs the distributed print data to each of said plurality of printers via a printer driver corresponding to a type of each of said printers, said distributed printing control method comprising the steps of:

(a) providing a plurality of printer drivers in a storage device;

(b) executing a virtual printer driver to obtain intermediate print data adequate for a virtual printer from said application program, the executing of the virtual printer driver including collecting, when said plurality of printers is of the same type, information with regard to the performance of that particular type of printer from the printer driver corresponding to the type, deciding performance information with regard to said virtual printer from the collected information of the performance of the printer, and making the application program execute a data conversion process based on the decided performance information;

(c) allocating the intermediate print data to said plurality of printers; and (d) transmitting the intermediate print data respectively to said plurality of printers according to the allocation in said step (c) without any data conversion by the corresponding printer driver.

35. A distributed printing control method that distributes print data of interest, which is generated by an application program and is to be printed, into a plurality of printers and outputs the distributed print data to each of said plurality of printers via a printer driver corresponding to a type of each of said printers, said distributed printing control method comprising the steps of:

(a) providing a plurality of printer drivers in a storage device;

(b) executing a virtual printer driver to obtain intermediate print data adequate for a virtual printer from said application program, the executing of the virtual printer driver including collecting, when said plurality of printers is of the same type, information with regard to the performance of that particular type of printer from the printer driver corresponding to the type, deciding performance information with regard to said virtual printer from the collected information of the performance of the printer, and making the application program execute a data conversion process based on the decided performance information;

(c) allocating the intermediate print data to said plurality of printers;

(d) determining whether or not said plurality of printers is of the identical type; and (e) when it is determined that said plurality of printers is of the identical type, transmitting the intermediate print data respectively to said plurality of printers according to the allocation in said step (c) without any data conversion by the corresponding printer driver, and when it is determined that said plurality of printers is not of the identical type, transmitting the intermediate print data respectively to said plurality of printers according to the allocation in said step (c) with data conversion by the corresponding printer driver.

36. A computer readable recording medium used in a distributed printing control apparatus, said distributed printing control apparatus distributing print data of interest, which is generated by an application program and is to be printed, into a plurality of printers and outputting the distributed print data to each of said plurality of printers via a printer driver corresponding to a type of each of said printers, said computer readable recording medium comprising computer-executable instructions causing a computer to perform the functions of:

(a) providing a plurality of printer drivers in a storage device;

(b) executing a virtual printer driver to obtain intermediate print data adequate for a virtual printer from said application program, the executing of the virtual printer driver including collecting, when said plurality of printers is of the same type, information with regard to the performance of that particular type of printer from the printer driver corresponding to the type, deciding performance information with regard to said virtual printer from the collected information of the performance of the printer, and making the application program execute a data conversion process based on the decided performance information;

(c) allocating the intermediate print data to said plurality of printers;

(d) determining whether or not said plurality of printers is of the identical type; and (e) when it is determined that said plurality of printers is of the identical type, transmitting the intermediate print data respectively to said plurality of printers according to the allocation by said function (c) without any data conversion by the corresponding printer driver, and when it is determined that said plurality of printers is not of the identical type, transmitting the intermediate print data respectively to said plurality of printers according to the allocation by said function (c) with data conversion by the corresponding printer driver.

37. A distributed printing control apparatus that distributes print data of interest, which is generated by an application program and is to be printed, into a plurality of printers, and transmits the distributed print data to each of said printers, said distributed printing control apparatus comprising:
   a printer driver storage module that stores a plurality of printer drivers provided for a type of each of said printers;
   a destination of distribution specification module that specifies a plurality of printers as destinations of distribution;
   a virtual printer driver execute module that collects information with regard to performances of the plurality of printers specified by the destination of distribution specification module from said printer drivers stored in the printer driver storage module, decides performance information with regard to a virtual printer from the collected information of performances of the plurality of printers, makes the application program execute a data conversion process based on the decided performance information, and obtains intermediate print data adequate for said virtual printer from said application program;
   an allocation determination module that groups the obtained intermediate print data by a predetermined unit, specifies allocation of respective grouped parts of the print data to the plurality of printers specified by the destination of distribution specification module, and outputs the print data as allocation information to the plurality of printers in a distributive manner;
   a working status detection module that detects a current working status of a printer specified as a destination of distribution according to the allocation information from the printer drivers stored in the printer driver storage module;
   a display control module that displays one window on a display device, the window including at least a field showing the allocation information and another field showing the current working status detected by said working status detection module; and
   an output control module that distributes the intermediate print data obtained by the virtual printer driver execute module based on the allocation information, and outputs the distributed intermediate print data to each printer via each printer driver.

38. A distributed printing control apparatus in accordance with claim 37, said distributed printing control apparatus further comprising:
   a first control module that causes said display control module to carry out a display with regard to a print job, while one unit of print data specified by the print job is either in distributed printing or in a waiting queue.

39. A distributed printing control apparatus in accordance with claim 38, said distributed printing control apparatus further comprising:
   a second control module that causes said display control module to carry out a display with regard to the print job, while the distributed printing of the unit of print data specified by the print job is concluded.

40. A distributed printing control apparatus in accordance with claim 39, said distributed printing control apparatus further comprising a switch that is operated to alternatively change over between the display by said first control module and the display by said second control module.

41. A distributed printing control apparatus in accordance with claim 39, wherein said second control module allocates an order of collection to the respective printers by considering a sequence of collected resulting prints and displays the allocation in the window.

42. A distributed printing control apparatus in accordance with claim 39, wherein said second control module displays in the window a switch for activating another cycle of distributed printing after conclusion of one cycle of distributed printing.

43. A distributed printing control apparatus in accordance with claim 37, wherein the allocation information with regard to multiple print jobs, each representing the print data, is simultaneously displayed in the window.

44. A distributed printing control apparatus in accordance with claim 37, said distributed printing control apparatus comprising:
   a distribution information setting module that displays an input window on said display device and sets diverse pieces of information with regard to distribution of the print data, based on input data from an input device,
   wherein the allocation information is specified, based on the diverse pieces of information set by said distribution information setting module.

45. A distributed printing control method that distributes print data of interest, which is generated by an application program and is to be printed, into a plurality of printers, and transmits the distributed print data to each of said printers, said distributed printing control method comprising the steps of:
   (a) storing a plurality of printer drivers provided for a type of each of said printers;
   (b) specifying a plurality of printers as destinations of distributions;
   (c) executing a virtual printer driver to obtain intermediate print data adequate for a virtual printer from said application program, the executing of the virtual printer driver including collecting information with regard to performances of the plurality of printers specified as destinations of distributions, deciding performance information with regard to a virtual printer from the collected information of performances of the plurality of printers, and making the application program execute a data conversion process based on the decided performance;
   (d) grouping the obtained intermediate print data by a predetermined unit;
   (e) specifying allocation of respective grouped parts of the print data to the plurality of printers;
   (f) outputting the print data as allocation information to the plurality of printers in a distributive manner;
   (g) detecting a current working status of a printer specified as a destination of distribution according to the allocation information; and
   (h) displaying one window on a display device, the window including at least a field showing the allocation information and another field showing the current working status detected in said step (g).

46. A computer readable recording medium used in a distributed printing control apparatus, said distributed printing control apparatus distributing print data of interest, which is generated by an application program and is to be printed, into a plurality of printers, and transmits the distributed print data to each of said printers, said computer readable recording medium comprising computer-executable instructions causing a computer to perform the functions of:

(a) storing a plurality of printer drivers provided for a type of each of said printers;

(b) specifying a plurality of printers as destinations of distributions;

(c) executing a virtual printer driver to obtain intermediate print data adequate for a virtual printer from said application program, the executing of the virtual printer driver including collecting information with regard to performances of the plurality of printers specified as destinations of distributions, deciding performance information with regard to a virtual printer from the collected information of performances of the plurality of printers, and making the application program execute a data conversion process based on the decided performance;

(d) grouping the obtained intermediate print data by a predetermined unit;

(e) specifying allocation of respective grouped parts of the print data to the plurality of printers;

(f) outputting the print data as allocation information to the plurality of printers in a distributive manner;

(g) detecting a current working status of a printer specified as a destination of distribution according to the allocation information; and (h) displaying one window on a display device, the window including at least a field showing the allocation information and another field showing the current working status detected in said step (g).

47. A computer readable recording medium in accordance with claim 46, wherein said computer-executable instructions further cause the computer to perform the function of:

(i) carrying out a display with regard to a print job, while one unit of print data specified by the print job is either in distributed printing or in a waiting queue.

48. A computer readable recording medium in accordance with claim 47, wherein said computer-executable instructions further cause the computer to perform the function of:

(j) carrying out a display with regard to the print job, while the distributed printing of the unit of print data specified by the print job is concluded.

* * * * *